US012467312B2

(12) United States Patent
Campbell et al.

(10) Patent No.: US 12,467,312 B2
(45) Date of Patent: Nov. 11, 2025

(54) SECURITY PANEL MOUNTING SYSTEM

(71) Applicant: Riot Glass LLC, Huntington Beach, CA (US)

(72) Inventors: Bradley R. Campbell, Huntington Beach, CA (US); Terry Green, Anaheim, CA (US)

( * ) Notice: Subject to any disclaimer, the term of this patent is extended or adjusted under 35 U.S.C. 154(b) by 558 days.

(21) Appl. No.: 17/933,242

(22) Filed: Sep. 19, 2022

(65) Prior Publication Data

US 2023/0151678 A1 May 18, 2023

Related U.S. Application Data

(63) Continuation-in-part of application No. 17/525,545, filed on Nov. 12, 2021, now Pat. No. 11,814,895.

(51) Int. Cl.
*E06B 3/26* (2006.01)
*E06B 5/10* (2006.01)

(52) U.S. Cl.
CPC .............. *E06B 5/10* (2013.01); *E06B 3/2605* (2013.01)

(58) Field of Classification Search
CPC .......... E06B 3/5454; E06B 3/549; E06B 3/58; E06B 3/62; E06B 3/6202; E06B 3/5821; E06B 2003/622; E06B 2003/6252; E06B 2003/6258; E06B 2003/6223; E06B 5/106; E06B 5/11; E04F 11/1851; E04F 11/1853
USPC ........................................... 52/204.5, 204.62
See application file for complete search history.

(56) References Cited

U.S. PATENT DOCUMENTS 3,157,918 A * 11/1964 Adams ...................... E06B 1/38 52/769
3,342,001 A * 9/1967 Arnd ...................... E06B 3/5821 52/775
3,630,490 A * 12/1971 Horgan, Jr. ........... E06B 3/5454 256/24

(Continued)

FOREIGN PATENT DOCUMENTS

CH 709045 A2 * 6/2015 ............ F16B 5/0635
CN 104100181 A * 10/2014

(Continued)

OTHER PUBLICATIONS

Patent Cooperation Treaty, International Search Report and the Written Opinion of the International Searching Authority, Mar. 6, 2023.

*Primary Examiner* — Ryan D Kwiecinski
(74) *Attorney, Agent, or Firm* — CIONCA IP Law P.C.

(57) ABSTRACT

A security panel mounting system having a mounting unit configured to attach to a mounting surface; a securing unit configured to engage with the mounting unit wherein the engagement of the securing unit with the mounting unit forms a base fixture; a first narrow gasket and a second narrow gasket, each narrow gasket having: a narrow gasket body; a T-shaped narrow gasket handle attached to the narrow gasket body; and a gasket hollow nested within the narrow gasket body; wherein each narrow gasket handle is configured to engage with a corresponding structure within the base fixture to secure a security panel within the base fixture; and a cover configured to engage with the base fixture. An advantage is that the hollow within each narrow gasket may allow an impact to the panel to be responded more flexibly, reducing the likelihood of the mounting system being damaged from the impact.

8 Claims, 23 Drawing Sheets

(56) References Cited

U.S. PATENT DOCUMENTS

| | | | | | |
|---|---|---|---|---|---|
| 4,235,049 | A * | 11/1980 | Marinoni | E06B 3/549 52/800.15 |
| 4,524,978 | A * | 6/1985 | Mauser | E06B 3/62 52/844 |
| 4,612,743 | A * | 9/1986 | Salzer | E06B 3/5821 49/504 |
| 4,803,820 | A * | 2/1989 | Metrick | E06B 3/62 52/204.597 |
| 4,896,613 | A * | 1/1990 | Salzer | E06B 5/106 109/27 |
| 5,746,032 | A * | 5/1998 | Koike | E06B 1/702 49/504 |
| 5,950,380 | A * | 9/1999 | Pearson | E06B 5/106 52/204.5 |
| 6,158,182 | A * | 12/2000 | Biebuyck | E04B 2/96 52/235 |
| 6,216,401 | B1 * | 4/2001 | Emek | E06B 5/12 52/204.5 |
| 7,040,062 | B2 * | 5/2006 | Emek | E06B 5/12 52/214 |
| 7,607,267 | B2 * | 10/2009 | Fulton | E06B 3/677 52/302.1 |
| 7,763,334 | B2 * | 7/2010 | Berkowitz | E06B 3/5418 52/204.5 |
| 8,375,659 | B2 * | 2/2013 | Bogenhagen | E06B 1/70 49/470 |
| 8,621,793 | B2 * | 1/2014 | Abdul Lathief | E06B 3/5821 52/656.5 |
| 8,789,324 | B2 * | 7/2014 | Hay | E06B 3/24 52/204.69 |
| 8,844,219 | B2 * | 9/2014 | Neal | E06B 5/106 52/214 |
| 9,303,444 | B1 * | 4/2016 | Choi | E06B 3/60 |
| 9,447,627 | B2 * | 9/2016 | Thompson | E06B 3/5454 |
| 9,540,861 | B2 * | 1/2017 | Abdul Lathief | E06B 3/5821 |
| 9,683,402 | B2 * | 6/2017 | Abdul Lathief | E04F 11/1846 |
| 10,202,797 | B1 * | 2/2019 | Header | E06B 3/26303 |
| 10,233,689 | B1 * | 3/2019 | Jones | E06B 3/962 |
| 10,415,302 | B2 * | 9/2019 | Vander Bent, Jr. | E06B 3/5409 |
| 10,450,793 | B2 * | 10/2019 | Campbell | E06B 1/34 |
| 10,619,406 | B2 * | 4/2020 | Campbell | E06B 5/11 |
| 11,111,717 | B1 * | 9/2021 | Mazur | E06B 3/663 |
| 11,585,150 | B1 * | 2/2023 | Campbell | E06B 3/62 |
| 11,788,341 | B2 * | 10/2023 | Franson | E06B 7/12 52/203 |
| 2002/0095885 | A1 * | 7/2002 | Sampson | E06B 5/106 52/204.5 |
| 2005/0188631 | A1 * | 9/2005 | Neal | E06B 5/12 52/204.5 |
| 2006/0286317 | A1 * | 12/2006 | Berkowitz | E06B 3/5418 428/34 |
| 2007/0240371 | A1 * | 10/2007 | Clifford | E06B 3/02 52/208 |
| 2009/0094929 | A1 * | 4/2009 | Carlson | B32B 3/30 52/173.3 |
| 2011/0239560 | A1 * | 10/2011 | Landeros | E06B 3/305 52/656.2 |
| 2014/0318050 | A1 * | 10/2014 | Lathief | E04F 11/1812 52/204.595 |
| 2014/0331576 | A1 * | 11/2014 | Brown | E06B 3/26341 52/204.5 |
| 2015/0007514 | A1 * | 1/2015 | Lathief | E04F 11/1853 29/525.08 |
| 2015/0345207 | A1 * | 12/2015 | Thompson | E06B 3/677 52/204.6 |
| 2017/0002599 | A1 * | 1/2017 | Thompson | E06B 3/5454 |
| 2018/0112434 | A1 * | 4/2018 | Sprague | F16J 15/025 |
| 2018/0258687 | A1 * | 9/2018 | Campbell | E06B 5/106 |
| 2019/0264495 | A1 * | 8/2019 | Campbell | E06B 5/11 |
| 2020/0003002 | A1 * | 1/2020 | Walter | E06B 3/5821 |
| 2020/0011125 | A1 * | 1/2020 | Campbell | E06B 1/6069 |
| 2021/0285546 | A1 * | 9/2021 | Sprague | E06B 3/5454 |
| 2021/0355744 | A1 * | 11/2021 | Alkhoury | E06B 3/2675 |
| 2022/0145692 | A1 * | 5/2022 | Franson | E06B 5/11 |
| 2022/0162902 | A1 * | 5/2022 | Snader | E06B 1/36 |

FOREIGN PATENT DOCUMENTS

| | | | | | |
|---|---|---|---|---|---|
| CN | 106837106 | A | * | 6/2017 | E06B 5/106 |
| CN | 111877957 | A | * | 11/2020 | E06B 7/26 |
| CN | 113123706 | A | * | 7/2021 | E06B 7/14 |
| DE | 202006019067 | U1 | * | 3/2007 | E06B 3/5821 |
| DE | 202009000917 | U1 | * | 3/2009 | E06B 3/5821 |
| DE | 202010001052 | U1 | * | 6/2010 | A47K 3/30 |
| EP | 2017399 | A1 | * | 1/2009 | E04F 11/1853 |
| EP | 2857626 | A1 | * | 4/2015 | E06B 5/106 |
| EP | 3543420 | A1 | * | 9/2019 | E04F 11/1814 |
| FR | 2621643 | A | * | 4/1989 | E06B 3/5821 |
| GB | 1365555 | A | * | 9/1974 | E06B 3/305 |
| GB | 2185057 | A | * | 7/1987 | E06B 3/5821 |
| GB | 2209047 | A | * | 4/1989 | E06B 5/116 |
| GB | 2284634 | A | * | 6/1995 | E06B 3/5821 |
| GB | 2306996 | A | * | 5/1997 | E06B 3/5409 |
| GB | 2312451 | A | * | 10/1997 | E06B 3/64 |
| GB | 2436717 | A | * | 10/2007 | E04F 11/1851 |
| GB | 2578909 | A | * | 6/2020 | E06B 3/5871 |
| GB | 2585618 | A | * | 1/2021 | E06B 3/26303 |
| JP | 2016089328 | A | * | 5/2016 | E06B 3/58 |
| KR | 20180112462 | A | * | 10/2018 | E06B 5/11 |
| KR | 2019012778 | A | * | 2/2019 | E06B 3/5481 |
| WO | WO-2011054721 | A1 | * | 5/2011 | E04B 2/745 |
| WO | WO-2020172716 | A1 | * | 9/2020 | E06B 3/26 |

* cited by examiner

SECURITY PANEL MOUNTING SYSTEM

CROSS-REFERENCE TO RELATED APPLICATIONS

This application is a continuation-in-part and claims the benefit of U.S. Non-Provisional application Ser. No. 17/525,545, filed Nov. 12, 2021, which is hereby incorporated by reference, to the extent that it is not conflicting with the present application.

BACKGROUND OF INVENTION

1. Field of the Invention

The invention relates generally to security panel mounting systems and specifically to security panel mounting systems designed for securing a security panel within a structure to prevent unauthorized access.

2. Description of the Related Art

In many different applications, there is a desire to have a window that can be seen through clearly without any distortion or blockage, while simultaneously having said window be highly damage resistant. There is also a desire to have said window be cost effective and easy to implement, while still having a clean, unified design, and appearing to be "factory installed". There are currently several known methods of providing a strengthened window, however each of these methods may not achieve the goals set forth above or may have other notable downsides.

One common way to strengthen glass without providing visual obstruction is to provide a laminate or film layer over said glass. This may somewhat increase the strength of said glass but may not be strong enough to prevent breakage after being impacted by a heavy tool, such as a sledgehammer, for a prolonged period of time. This is the same for a standard laminated security window, which may also be destroyed after a period of time and rendered completely ineffectual at preventing unauthorized access. Alternative window strengthening methods, such as using bars, scissor gates or shutters may require user interaction in order to engage and disengage them, require maintenance and may be seen as visually displeasing or foreboding. The above techniques may be referred to as retrofitting techniques, as they apply newly added structures to a preexisting glazing, without removing it. Retrofitting may be necessary in applications in which the user does not want to or is otherwise unable to replace the existing glazing. Even if the removal of an existing glazing is permitted, the utilization of a thicker security panel, such as a one-inch-thick polycarbonate security panel, to reduce the likelihood of breakage, will likely not be possible, as a result of the thin preexisting glazing pocket provided on a window or door frame not being able to accommodate the greater thickness of the security panel.

Therefore, there is a need to develop a security panel mounting system that is capable of being retrofitted into a window while simultaneously overcoming the shortcomings listed above.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a security panel mounting system is provided, the security panel mounting system comprising: a base mount configured to attach to a mounting surface, the base mount having a plurality of locking slots; a pressure plate having a plurality of securing tabs, the pressure plate being configured to engage with the base mount through the engagement of each securing tab with a corresponding locking slot and the threading of at least one base screw through the pressure plate and the base mount to form a base fixture; a first narrow gasket and a second narrow gasket, each narrow gasket having: a narrow gasket body; a narrow gasket handle attached to the narrow gasket body; and a gasket hollow nested within the narrow gasket body, the first narrow gasket being configured to engage with the pressure plate, and the second narrow gasket being configured to associate with the base mount; a universal bottom gasket having: a panel plate; two base blocks attached to the panel plate; and a barbed tip associated with each base block; wherein each barbed tip is configured to engage with the base fixture to secure the universal bottom gasket within the base fixture; and a snap cover configured to engage with snap cover securing ridges disposed on the pressure plate to cover the pressure plate and each base screw, wherein the first narrow gasket, the second narrow gasket and the universal bottom gasket are configured to secure a security panel within the base fixture. Thus, an advantage is that a security panel having a thickness too great to fit within a preexisting glazing pocket within a structure may still be installed within said structure through usage of the security panel mounting system. Another advantage is that the system may be retrofitted over a preexisting glazing or may replace said glazing as needed depending on the application. Another advantage is the formed base fixture is structurally tamper-resistant and is configured to heavily resist disassembly attempts made by unauthorized personnel. Another advantage is the gaskets are configured to allow for the expansion and contraction of the secured security panel that may result from changes in ambient conditions, preventing warping or bowing of said security panel. Another advantage is that a desiccant slot may be provided on the base fixture when installed alongside a preexisting glazing, such that a desiccant may be discretely stored within said slot between the system and a preexisting glazing to prevent fogging between said security panel and said glazing. The security panel mounting system may be designed to be serviceable by dealers who possess the key to proprietary security screws used for system installation, so that the system can be cleaned, the desiccant recharged, the panels exchanged if damaged, or otherwise serviced easily as needed. Another advantage is that the disclosed security panel mounting system may utilize a passive ventilation system to vent or breathe naturally with no obtrusive visible venting mechanisms. This allows the pressure, temperature, and humidity conditions between a security panel secured within the system and a preexisting glass glazing to remain consistent with the external atmospheric conditions via equilibration, reducing or eliminating condensation between the preexisting glass and the security panel. According to a preferred embodiment of the disclosed passive ventilation AP system, there may be a debris filter enclosed within the base fixture, with said filter being pressure fitted into place and specifically fashioned to allow air passage through the AP system. In this way, the mounting of said filter does not restrict air flow and, by holding the filter within the base fixture between through hole(s) to the external environment and the expansion chamber, allows for the communication of said expansion chamber with the external environment, while preventing infiltration of insects, dust or other airborne debris into the expansion chamber. The various elements of the ventilation system may be hidden from view using the cover to conceal their existence and preserve the modern and sleek look of the extrusions. Another advantage is that the snap cover may be configured to hide internal system elements for both security and aesthetic purposes. Another advantage is that a center mullion may be provided to facilitate the securing of multiple security panels within an oversized window or mounting surface. Another advantage is that the narrow gaskets may be implemented with internally disposed gasket hollows and T-shaped narrow gasket handles, to allow for increased panel movement during impact, and thus more flexible impact response, and improved engagement between the narrow gaskets and their corresponding engaging structures. Another advantage is that the snap cover may be configured to cover the pressure plate, such that the external surface of the base fixture appears to be a unified structure, thus discouraging and further preventing forced entry attempts. Another advantage is that the securing tabs associated with the pressure plate may be configured to securely engage with locking slots associated with the base mount, such that a more secure engagement between the pressure plate and base mount is established. Another advantage is that the universal bottom gasket may configured to securely engage with the base mount through the utilization of barbed tips, further securing the universal bottom gasket to the base mount and further preventing said universal bottom gasket from being dislodged from a forced entry attempt or impact.

In another aspect, a security panel mounting system is provided, the security panel mounting system comprising: a base mount having a plurality of locking slots, the base mount being configured to attach to a mounting surface; a pressure plate having a plurality of securing tabs, the pressure plate being configured to engage with the base mount through engagement of each securing tab on the pressure plate with a corresponding locking slot on the base mount and the threading of a base screw through the base mount and the pressure plate, wherein the engagement of the pressure plate with the base mount forms a base fixture; a plurality of gaskets nested within the base fixture, the plurality of gaskets comprising: a first narrow gasket and a second narrow gasket, each narrow gasket having: a narrow gasket body; a narrow gasket handle attached to the narrow gasket body; and a gasket hollow nested within the narrow gasket body; wherein each narrow gasket handle is configured to engage with a corresponding securing pocket or gasket securing pocket nested within the base fixture to secure a security panel within the base fixture; and a cover configured to engage with the base fixture. Again, an advantage is that a security panel having a thickness too great to fit within a preexisting glazing pocket within a structure may still be installed within said structure through usage of the security panel mounting system. Another advantage is that the system may be retrofitted over a preexisting glazing or may replace said glazing as needed depending on the application. Another advantage is the formed base fixture is structurally tamper-resistant and is configured to heavily resist disassembly attempts made by unauthorized personnel. Another advantage is the gaskets are configured to allow for the expansion and contraction of the secured security panel that may result from changes in ambient conditions, preventing warping or bowing of said security panel. Another advantage is that a desiccant slot may be provided on the base fixture when installed alongside a preexisting glazing, such that a desiccant may be discretely stored within said slot between the system and a preexisting glazing to prevent fogging between said security panel and said glazing. The security panel mounting system may be designed to be serviceable by dealers who possess the key to proprietary security screws used for system installation, so that the system can be cleaned, the desiccant recharged, the panels exchanged if damaged, or otherwise serviced easily as needed. Another advantage is that the disclosed security panel mounting system may utilize a passive ventilation system to vent or breathe naturally with no obtrusive visible venting mechanisms. This allows the pressure, temperature, and humidity conditions between a security panel secured within the system and a preexisting glass glazing to remain consistent with the external atmospheric conditions via equilibration, reducing or eliminating condensation between the preexisting glass and the security panel. According to a preferred embodiment of the disclosed passive ventilation AP system, there may be a debris filter enclosed within the base fixture, with said filter being pressure fitted into place and specifically fashioned to allow air passage through the AP system. In this way, the mounting of said filter does not restrict air flow and, by holding the filter within the base fixture between through hole(s) to the external environment and the expansion chamber, allows for the communication of said expansion chamber with the external environment, while preventing infiltration of insects, dust or other airborne debris into the expansion chamber. The various elements of the ventilation system may be hidden from view using the cover to conceal their existence and preserve the modern and sleek look of the extrusions. Another advantage is that the cover may be configured to hide internal system elements for both security and aesthetic purposes. Another advantage is that a center mullion may be provided to facilitate the securing of multiple security panels within an oversized window or mounting surface. Another advantage is that the narrow gaskets may be implemented with internally disposed gasket hollows and T-shaped narrow gasket handles, to allow for increased panel movement during impact, and thus more flexible impact response, and improved engagement between the narrow gaskets and their corresponding engaging structures. Another advantage is that the cover may be configured to cover the entirety of the pressure plate, such that the external surface of the base fixture appears to be a unified structure, thus discouraging and further preventing forced entry attempts. Another advantage is that securing tabs associated with the pressure plate may be configured to engage with locking slots associated with the base mount, such that a more secure engagement between the pressure plate and base mount is established.

In another aspect, a security panel mounting system is provided, the security panel mounting system comprising: a mounting unit configured to attach to a mounting surface; a securing unit configured to engage with the mounting unit, wherein the engagement of the securing unit with the mounting unit forms a base fixture; and a plurality of gaskets nested within the base fixture, the plurality of gaskets comprising: a first narrow gasket and a second narrow gasket, the first and second narrow gaskets being configured for disposal on opposing sides of a security panel, each narrow gasket having: a narrow gasket body; a narrow gasket handle attached to the narrow gasket body; and a gasket hollow nested within the narrow gasket body; wherein each narrow gasket handle is configured to engage with a corresponding securing pocket or gasket securing pocket nested within the base fixture. Again, an advantage is that a security panel having a thickness too great to fit within a preexisting glazing pocket within a structure may still be installed within said structure through usage of the security panel mounting system. Another advantage is that the system may be retrofitted over a preexisting glazing or may replace said glazing as needed depending on the application. Another advantage is the formed base fixture is structurally tamper-resistant and is configured to heavily resist disassembly attempts made by unauthorized personnel. Another advantage is the gaskets are configured to allow for the expansion and contraction of the secured security panel that may result from changes in ambient conditions, preventing warping or bowing of said security panel. Another advantage is that a desiccant slot may be provided on the base fixture when installed alongside a preexisting glazing, such that a desiccant may be discretely stored within said slot between the system and a preexisting glazing to prevent fogging between said security panel and said glazing. The security panel mounting system may be designed to be serviceable by dealers who possess the key to proprietary security screws used for system installation, so that the system can be cleaned, the desiccant recharged, the panels exchanged if damaged, or otherwise serviced easily as needed. Another advantage is that the disclosed security panel mounting system may utilize a passive ventilation system to vent or breathe naturally with no obtrusive visible venting mechanisms. This allows the pressure, temperature, and humidity conditions between a security panel secured within the system and a preexisting glass glazing to remain consistent with the external atmospheric conditions via equilibration, reducing or eliminating condensation between the preexisting glass and the security panel. According to a preferred embodiment of the disclosed passive ventilation AP system, there may be a debris filter enclosed within the base fixture, with said filter being pressure fitted into place and specifically fashioned to allow air passage through the AP system. In this way, the mounting of said filter does not restrict air flow and, by holding the filter within the base fixture between through hole(s) to the external environment and the expansion chamber, allows for the communication of said expansion chamber with the external environment, while preventing infiltration of insects, dust or other airborne debris into the expansion chamber. The various elements of the ventilation system may be hidden from view using the cover to conceal their existence and preserve the modern and sleek look of the extrusions. Another advantage is that the cover may be configured to hide internal system elements for both security and aesthetic purposes. Another advantage is that a center mullion may be provided to facilitate the securing of multiple security panels within an oversized window or mounting surface. Another advantage is that the narrow gaskets may be implemented with internally disposed gasket hollows and T-shaped narrow gasket handles, to allow for increased panel movement during impact, and thus more flexible impact response, and improved engagement between the narrow gaskets and their corresponding engaging structures.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1A:
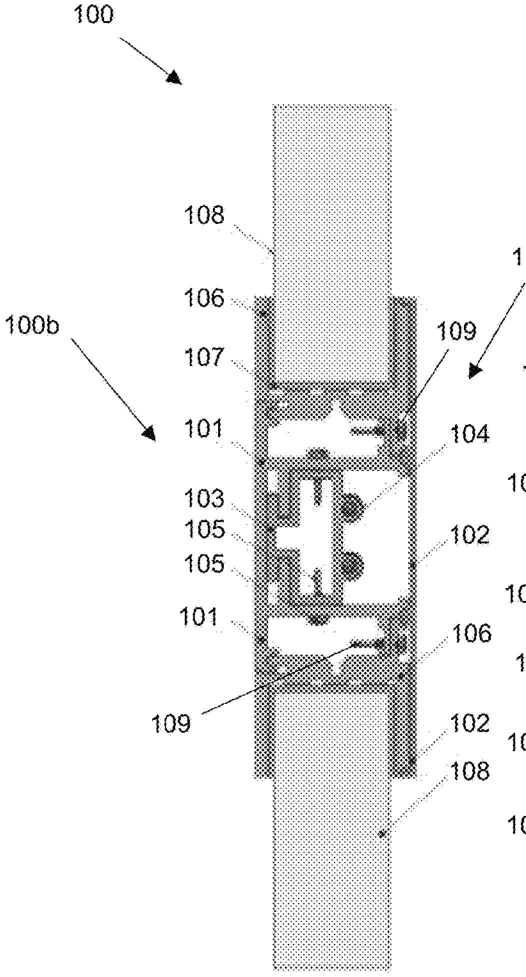
FIG. 1A illustrates the cross-sectional view of an ArmorPlast system, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 105 and 205, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1B:
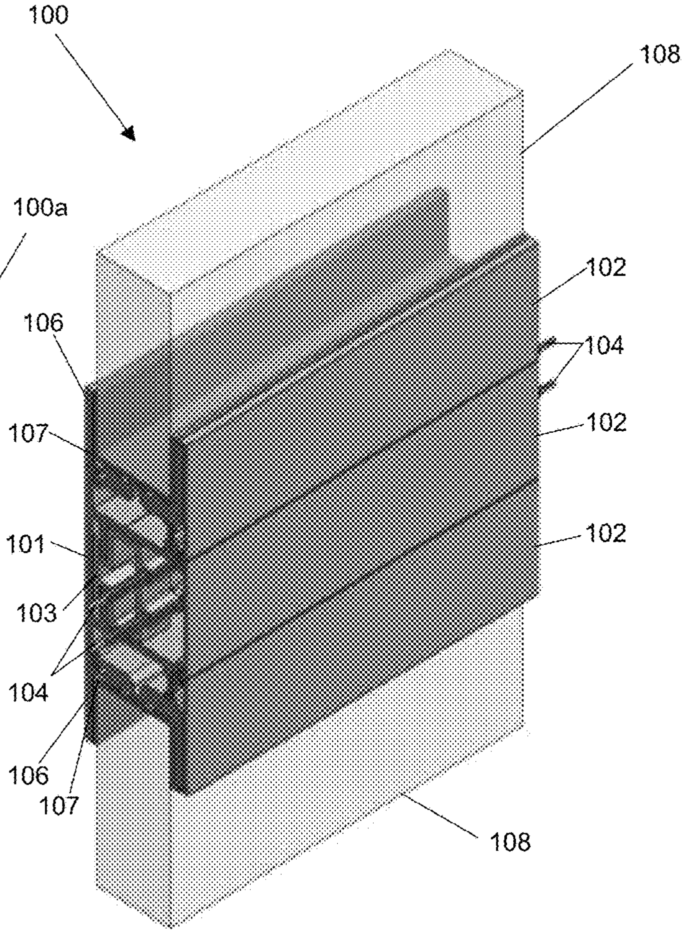
FIG. 1B illustrates the side perspective view of an ArmorPlast system, according to an aspect.

FIG. 1A illustrates the cross-sectional view of an ArmorPlast system 100, according to an aspect. FIG. 1B illustrates the side perspective view of an ArmorPlast system 100, according to an aspect. The ArmorPlast system Gen 2 ("ArmorPlast system", "AP system", "system" "security panel mounting system") 100 is a security panel mounting system that is configured to secure security panels 108 to the OEM ("original equipment manufacturer") mounting surface on a window, door or other suitable structure. It should be understood that the terms window and door may be used to describe any suitable structure on or within which the disclosed AP system 100 may be installed. The AP system 100 displayed in FIG. 1A-1B may utilize a support mullion 101 disposed between the two held security panels 108, and thus used to span an opening greater than the available security panel sizes, allowing the system to be built in several parts accommodating an extra-large opening. These two security panels ("glazing panels" "panels") may each be further supported by additional mounting equipment included as part of the AP system 100, such as mounting bars or starter mullions (not shown) to mount said panels directly to a window frame, door frame or other suitable structure (not shown). It should be understood that the term "security panel" may be used to describe any suitable glazing to be held within an ArmorPlast system 100, including but not limited to polycarbonate panels, insulated glass units and Riot Glass (RG) glass makeups. The support mullion 101 may attach to two different base profiles 106, in part through the utilization of base screws 109 configured to engage with both the base profile 106 and the support mullion 101. A shock gasket 107 may be disposed within each base profile 106, through its insertion into a gasket slot (not shown) disposed within the base profile 106. The shock gaskets 107 and their corresponding base profiles 106 may be configured to hold panels 108 of a variety of thicknesses, ranging from AP25 thickness panels (about 0.25 inch thick) to AP125 panels (about 1.25 inches thick), and beyond, based on application needs. A mullion sheer block 103 may be disposed within the support mullion 101 and attached to said support mullion 101 through the usage of mounting screws 105 that travel through support mullion 101 and into opposite sides of the mullion sheer block 103. Sheer block ports, such as sheer block ports 603*c* of FIG. 6F, disposed within the sheer block 103 may be adapted to house sheer block screws 104. Said sheer block screws 104 may be configured to attach the sheer block 103 to an adjacent mounting surface, such as the OEM mounting surface, to support an attached mullion by said mounting surface. The sheer block 103 may act as an anchor to connect a centrally disposed center mullion, such as support mullion 101, to surrounding mounting surface, or may be disposed between two or more separate mullion section to facilitate their interconnection, by having mounting screws connecting each mullion to the sheer block, as described herein. The mounting surface of a window, door or other structure may be the portion of the window, door or structure surrounding where a glazing panel is intended to be placed that comes into direct contact with a mounting unit of the AP system 100, such as mounting surface 320*a* of storefront 320 in FIG. 3B. A snap cover 102 may be attached to each base profile 106 and each support mullion 101, as well as any starter mullions or splicer mullion, such as starter mullion 614 of FIG. 6E and splicer mullion 1122 of FIG. 11A, using snap cover securing ridges (not shown) disposed on each, in order to provide a desired visual appearance for the interior facing surface 100*a* of the ArmorPlast system 100, as well as securely cover internal elements. Upon attachment of the snap cover 102 to a suitable surface of the AP system 100, it may not be removable without destroying or damaging said snap cover 102, and therefore may act as a first line of defense in protecting the covered internal elements. This brief overview of the components of the ArmorPlast system 100 will be expanded upon hereinbelow.

The ArmorPlast system 100 may be configured to hold different types of glazing panels, though said glazing panels will need to be the appropriate thickness to be accommodated by a correspondingly sized shock gasket 107 and base profile 106. Different types of glazing panels may include all polycarbonate panels and Riot Glass glass panels, as well as any other suitable security panels 108. The type of security panel 108 used should be decided based upon the application of the ArmorPlast system, wherein thicker panels are generally harder to break and afford greater protection.

The ArmorPlast system 100 may be provided in two different strength grades. A medium duty, non-ballistic grade ArmorPlast system, such as ArmorPlast system 500 of FIG. 5A, may be suitable in applications that do not require protection from ballistics or other highly destructive damage mediums. The medium duty ArmorPlast system may only have one size of base profile that is configured to hold shock gaskets corresponding to AP25, AP375 and AP50 panels. The heavy duty, ballistic grade ArmorPlast system, such as ArmorPlast system 400 of FIG. 4A, may be suitable for applications in which damage from ballistics and other highly destructive damage mediums is anticipated. The grade of ArmorPlast system selected for specific applications may be based upon the panel thickness required for said application. The components of the ArmorPlast system 100 for the ballistic grade and non-ballistic grade configurations will be discussed in greater detail hereinbelow.

The ArmorPlast system 100 may be implemented within either a window frame, door frame or other suitable structure. For conversion-based applications, the preexisting glazing within the structure may be replaced by an ArmorPlast system 100 holding a glazing panel 108 of the desired thickness. The ArmorPlast system 100 may be oriented within the structure such that the interior surface 100*a* of the AP system 100 is inside the room/building/structure (safe side) that is being protected. As a result of this, the base screws 109 that are covered by the snap cover 102 may only be accessed from inside said room/building and may not need to be tamper resistant.

For storefront-based applications, the preexisting glazing may be left in place, with the panels held by the ArmorPlast system 100 simply covering or being placed adjacently to the preexisting glazing. This storefront-based ArmorPlast system 100 may be disposed on either the interior side ("back glazing") or the exterior side ("overglazing") of the preexisting glazing. It may be necessary to use tamper resistant screws ("proprietary security screws" "security screws") when installing the ArmorPlast system 100 on the exterior side of the structure in a storefront based assembly, as certain internal elements, such as the base screws 109, may be more easily accessed from the outside, upon potential destruction or removal of the snap covers 102. Such a tamper resistant base screw 109 may utilize a unique or uncommon shape of drive (the hole in which the screw bit is inserted to rotate the screw) on the screw head in order to make removal of the screw impossible or extremely difficult with conventional tools. Dealers responsible for installation and maintenance may possess a key having a proper drive shape to allow for authorized manipulation of any tamper proof screws used in the AP system 100. The AP system 100 used in storefront based applications may have a design feature such as desiccant slot, such as desiccant slot 315*g* of base mount 315 in FIG. 3B, to allow for the storage of a desiccant material, such as conventional silica gel, to prevent fogging or condensation between the preexisting glazing 321 and the panel 308 of the AP system 300.

The disclosed ArmorPlast system 100 may be retrofitted into or onto an existing window frame, door frame or other suitable structure and be used to provide a secondary glazing over a preexisting glazing, or may replace said preexisting glazing, depending on the application. The usage of the ArmorPlast system 100 to provide a secondary glazing may be necessary in applications in which removal of the existing glazing is not possible or allowable, such as when being installed within a rental property.

As shown in FIG. 1A-1B, a support mullion 101 may be disposed between two panels 108 within a structure. The usage of a support mullion 101 will allow the ArmorPlast system 100 to span a structure mounting surface that exceeds the maximum size of a singular glazing panel 108. For example, an application may require a window/door glazing panel to be 120"×120", while the largest panel available may only be 72"×120". The support mullion 101 may be disposed between two smaller panels 108 such that the two panels and the centrally disposed support mullion may now span the 120"×120" mounting area. For applications in which a single glazing panel 108 may span the gap within a structure frame, support mullions 101 may not be required, and only starter mullions, such as heavy duty starter mullion 614 of FIG. 6E, and/or mounting bars, such as heavy duty mounting bar 612 of FIG. 6C, may be needed. Support mullions 101 may be used to support the glazing panels from central portions of a frame, while starter mullions, base mounts and support bars, such as heavy duty starter mullion 614 of FIG. 6E, base mount 315 of FIG. 3B, and heavy duty support bar 612 of FIG. 6C, may be used to support the glazing panels through being directly mounted to the OEM mounting surface of the surrounding structure frame. In general, an AP system may be comprised of a mounting unit configured to attach to a mounting surface; a securing unit, such as a base profile, configured to attach to the mounting unit to form a base fixture; a shock gasket configured to nest within the base fixture, wherein the shock gasket is configured to secure a security panel within the base fixture; and a cover configured to engage with the base fixture.

Figure 2A:
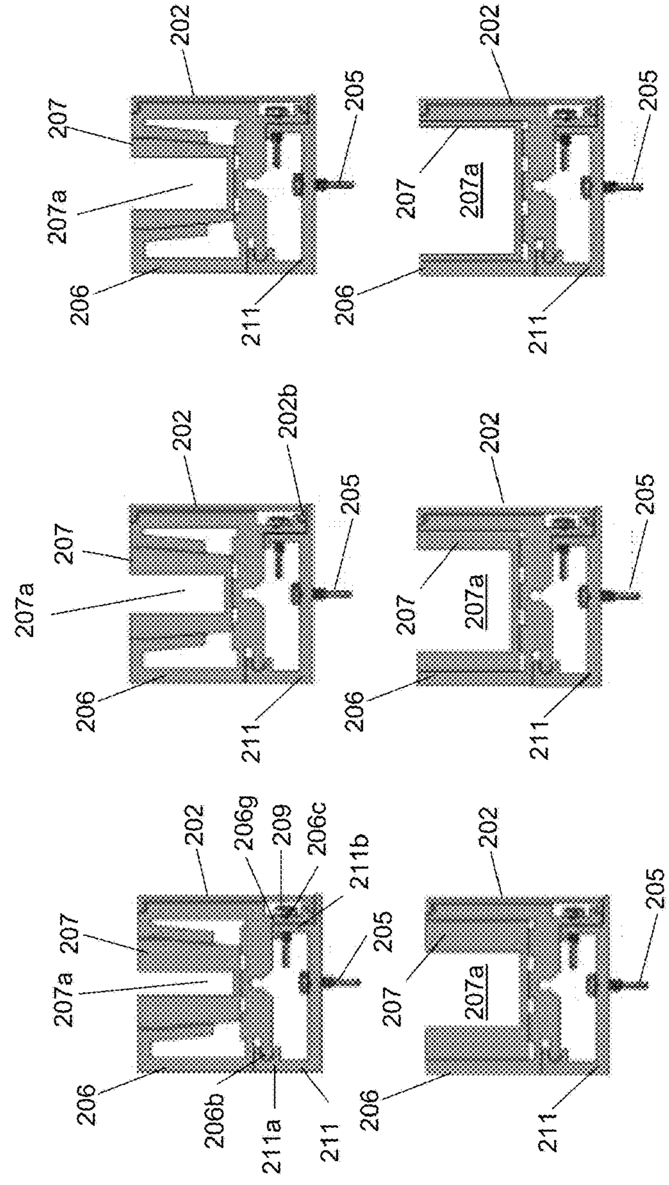
FIG. 2A illustrates the cross-sectional view of a plurality of base profiles, each base profile having a nested shock gasket of a different size specification, according to an aspect.
Figure 2B:
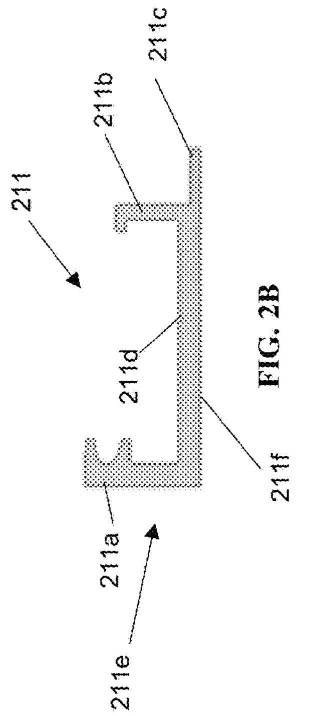
FIG. 2B illustrates the cross-sectional view of a conversion mounting bar, according to an aspect.

FIG. 2A illustrates the cross-sectional view of a plurality of base profiles 206, each base profile 206 having an attached conversion mounting bar 211 and a nested shock gasket 207 of a different size, according to an aspect. FIG. 2B illustrates the cross-sectional view of a conversion mounting bar 211, according to an aspect. The two different styles of base profile 206 and the six different sizes of shock gasket 207 may be implemented without using either type of mullion (starter or support) when used in certain applications. Each base profile 206 may be configured to attach to a conversion mounting bar 211 in order to facilitate its attachment of the AP system to a frame. The conversion mounting bar 211 may be a base component that can be used to convert the glass and glazing of a storefront to a security storefront. Mounting bars, such as the conversion mounting bar 211, starter mullions, such as heavy duty starter mullion 614 of FIG. 6E and base mounts, such as base mount 315 of FIG. 3B, may all be referred to as mounting units. Different mounting units may be selected based on the intended attachment surface of the ArmorPlast system. The plurality of base profiles 206 illustrated in FIG. 2A are each outfitted with conversion mounting bar 211, with said conversion mounting bar 211 being configured to secure its attached base profile 206 to a structure frame, as can be seen by conversion mounting bar 311 of FIG. 3A.

Certain mounting units, such as starter mullions and mounting bars, may be connected to a corresponding base profile 206 through two complementary attachment methods. Each of these mounting units may have a mounting slot configured to receive a mounting leg from a base profile, while also having a support leg configured to contact the base profile to support the gasket slot, such as gasket slot 606*a* of base profile 606 in FIG. 6A, and allow a base screw 209 to be threaded through both a base screw slot 206*c* on the base profile 206 and the support leg 211*b*, further securing the base profile 206 and mounting unit together. In an embodiment, conversion mounting bar 211 may be attached to base profile 206 through engagement of mounting leg 206*b* on the base profile 206 with a mounting slot 211*a* on the conversion mounting bar 211. In the same embodiment, a base screw 209 may be threaded through a base screw slot 206*c* in a junction leg 206*g* disposed on the base profile 206 and a support leg on the conversion mounting bar 211, further securing the base profile 206 and the conversion mounting bar 211 together. The conversion mounting bar 211 may be mounted directly to a structure frame in order to facilitate attachment of an ArmorPlast system to said structure. The conversion mounting bar 211 may be comprised of a mounting slot 211*a*, a bar base 211*f* disposed below the mounting slot, a support leg 211*b* disposed above the bar base 211*f*, a cover leg 211*c* extending from the bar base 211*f* and one or more mounting screw slots 211*d* disposed within the bar base 211*f*.

Figure 3A:
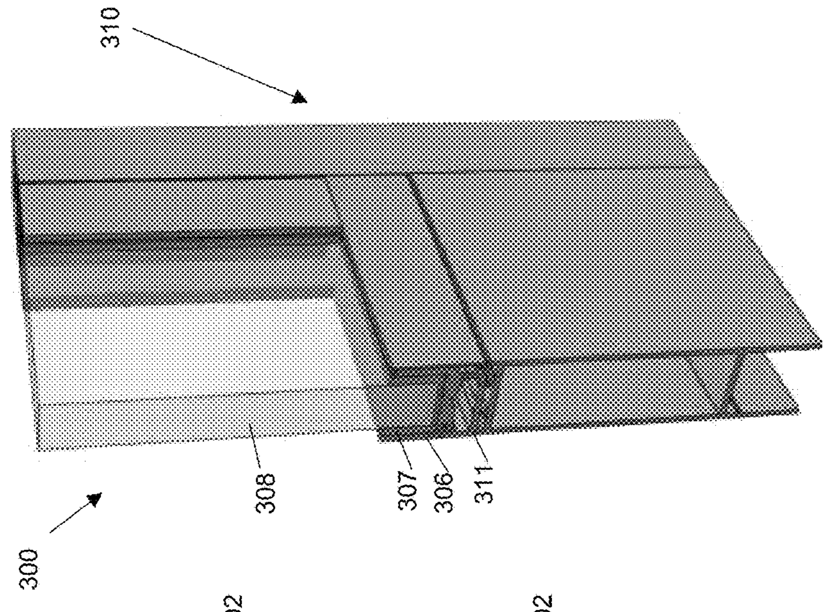
FIG. 3A illustrates the perspective cross-sectional view of an aluminum door fitted with an ArmorPlast system, according to an aspect.
Figure 3B:
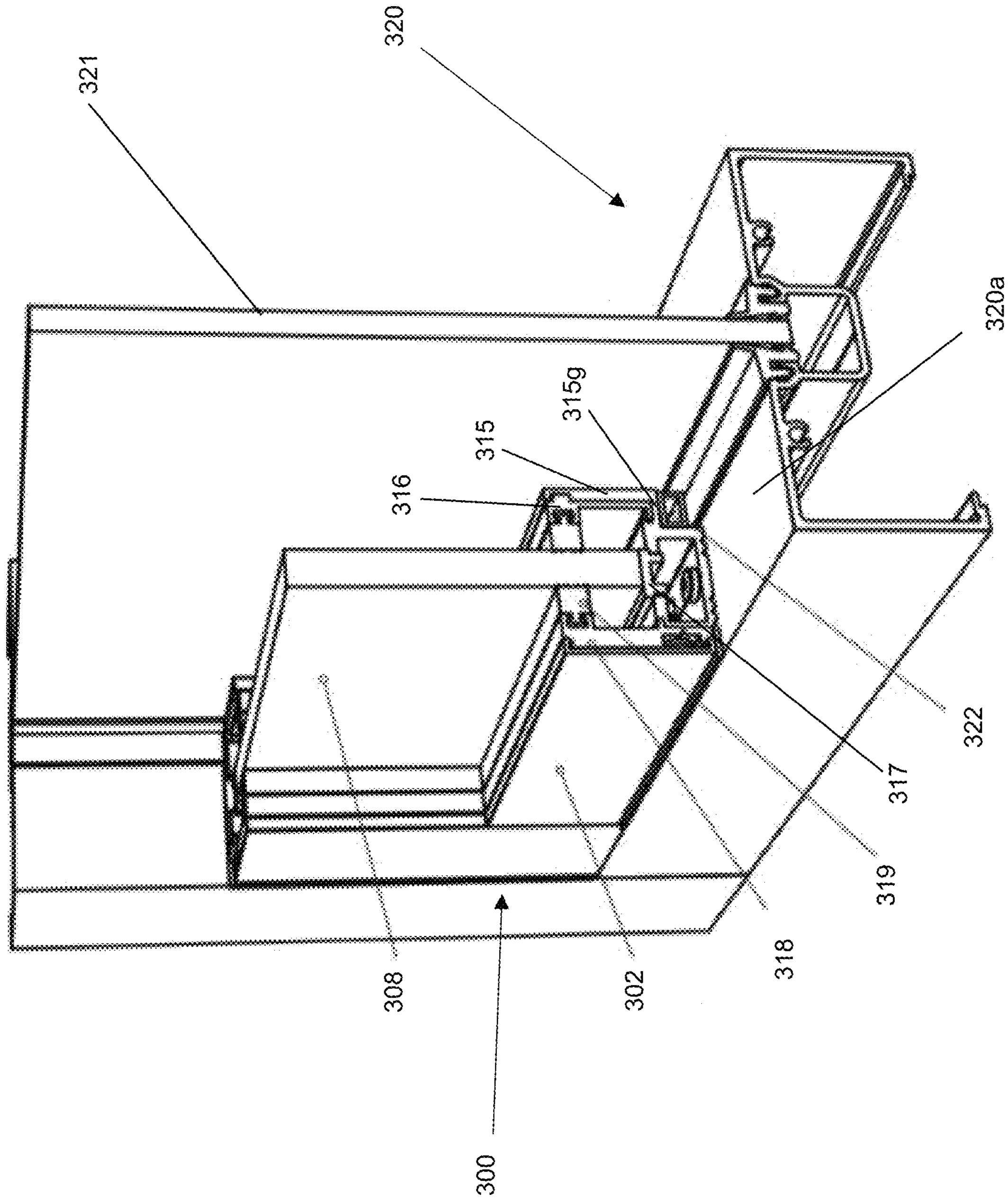
FIG. 3B illustrates the perspective cross-sectional view of storefront having a preexisting glazing with an ArmorPlast system, according to an aspect.

The other types of mounting units, such as base mount 315 of AP system 300 or FIG. 3B, may be configured to engage with a pressure plate, such as pressure plate 316 simply through utilization of a base screw. The pressure plates and the base profiles utilized to secure a glazing panel to a mounting unit may be categorized as securing units. The combination of a mounting unit with its complementary securing unit may be defined as a base fixture and be configured to attach to gaskets and other components in order to facilitate securing of a security panel to a window or door frame.

The nested shock gaskets 207 may be configured to hold a variety of security panels, each security panel having a different thickness. Shock gaskets 207 may be configured to hold AP25 (¼"), AP375 (0.375"), AP50 (½"), AP75 (¾"), AP100 (1") or AP125 (1¼") panels. Alternatively configured shock gaskets may be constructed to house security panels of different thicknesses, based upon the needs of an application. The medium duty AP system may only be configured to hold AP25, AP375 or AP50 compatible shock gaskets 207 while the heavy duty AP system may be configured to hold all shock gaskets 207 discussed herein. The shock gaskets 207 may be made of rubber, in order to allow for the expansion and contraction a held panel, as the result of changes in ambient conditions, or other conditions, to prevent the panel from bending or warping as a result of said changes. The rubber material used for the shock gaskets 207 may also help absorb some of the shock from an impact, reducing the shock experienced by the panel itself The conversion mounting bar 211 may be unique to conversion-based AP systems, and thus may be omitted from storefront based AP systems. The mounting slot 211*a* is configured to engage with and secure a mounting leg 206*b* of a base profile 206. The support leg 211*b* may be disposed below the shock gasket 207 and be configured to run adjacently with a junction leg 206*g* on the base profile, such that a base screw 209 may be screwed through a base screw slot 206*c* on the junction leg 206*g* and the support leg 211*b*, further securing the base profile 206 to the conversion mounting bar 211. A cover leg 211*c* may extend from the conversion mounting bar 211 such that it is below the support leg 211*b*. A snap cover edge 202*b* of an installed snap cover 202 may be disposed between the cover leg 212*c* and the corresponding snap cover securing ridge 206*d* on the base profile 206, as seen in FIG. 2A.

FIG. 3A illustrates the perspective cross-sectional view of an aluminum door fitted with an ArmorPlast system 300, according to an aspect. As described hereinabove, the ArmorPlast system 300 may be installed as either a "conversion based system" or a "storefront based system". The ArmorPlast system 300 of FIG. 3A depicts a conversion based system in which said ArmorPlast system 300 is installed within an aluminum door 310. One of the features that differentiates an AP storefront system from an AP conversion system is that an AP conversion system removes and replaces the preexisting glazing with a security panel 308 held by the ArmorPlast system 300. This allows the panel 308 to be the only glazing element disposed within the door 310. As can be seen, a proper mounting unit in the form of conversion mounting bar 311 may be mounted to the door 310 in order to facilitate attachment of base profile 306 of the AP system 300 to the door 310. Certain components, such as the conversion mounting bar 311 of the AP system 300 of FIG. 3A, may be unique to the conversion-based AP systems. The AP conversion system may not be configured to utilize AP25 panels for door-based applications, as such panels may be too thin or light to provide the desired durability to a structure such as a door. Each AP system 300 allows for the utilization of security panels that may not fit within a preexisting glazing pocket disposed within the mounting surface.

FIG. 3B illustrates the perspective cross-sectional view of storefront 320 having a preexisting glazing 321 within an ArmorPlast system 300, according to an aspect. The AP storefront system 300 of FIG. 3B may also include features intended to help keep the preexisting glazing 321 and newly included panel 308 in proper condition. The disclosed AP storefront system of FIG. 3B may have a built-in desiccant slot 315*g* to allow desiccant filled metal strip 322 to be placed in between the original, preexisting glazing 321 and the newly added security panel 308 of the AP system 300. This desiccant slot 315*g* may be important in maintaining the desired humidity conditions of the AP storefront system 300 as inter-glazing fogging may occur as a result of moisture being trapped between the original glazing 321 and the panel 308 if a desiccant is not provided there. The desiccant slot 315*g* may house a desiccant stored within a metal strip 322, or another form of desiccant, in a discrete manner to allow for a seamless, factory look for the AP storefront system, without allowing fogging to occur between the preexisting glazing 321 and the security panel 308 of the AP storefront system 300. The alternatively designed AP system 300 shown in FIG. 3B may be comprised of different individual components than the above AP system 300 shown in FIG. 3A, the former being comprised of a base mount 315, a pressure plate 316, a universal bottom gasket 317, a reducer bracket 318, two narrow gaskets 319, and a snap cover 302, with said former AP system 300 of FIG. 3B being described as an "alternative" design for an AP system. The base mount 315 may be categorized as a mounting unit, much like mounting bar 311. The difference between the design of AP system 300 of FIG. 3A and the alternative design of AP system 300 of FIG. 3B will be described in greater detail hereinbelow.

With either the storefront AP system or the AP conversion system, the mounting unit used to secure the AP system to the mounting surface 320*a* of the storefront 320 or door 310, such as mounting bar 311 or base mount 315, may connect to the mounting surface 320*a* such that the panel 308 is completely surrounded by the mounting unit, including it various sections as applicable, which itself is nested within the door 310 or storefront 320. The mounting unit may be composed of separate mounting unit sections, such that a separate section of mounting unit is used to attach to the top, bottom and each side of a standard rectangular frame. Alternative frame shapes, including circular and octagonal frames may also be accommodated for by arranging straight mounting units sections into the corresponding shape, or by utilizing curved mounting unit sections to accommodate circular or rounded mounting surfaces. The resulting combination of the various sections of the mounting unit may together be referred to as a mounting unit, for simplicity. The same may also be said for all mullions, support bars, base mounts, base profiles, pressure plates, shock gaskets, sheer blocks and snap covers, as well as any other element requiring multiple sections, wherein a plurality of sections of the respective component may be referred to simply by its singular term, as a result of their combination as part of the structure of an AP system. Alternatively, the aforementioned components may each be provided as singular monolithic pieces that are already appropriately sized to fit in the desired window/door to support a security panel 308. Otherwise, said components may be provided in sections and installed within a storefront 320 or door 310, piece by piece, such that upon completion, the installed panel 308 is secured within the AP system 300 by the perimeter of said panel 308, which is held within a surrounding shock gasket, securing unit, and mounting unit. As discussed hereinabove, a support mullion may also be disposed within the perimeter formed by the mounting unit, such that it attaches to and bisects, or otherwise divides, the area formed within the perimeter of the mounting unit, to facilitate the securing of multiple glazing panels within the window, door or other structure.

Figure 4A:
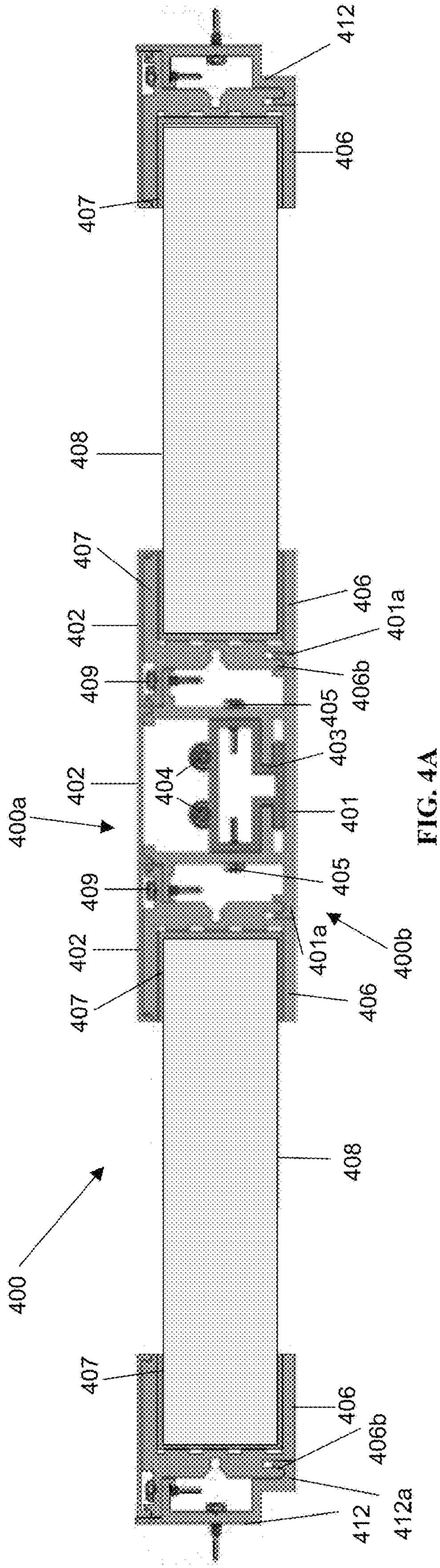
FIG. 4A illustrates the cross-sectional view of an ArmorPlast system suitable for ballistic applications, according to an aspect.
Figure 4B:
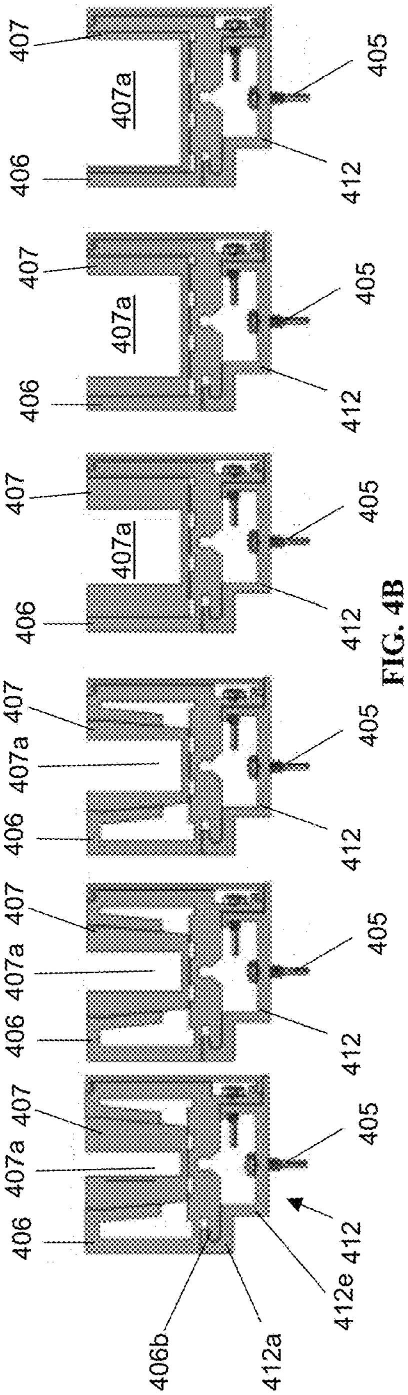
FIG. 4B illustrates the cross-sectional view of a plurality of base profiles intended for use within ballistic ArmorPlast systems, according to an aspect.

FIG. 4A illustrates the cross-sectional view of an ArmorPlast system 400 suitable for ballistic applications, according to an aspect. FIG. 4B illustrates the cross-sectional view of a plurality of base profiles 406 intended for use with ballistic ArmorPlast systems 400, according to an aspect. With its robust design and ability to secure glazing panels of thicknesses up to that of an AP125 panel, the ballistic grade ArmorPlast system 400 of FIG. 4 is designed to be used in ballistic or other heavy-duty applications. The components of this ballistic grade/heavy-duty ArmorPlast system 400 may differ from the non-ballistic grade/medium duty variant. Said differences will be discussed in greater detail hereinbelow.

The ArmorPlast system 400 shown in FIG. 4A, may utilize a support mullion 401 in order to have two separate glazing panels 408 attached to the same AP system 400. As can be seen from the provided cross sectional view, the AP system 400 may be designed symmetrically, having a centrally disposed support mullion 401 disposed between two frame mounted base profiles 406, wherein each base profile 406 is fitted with a shock gasket 407 that is configured to hold a glazing panel 408. Each glazing panel may be secured to a window or door surface by a starter mullion or support bar (not shown) in the same manner that said panel 408 is attached to the support mullion 401, as seen by the attachment of the AP system 300 to door 310 in FIG. 3A, in order to attach the AP system 300 to a mounting surface of a window or door. A sheer block 403 may be disposed within the support mullion 401 (or starter mullion) in order to provide internal structure and rigidity to the support mullion 401 to prevent said support mullion 401 from being deformed by an applied force. The sheer block 403 may be attached to the support mullion 401 by mounting screws 405, as well as by complementary securing geometry disposed on the sheer block 403 and support mullion 401. The heavy duty mounting bars 412 may be secured to the mounting surface (not shown) through the usage of mounting screws 409 threaded through said mounting bar 412 and into the mounting surface. As described previously, the sheer block screws 404 may be used to secure a sheer block 403 directly to an adjacent mounting surface to allow the sheer block 403 to provide an anchor point for a center mullion, such as support mullion 401. The base profiles 406 may each be secured to the support mullion 401 by one or more base screws 409, as well as interlocking structures engaged between the base profile 406 and support mullion 401. Each shock gasket 407 may be configured to be secured or nested within a corresponding shock gasket slot (not shown) on the base profile 406, while securing a corresponding glazing panel 408 within its panel slot 407*a*. Snap covers 402 may be used to cover the interior facing surface 400*a* of the heavy duty AP system 400 of FIG. 4A, by attaching to base profile 406 and the support mullion 401. Both the interior facing surface 400*a* and the exterior facing surface 400*b* may be flat and parallel with each other, which may be desirable in establishing a stable physical structure and uniform visual aesthetic.

Various base profile 406 and shock gasket 407 configurations possible within a heavy duty AP system 400 are displayed in FIG. 4B. As can be seen, the base profiles 406 utilized in heavy duty AP systems 400 may be configured to hold AP25, AP375, AP50, AP75, AP100 or AP125 compatible shock gaskets for the securing of the six different thicknesses of panel that are compatible with it. Additionally, each base profile 406 is configured to engage with a heavy duty mounting bar, which may be used to mount the AP system directly to a window or door surface. The heavy duty mounting bar 412 may have a desiccant slot 412*e* that provides a location in which a desiccant filled metal strip 322 or other desiccant material may be stored on the base profile 406. This desiccant slot 412*e* may only be provided in applications in which a desiccant is needed within the AP system, such as when implementing an AP system over an existing glazing, as seen in FIG. 3B, as part of an AP storefront system.

As can be seen by the attachment of the base profiles 406 to the heavy duty mounting bars 412 and support mullion 401, the structures disposed on the exterior facing surface 400*b* of the AP system 400 are intentionally made tamper resistant. While the base screw disposed on the interior facing surface 400*a* may be manipulated through utilization of a proper tool, the exterior facing connection between the base profile 406 to the heavy duty mounting bar 412 has no such manipulatable structure. The insertion of a mounting leg 406*b* on the base profile 406 into a mounting slot 412*a* on the heavy duty mounting bar 412 creates a surface with no interactable elements, making manipulation of the AP system 400 from this exterior surface 400*b* exceedingly difficult. This same interconnection method may be utilized between the support mullion 401 and each attached base profile 406, wherein a mounting leg 406*a* on a base profile 406 is inserted with each mounting slot 401*a* on the starter mullion 401. Without a suitable interaction point, the exterior surface 400*b* of the AP system 400 is intentionally designed to resist disassembly from an externally positioned entity, while be physically resilient enough to also prevent destruction of the AP system 400 via impact. The same interactions may also be seen in the medium duty AP system 500 of FIG. 5A discussed below.

The process for installing the disclosed AP system 400 of FIG. 4A into a suitable structure may require the base profile 406 and its supported shock gasket 407 to be built around the panel 408 prior to its insertion into the mounting surface. This is a result of the base profile 406 being configured to support the held panel 408 simultaneously by both the interior and exterior surfaces of said panel, as well as each perimeter face of the panel. A mounting unit, such as heavy duty mounting bar 412, may be secured to the mounting surface through the usage of an applicable mounting screw 405. Beads of silicone sealant or another suitable sealant material may be applied between the mounting unit and the mounting surface prior to threading in the mounting screws 405 in order to both provide insulation and additional adhesion between the two materials. The base profile 406 and gasket 407 secured to the panel 408 may then be inserted into the mounting unit, such that the mounting leg 406*b* on the base profile engages with the mounting slot on the mounting unit, such as mounting slot 412*a* on heavy duty mounting bar 412. A base screw 409 may then be threaded through suitable structures on the base profile and mounting unit to facilitate secure attachment of the base profile to the mounting unit and thus the security panel(s) to the desired structure. Center mullions, such as support mullion 401 in FIG. 4A, may provide an intermediary mounting surface within a structure if the provided mounting surface is too large to be covered by a singular panel 408, with said center mullion interacting with the base profile surrounding the panel in the same way the mounting surface supported mounting units does; through engagement of a mounting leg 406*b* on the base profile with a mounting slot 401*a* on the support mullion 401, and threading of a base screw 409 through both components. This installation process may be utilized with all AP systems that utilize base profiles 406 as their securing unit. Alternative installation processes may be utilized for AP systems that utilize alternative designs for their securing unit.

Figure 5A:
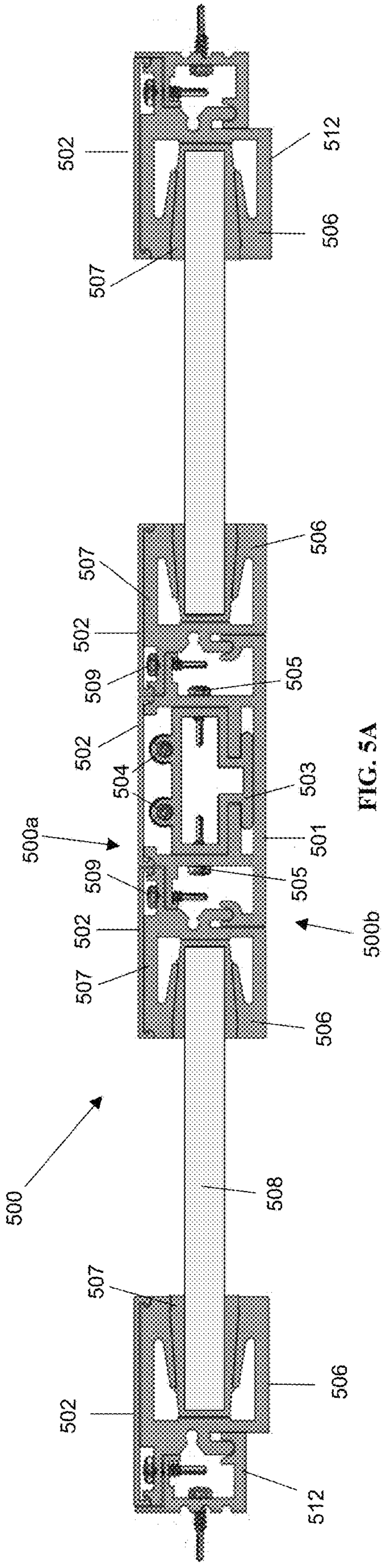
FIG. 5A illustrates the cross-sectional view of an ArmorPlast system suitable for non-ballistic applications, according to an aspect.
Figure 5B:
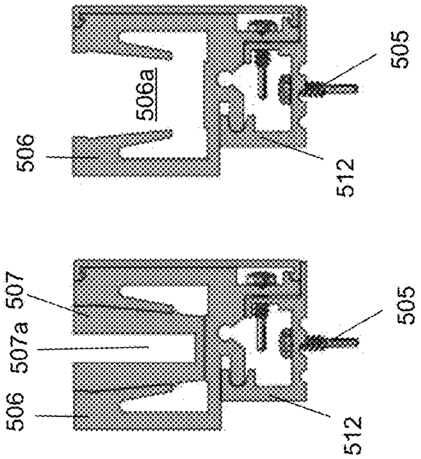
FIG. 5B illustrates the cross-sectional view of a plurality of the base profiles intended for use within non-ballistic ArmorPlast systems, according to an aspect.

FIG. 5A illustrates the cross-sectional view of an ArmorPlast system 500 suitable for non-ballistic applications, according to an aspect. FIG. 5B illustrates the cross-sectional view of a plurality of base profiles 506 intended for use with non-ballistic ArmorPlast systems 500, according to an aspect. While the medium duty ArmorPlast system of FIG. 5A may not be intended for ballistic applications, the way that its elements interconnect is largely the same as the aforementioned ballistic variant of the ArmorPlast system described hereinabove.

Much like the heavy duty ArmorPlast system of FIG. 4A, the medium duty ArmorPlast system may utilize a support mullion 501 in order to have two separate glazing panels 508 attached to the same ArmorPlast system 500. Also like the heavy duty AP system, the medium AP system 500 may be designed symmetrically, having a centrally disposed support mullion 501 disposed between two base profiles 506, wherein each base profile 506 is fitted with a shock gasket 507 configured to hold a panel 508. The medium duty AP system 500 may also utilize a sheer block 503 disposed within the support mullion 501 to provide more structure and sheer protection to said support mullion, as well as snap covers 502 to cover the interior facing surfaces 500*a* of the AP system 500 on the base profiles 506 and the support mullion 501. The interconnection of the various components of the medium duty AP system 500 may also be the same as those of the heavy duty AP system 400 of FIG. 4A.

The main differences between the heavy and medium duty AP systems may be a result of the components themselves, rather than how they interconnect. The heavy duty AP systems may utilize components having greater thicknesses, larger mounting surface interface area, more robust designs, and/or that are composed of stronger materials, in order to facilitate a stronger, more damage resistant system, potentially at the expense of using more material and/or being more expensive. Additionally, medium duty systems may only be configured to accept the base profile configured for AP25, AP375, AP50 panels. This may be because medium duty systems may not be suitably robust to take full advantage of thicker panels, which themselves would be more durable the medium duty AP system.

Figure 6A:
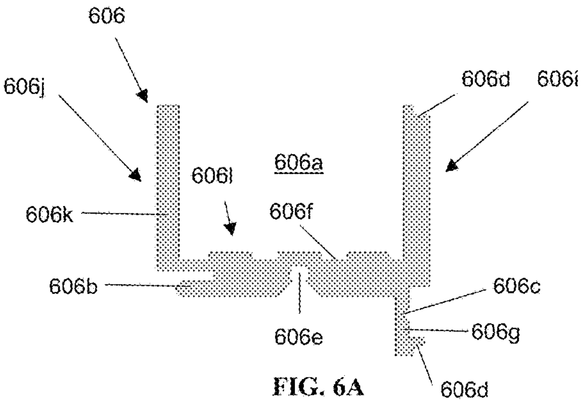
FIG. 6A-6P illustrate the cross-sectional views of ArmorPlast system components suitable for ballistic applications, according to an aspect.
Figure 6B:
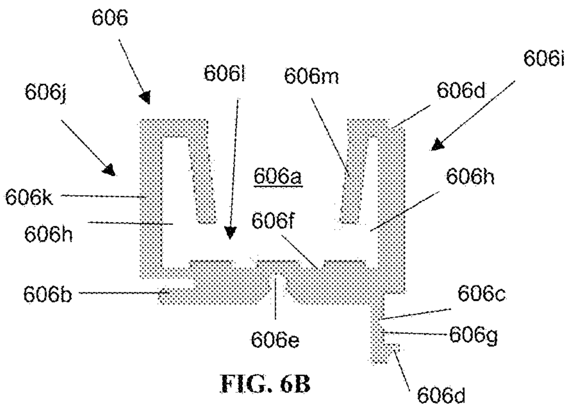
Figure 6C:
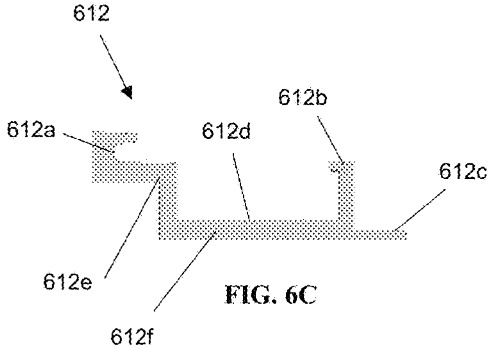
Figure 6D:
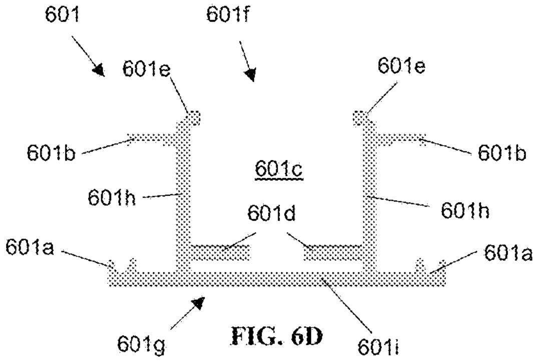
Figure 6E:
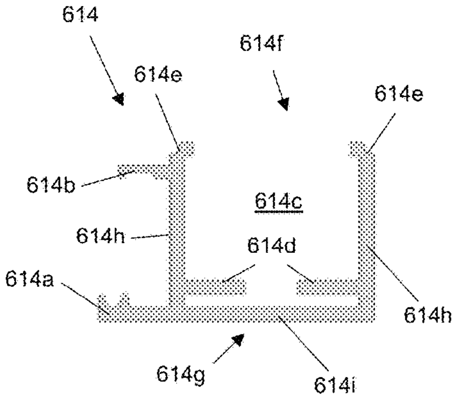
Figure 6F:
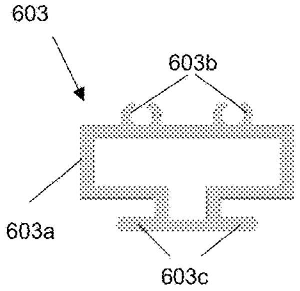
Figure 6G:
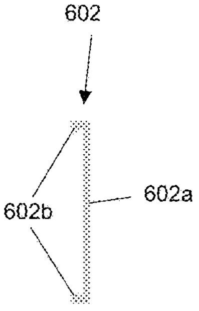
Figure 6H:
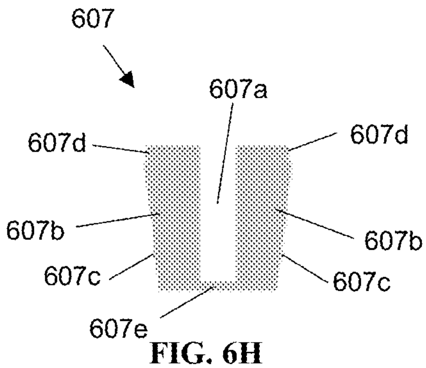
Figure 6I:
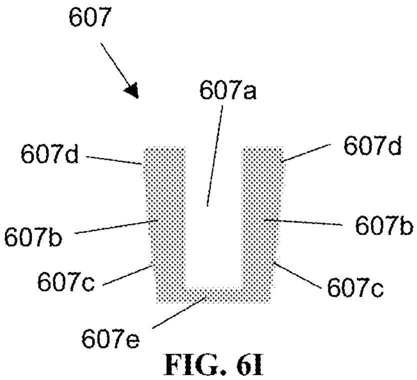
Figure 6J:
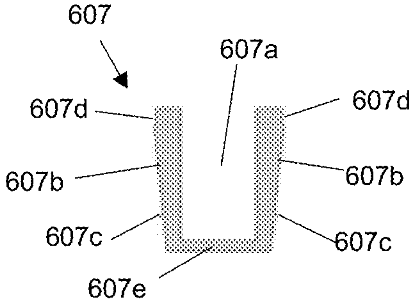
Figure 6K:
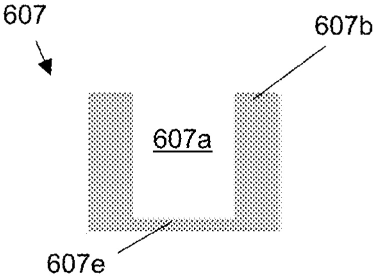
Figure 6L:
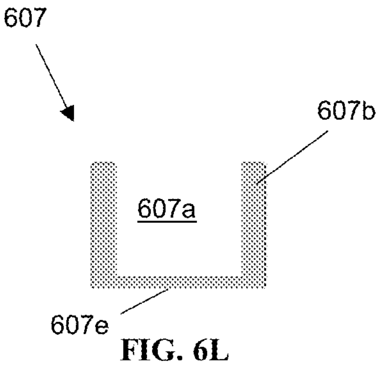
Figure 6M:
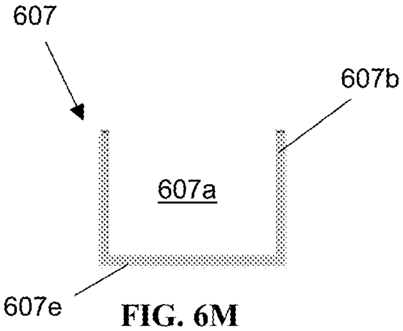
Figure 6N:
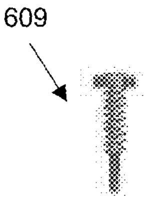
Figure 6O:
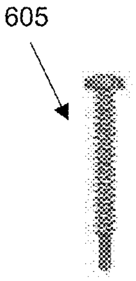
Figure 6P:
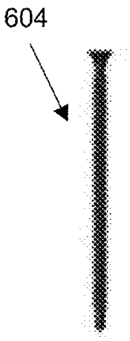

FIG. 6A-6P illustrate the cross-sectional views of heavy duty ArmorPlast system components suitable for ballistic applications, according to an aspect. The figures presented herein may not necessarily be presented to scale with other figures and may be resized to emphasize key elements. With the exception of gaskets and screws described herein, each component of the AP systems may be described as an extrusion. FIG. 6A and FIG. 6B illustrate cross-sectional views of base profiles 606 configured for use within ballistic or heavy duty applications, according to an aspect, wherein base profile 606 of FIG. 6A is configured to house an AP75, AP100 or AP125 compatible shock gasket 607, such those found in FIG. 6K, FIG. 6L and FIG. 6M, respectively, and base profile 606 of FIG. 6B is configured to house an AP25, AP375 or AP50 compatible shock gasket 607, such those found in FIG. 6H, FIG. 6I and FIG. 6J, respectively. All components detailed within the descriptions of FIG. 6A-6P are configured to operate as part of an ArmorPlast system designed for heavy duty or ballistic applications, unless otherwise noted. Said heavy duty base profile 606 may be comprised of a profile bottom 606*l* disposed between two profile legs 606*k*, a gasket slot 606*a* disposed above the profile bottom 606*l* and between the two profile legs 606*k*, a mounting leg 606*b* disposed below the gasket slot 606*a*, one or more base screw slots 606*c* disposed within a junction leg 606*g*, said junction leg 606*g* also being disposed below the gasket slot 606*a*, one snap cover ridge 606*d* disposed on the junction leg 606*j*, another snap cover ridge 606*d* disposed on a profile leg, wherein both snap cover ridges 606*d* are disposed on the interior facing surface 606*i* of the base profile 606, an exterior facing surface 606*j* on the opposing side of the base profile 606 to the interior facing surface 606*i*, a screw hole 606*e* disposed below the gasket slot 606*a* and between the mounting leg 606*b* and the junction leg 606*g*, and a plurality of gasket slot channels 606*f* disposed within the gasket slot 606*a*. The gasket slot 606*a* may be disposed within the base profile 606 to allow for the nesting of a shock gasket 607 within said base profile 606. The mounting leg 606*b* may be disposed on the exterior facing surface 606*j*, while the junction leg 606*g* and snap cover ridges 606*d* may be disposed on the interior facing surface 606*i*. The gasket slot 606*a* is configured to have a shock gasket 607 nested within it in order to facilitate the securing of a security panel to the heavy duty AP system. The base profile 606 of FIG. 6B may be further comprised of a tapered member 606*m* disposed on each profile leg 606*k* and a slot pocket 606*h* disposed between each tapered member 606*m* and the corresponding profile leg 606*k*, to use less material while still securing the smaller sizes of shock gasket 607. These tapered members 606*m* may be adapted to accommodate a tapered gasket, such as gasket 607 from FIG. 6H, 6I or 6J.

The mounting leg 606*b* disposed below the gasket slot 606*a* is configured to be inserted within and engage with a mounting slot, such as mounting slot 601*a*, 612*a* or 614*a*, disposed on a support mullion 601, mounting bar 612 or a starter mullion 614, respectively. Each base screw slot 606*c* may be disposed on the junction leg 606*g* of base profile 606 such that each base screw slot 606*c* and junction leg 606*g* is disposed adjacently to a support leg, such as support leg 601*b*, 612*b* or 614*b* disposed on a support mullion 601, mounting bar 612 or a starter mullion 614, respectively. A base screw 609 may be threaded through both a base screw slot 606*c* and the support leg. The insertion and engagement of the mounting leg 606*b* into a mounting slot and threading of a screw through a base screw slot 606*c* and the support leg may facilitate a secure attachment of the base profile 606 to an adjacent mounting unit, such as the aforementioned support mullion 601, mounting bar 612 or starter mullion 614. The mounting leg 606*b* may be disposed on the base profile 606 such that said mounting leg 606*b* is perpendicular with the exterior facing surface 606*j* of the base profile 606 and disposed closer to the exterior facing surface 606*j* than the interior facing surface 606*i* of the base profile 606. The positioning of the mounting leg 606*b* allows the exterior facing surface of an attached conversion mounting bar, such as exterior facing surface 211*e* of conversion mounting bar 211 in FIG. 2B, to align with the exterior facing surface 606*j* of the base profile 606 to form a flat exterior facing surface for the AP system, such as exterior facing surface 100*b* of AP system 100. The starter mullion 614 and the mounting bar 612 are configured to secure an attached base profile 606 to a window or door via attachment of the mounting bar 612 or the starter mullion 614 to the mounting surface of said window or door through the utilization of a mounting screws 605. Additionally, a silicone sealant may also be provided between a mounting unit and the mounting surface, in order provide additional adhesion between the two surfaces and superior insulation for the AP system.

The two snap cover ridges 606*d* disposed on the base profile may be utilized in order to secure a snap cover 602 over the interior facing surface 606*i* of the base profile 606 by being placed on the interior facing surface 606*i* of the profile legs 606*k* of the base profile 606. The securing of the snap cover 602 over the snap cover ridges 606*d* on each profile leg 606*k* may help not only to cover the base screw screws 609 threaded through both a base screw slots 606*c* and the support leg, but also may help maintain a desired appearance for the attached window. Comparable snap cover ridges may also be found on other components of the disclosed AP system, which will be discussed hereinafter. The described elements of the base profile 606 may be formed together as a singular monolithic structure in order to ensure stability.

The plurality of gasket slot channels 606*f* disposed within the gasket slot 606*a* may allow the base profile 606 to behave more rigidly to resist deformation, similarly to how corrugated materials are more rigid than flat materials of the same thickness, while still helping to absorb the shock of an impact to the AP system. The slot pockets 606*h* disposed in the gasket slot 606*a* of some base profiles 606 may also allow the base profile to use less material, while increasing the engagement area between the base profile 606 and the gasket 607, still providing the required structural stability to resist deformation in the event of an impact, and simultaneously absorbing some of the shock from said impact. The gasket slot channels 606*g*, slot pockets 606*h* as well as any other hollows, pockets and openings within the structure of the disclosed AP system components may be provided to allow for AP system to further accommodate expansion and contraction of the security panel and absorb impacts to the AP system. Screw hole 606*e* may be utilized in order to house a suitably positioned securing screw (not shown) in order to further secure the base profile 606 to an adjacent surface, such as a center mullion.

FIG. 6C illustrates a cross sectional view of a heavy duty mounting bar 612, according to an aspect, while FIG. 6D and FIG. 6E illustrate cross sectional views of a support mullion 601 and a starter mullion 614, respectively, according to an aspect. Support mullions, such as support mullion 601 of FIG. 6D, may also be classified as mounting units, as such support mullions may attach to the mounting surface, through the usage of sheer block screws 604 held by the internally disposed mullion sheer block 603, to secure the held panels in place. These mounting units may be used to secure an attached base profile 606 to a mounting surface or another base profile. The mounting bar 612 may be comprised of a mounting slot 612*a*, a bar base 612*f* disposed below the mounting slot, a desiccant slot 612*e* disposed between the mounting slot 612*a* and the bar base 612*f*, a support leg 612*b* disposed above the bar base 612*f*, a cover leg 612*c* extending from the bar base 612*f* and one or more mounting screw slots 612*d* disposed within the bar base 612*f*. The starter mullion 614 may be comprised of a mullion base 614*i* disposed between two mullion walls 614*h*, a mullion cavity 614*c* disposed between the two mullion walls 614*h* and above the mullion base 614*i*, a mounting slot 614*a* disposed on the exterior side surface 614*g* of a mullion wall 614*h*, a support leg 614*b* disposed on the interior side surface 614*f* of the same mullion wall 614*h*, a sheer block retainer leg 614*d* disposed on each mullion wall 614*h* within the mullion cavity 614*c* and two snap cover ridges 614*e* disposed on the interior facing surface 614*f* of the each mullion wall 614*h*. The support mullion 601 may be comprised of a mullion base 601*i* disposed between two mullion walls 601*h*, a mullion cavity 601*c* disposed between the two mullion walls 601*h* and above the mullion base 601*i*, a mounting slot 601*a* disposed on the exterior side surface 601*g* of each mullion wall 601*h*, a support leg 601*b* disposed on the interior side surface 601*f* of each mullion wall 601*h*, a sheer block retainer leg 601*d* disposed on each mullion wall 601*h* within the mullion cavity 601*c* and two snap cover ridges 601*e* disposed on the interior facing surface 601*f* of the each mullion wall 601*h*, wherein one mounting slot 601*a* and one support leg 601*b* are each disposed on opposite ends of the support mullion 601 and the mullion cavity 601*c* is disposed between said opposite ends. The starter mullion 614 may be nearly the same as the support mullion 601, wherein the starter mullion 614 omits the mounting slot 614*a* and the support leg 614*b* from one of the two mullion walls 614*h*, with the mullion wall 614*h* that lacks said elements being configured to be secured to the contact surface, either through use of a mounting screw 605 or other suitable methods.

The mounting slots 601*a*, 614*a* on a mullion may be disposed on the exterior facing surface 601*g*, 614*g* of said mullion, while the snap cover ridges 601*e*, 614*e* and support leg (s) 601*b*, 614*b* may be disposed on the interior facing surface 601*f*, 614*f* of said mullion. The mullion cavity 601*c* of the support mullion may be disposed between the two support legs 601*b*, such that the support mullion 601 is symmetrical. The two sheer block retainer legs 601*d*, 614*d* within each type of mullion cavity 601*c*, 614*c*, may be disposed on opposite side walls of said mullion cavity for both the support mullion 601 and the starter mullion 614. The cover leg 612*c* on a mounting bar 612 may extend toward the interior facing surface of the ArmorPlast system such that a snap cover edge 602*b* of an installed snap cover 602 is disposed between the cover leg 612*c* and the corresponding snap cover securing ridge 606*d*, as seen with the comparable elements in FIG. 2A. A desiccant slot 612*e* may be provided on the heavy duty mounting bar 612 below the mounting slot 612*a* in order to provide location for a desiccant material, such as desiccant filled metal strips 322 of FIG. 3B, to be placed, to prevent fogging between the panel and a preexisting glazing.

As described hereinabove, the mounting slots on these mounting units are configured to secure a mounting leg 606*b* from a base profile 606. The support legs of said mounting units may provide support to an above gasket slot 606*a*, while simultaneously providing a surface that may house a base screw 609 that travels through a base screw slot 606*c*. As described previously, the securing of a mounting leg 606*b* from the base profile 606 within a mounting slot (601*a*, 612*a*, 614*a*) of the mounting unit (601, 612, 614) and the threading of a base screw 609 screw through a base screw slot 606*c* and the support leg (601*b*, 612*b*, 614*b*) are configured to provide sufficient support to secure the base profile 606 to the mounting unit for attaching to a mounting surface within a structure.

Much like the base profile 606, the support mullion 601 and the starter mullion 614 may each be provided with two snap cover securing ridges, such as snap cover securing ridges 601*e* and 614*e*, respectively, in order to allow for the attachment of a snap cover 602 to each mullion unit or other applicable component. Said snap cover securing ridges 601*e*, 614*e* may be disposed on opposite sides of the interior facing surfaces 601*f*, 614*f* of the mullions 601, 614, such that upon attachment of a base profile 606 to a mullion 601, 614, attachment of a snap cover 602 to the base profile 606 and the attachment of a snap cover 602 to said mullion 601, 614, the installed snap covers 602 are adjacent to each other and planarly aligned on the interior facing surface of the AP system, as depicted in FIG. 1A-1B. This will help maintain the desired visual appearance of the ArmorPlast system based window or door, while securely covering the internal elements such as the base screws 609.

The main purpose of a support mullion 601, as well other types of center mullions, is to support a multiple security panel arrangement disposed within a mounting surface. The types of center mullions may be configured to be disposed between and secure two adjacent securing units, when utilizing multiple security panels for same window or door. For an AP system disposed within a frame, wherein said AP system is holding two separate panels, there may be a centrally disposed surface on each panel at which said panels are not being directly contacted or supported by the base fixture that is directly mounted to the mounting surface. A center mullion, such as support mullion 601, may be configured to attach to the base fixture and bisect the base fixture, such that the center mullion provides a mounting surface that allows for the supporting of the centrally disposed surfaces of each panel, allowing the AP system to support each panel by the entire perimeter of said panel. By supporting the entire perimeter of each panel, an AP system that utilizes a center mullion may use multiple panels within a singular frame without compromising structural integrity. Each center mullion provides a location for the mounting of a securing unit, which itself may vary based on the design of the AP system. The support mullion 601 provides a mounting surface and mounting unit to which a base profile may be secured.

The mounting bar 612 may be provided with a one or more mounting screw slots 612*d* disposed between the support leg 612*b* and the mounting slot 612*a* along its length, such that a mounting screw 605 may be threaded through each mounting screw slot 612*d*, in order to secure the mounting bar 612, and thus all attached elements, to mounting surface of a window/door. While not visible from the cross sectional view, the one or more mounting screw slots 612*d* may disposed along the length of the mounting bar, such that it attaches to the mounting surface at multiple points along its length, with said length running into and out of the page for each cross sectional figure. As discussed for the base profile 606, the mounting bar 612, support mullion 601 and the starter mullion 614, each component may be provided as singular, monolithic structure to help maintain the structural stability of the ArmorPlast system. Unless otherwise noted, each of the various components depicted in FIG. 6A-7K may each be provided as singular, monolithic structures. With the exception of the gaskets (319, 607, 707, 807, etc.) all of the components of the ArmorPlast system may be comprised of aluminum, steel, plastic or another suitable material to attain the required structural strength, durability and damage resistance. Each component described herein may be formed through an extrusion process or other suitable manufacturing process know in the industry.

FIG. 6F illustrates the cross-sectional view of a mullion sheer block 603, according to an aspect. The mullion sheer block 603 may be comprised of a sheer block body 603*a*, two sheer block ports 603*b* disposed on one end of the sheer block body 603*a* and two sheer block engaging legs 603*c* disposed on the opposite end of the sheer block body 603*a*. The sheer block 603 is configured to fit within a mullion cavity 601*c*, 614*c* such that the sheer block retainer legs 601*d*, 614*d* are disposed between the sheer block body 603*a* and corresponding sheer block engaging legs 603*c*, allowing the internally disposed mullion sheer block 603 to provide structural rigidity and support to the surrounding mullion 601, 614. The sheer block ports 603*b* are configured to house sheer block screws 604, wherein said sheer block screws 604 are configured to run along the length of the mullion from within said mullion, as depicted by sheer block screws 104 disposed within the support mullion 101 of FIG. 1B. These sheer block screws 604 may be used to connect a sheer block 603 to a mounting surface, such as the aforementioned storefront mounting surface 320*a* of FIG. 3B, to allow engagement of the associated center mullion with a surrounding mounting structure. Mounting screws 605 that engage within ports (not shown) within the sheer block 603 and the surrounding mullion may be used to secure the sheer bock 603 within a mullion, as seen by mounting screw 105 of FIG. 1A. This sheer block 603 may be universal to all AP system designs and used in all AP systems as needed. The sheer block 603 may be used to attach a center mullion to a mounting surface or may also be used to connect mounting units to other mounting units, as applicable.

FIG. 6G illustrates the cross sectional view of a snap cover 602, according to an aspect. As described previously, a snap cover may be attached to support mullions 601, starter mullions 614 or base profiles 606 by their respective snap cover securing ridges (601*e*, 614*e*, 606*d*). Snap covers 602 may be configured to cover all types of base fixtures described within the application, as well as any structure having suitable snap cover securing ridges. The snap cover may be comprised of a snap cover body 602*a*, and two snap cover edges 602*b*, each snap cover edge 602*b* disposed on an opposite end of the snap cover body 602*a*. The snap cover body 602*a* is appropriately sized such that each snap cover edge 602*b* may be engaged with a corresponding snap cover securing ridge on a mullion, base profile or other suitable structure. As discussed hereinabove, the snap cover 602 may be used to both protect and hide internally disposed system components, such as base screws 609, sheer block screws 604 screws and the sheer block 603, while maintaining the visual aesthetic of the interior facing surface 100*a* the ArmorPlast system 100 it is installed upon. By covering the base screws 609 installed within a base fixture, a security measure is implemented that may further dissuade potential break in attempts. Much like the sheer block 603, the snap cover 602 may also be universal to all AP systems, with the same design of snap cover 602 being used regardless of the AP system's design. After engagement with the corresponding components of an AP system, a snap cover 602 may not be easily removable and may require the snap cover 602 to be damaged or destroyed to access the internal elements that it may cover. Variations of the snap cover that do not use the described snapping mechanism may also be implemented, wherein said the element will be referred to simply as a cover. Such variations will require suitable structures to accommodate their attachment to the formed base fixture as needed.

It should be noted that the function of the snap cover 602, as well as any suitable variant, is primarily as a security measure and secondarily as an aesthetic element. The security measure aspect of snap cover 602 comes from the fact that it covers elements what may appear to be vulnerability points, such as the base screws 609, that would otherwise be externally visible when the AP system is installed between the exterior of a window/door and a preexisting glazing. While said base screws 609 used in this embodiment would be tamper resistant, an attempt at disassembly may be prevented as a result of covering what might be seen as a vulnerability point(s). By hiding apparent vulnerability points and creating a unified visual appearance free of manipulatable components, break-in attempts may be discouraged or fully dissuaded. Any description of the aesthetic function or design of the snap cover 602, such as providing a clean, factory-installed visual appearance, should be considered secondary to the provided security function of said cover 602 as described hereinabove.

FIG. 6H-6M illustrate the cross sectional views of a plurality of shock gaskets 607, each of the shock gaskets 607 being configured to secure a glazing panel of a different thickness, according to an aspect. Each shock gasket 607 may be comprised of a gasket bottom 607*e* disposed between two gasket legs 607*b* and a panel slot 607*a* disposed above the gasket bottom 607*e* and between the gasket legs 607*d*. The panel slot 607*a* is disposed within the shock gasket 607 in order to facilitate the securing of the panel within said shock gasket 607, and thus the AP system. FIGS. 6H, 6I & 6J illustrate shock gaskets 607 intended for use with base profile 606 of FIG. 6B, and are configured to secure AP25 panels, AP375 panels and AP50 panels respectively. Additionally, the shock gaskets 607 of FIGS. 6H, 6I & 6J may be further comprised a locking ridge 607*c* disposed on an outside surface of each gasket leg 607*b*, wherein said locking ridges 607*c* are configured to engage with the aforementioned tapered members 606*m* disposed within the gasket slot 606*a*, and angle breaks 607*d* disposed at the interior facing portions of each gasket leg that are configured to facilitate a more secure nesting of the shock gasket 607 within the gasket slot 606*a* of the base profile 606. FIGS. 6K, 6L & 6M illustrate shock gaskets 607 intended for use with base profile 606 of FIG. 6A, and are configured to secure AP75 panels, AP100 panels and AP125 panels respectively. Each shock gasket 607 may be comprised an appropriate material to secure the perimeter portions of their correspondingly sized panel, such as rubber or another firm but flexible material. The desired or required panel thickness (and thus required shock gasket 607 and base profile 606) may be determined based upon application needs, with panels having greater thicknesses being used for applications requiring greater protection. As stated previously, certain tapered shock gaskets 607, such as the AP25, AP375 and AP50 shock gaskets 607 shown in FIGS. 6H, 6I & 6J, respectively, may include friction bumps 607*c* and angle breaks 607*d* on each gasket leg 606*b* that are configured to improve engagement between the shock gasket 607 and the base profile 606. Upon installation of a panel within the shock gasket 607, the friction bumps 607*c* and the angle breaks 607*d* will be forced outward into the corresponding geometry of the base profile 606, such that the friction bumps 607*c* nest within the slot pocket 606*h* below the tapered members 606*m* of the profile legs 606*k*, and the angle breaks 607*d* nest securely into the correspondingly shaped portions of the tapered members 606*m* of each profile leg 606*k*.

As discussed above, FIGS. 6H, 6I & 6J may be tapered gasket, unlike the un-tapered gaskets of FIGS. 6K, 6L & 6M. This tapered shaped may allow for the above described elements of said tapered gaskets, such as the angle breaks 607*d* and the friction bumps 607*c* disposed on each gasket leg 607*b* to secure more firmly to the base profile as describe above. The insertion of a panel within the tapered gasket 607 also helps to further secure each element of each tapered gasket 607 to a corresponding portion of the base profile 606. The tapered shape of these gaskets 607 in FIGS. 6H, 6I & 6J may allow for the gasket to slot more securely within the base profile 606, as a result of increased surface area between the two elements. The benefits of the tapered shaped gaskets may only be utilized with narrower panels, as a result of wider panels taking up more space while still benefitting from having a uniform gasket thickness. The friction bumps 607*c* and angle breaks 607*d* disposed on each gasket leg 607*b* are configured to improve engagement between the base profile and the tapered gasket. For all gaskets 607 disclosed, the insertion of a panel within said gasket allows for secure engagement between the gasket 607 and the base profile 606, as well as the gasket 607 and the held panel.

FIGS. 6N, 6O & 6P illustrate the side views of a base screw 609, mounting screw 605 and sheer block screw 604 respectively. Each base screw 609 may be a self-drilling screw with an M3.5 thread size and a length of 19 mm. Each mounting screw 605 may be a self-drilling screw with a M3.5 thread size and a length of 38 mm. The sheer block screw 609 may be a small head screw for drywall and be provided in various lengths depending on the application. The specification of the screws, including their lengths and thread sizes, may be varied based upon the needs of the application and dimensions of their corresponding slot/port. Each screw may be made of an appropriate material based on its strength requirements, such as aluminum or steel. While screws have been described throughout in order to facilitate or further secure the attachment of the mounting unit (starter mullion 614, support mullion 601 or mounting bar 612) to the mounting surface and the base profile 606 to the mounting unit, supplementary methods may also be implemented such as adhesives and/or sealants.

While not visible in the cross sectional views provided in FIG. 6A-6M, each base profile 606, shock gasket 607, starter mullion 614, support mullion 601 and support bar 612, sheer block 603, snap cover 602 and all other cross-sectionally displayed components may have a length (a depth from the perspective of the cross sectional views, running into and out of the page) suitable for securing a glazing panel within a window/door frame, as can be seen from the side perspective view of the AP system 300 installed within a door frame 310 in FIG. 3. These above-described components may be formed through a suitable manufacturing process, such as extrusion or other suitable methods know in the industry. The screws may be manufactured using known methods in the industry.

Figure 7A:
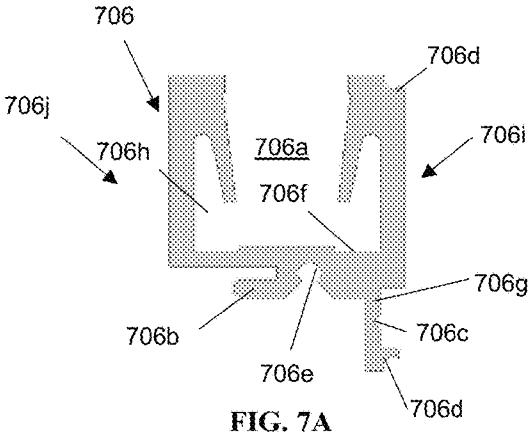
FIG. 7A-7K illustrate the cross-sectional views of ArmorPlast system components suitable for non-ballistic applications, according to an aspect.
Figure 7B:
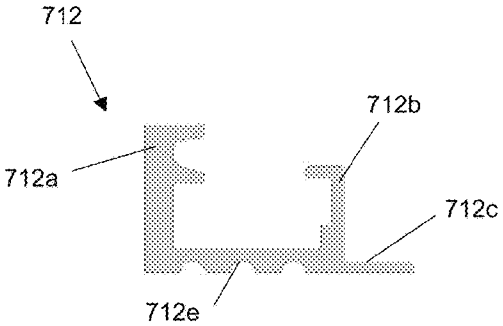

FIG. 7A-7K illustrate the cross-sectional views of Armor-Plast system components suitable for non-ballistic applications, according to an aspect. When comparing the non-ballistic, medium duty elements of FIG. 7A-7K to the ballistic, heavy duty elements of FIG. 6A-6P, it can be seen that both sets of components contain mostly the same main structural elements and thus, the interactions described above for said heavy duty components may be the same for the medium duty components. One significant difference between the medium duty components of FIG. 7A-7K and the heavy duty components of FIG. 6A-6P is that there is only one size of base profile 706 provided for the medium duty AP system, whereas the heavy duty AP system may have two different sizes of base profile 606. FIG. 7A illustrates the cross sectional view of a base profile 706 for use within non-ballistic applications. FIG. 7B illustrates the cross sectional view of a mounting bar 712 for use within non-ballistic applications. Medium duty base profile 706 of FIG. 7A may only be capable of holding AP25, AP375 and AP50 compatible shock gaskets 707, and thus only AP25, AP375, AP50 sized glazing panels. The arrangement of the structural elements of this medium duty base profile 706 may be somewhat different when compared to that of the equivalent heavy duty base profile 606 of FIG. 6B. For example, the support leg 706*b* of medium duty base profile may not be disposed as close to the exterior surface of the base profile 706*j* as the support leg of 606*b* of base profile 606 is. This may help to save material while still leaving a place to position a desiccant below the base profile 706 and adjacent to the mounting unit. Also, as can be seen when comparing the heavy duty mounting bar 612 of FIG. 6C to the medium duty mounting bar 712 of FIG. 7B, the mounting slot 712*a* of the medium duty mounting bar 712, as well as those of the medium duty starter mullion 714 of FIG. 7D and the medium duty support mullion 701 of FIG. 7C, may be disposed closer to the interior facing surface of the AP system in order to accommodate the positioning of the support leg 706*b* discussed above, while also using less material.

Additionally, base grooves 712*e* may be disposed on the bottom surface of the medium duty mounting bar 712 in order to reduce material usage while still providing suitable structural strength for medium duty applications. These base grooves 712*e* may also provide more engagement area between a mounting surface and the mounting bar 712, particularly when using a silicone sealant, or other suitable material, disposed between the mounting unit and the mounting surface, as described hereinabove. These base grooves 712*e* may also trap some of the used sealant, reducing the need to clean up residual sealant extruded between the two elements. Such base grooves 712*e* may be utilized on all mounting units, such as base profiles and base mounts, even if not show explicitly in an accompanying figure.

The medium duty base profile 706, may also have fewer slot channels 706*f* disposed within the gasket slot 706*a* when compared to the heavy duty base profile 606, as a result of its lesser thickness and not being required to behave as rigidly. These differences between the medium duty base profile 706 of FIG. 7A, the medium duty support bar 712 of FIG. 7B and their heavy duty equivalents allows said medium duty components to use less material, while still maintaining a suitable strength level for the medium duty applications. Aside from the elements discussed hereinabove, the other elements of the medium duty base profile 706, such as the gasket slot 706*a*, the base screw slot(s) 706*c*, the two snap cover ridges 706*d*, the screw hole 706*e*, the junction leg 706*g* and the slot pockets 706*h*, as well as the other elements of the medium duty mounting bar 712, such as the support leg 712*b* and the cover leg 712*c*, may be structurally equivalent to those described for the comparable elements of the heavy duty AP system.

Figure 7C:
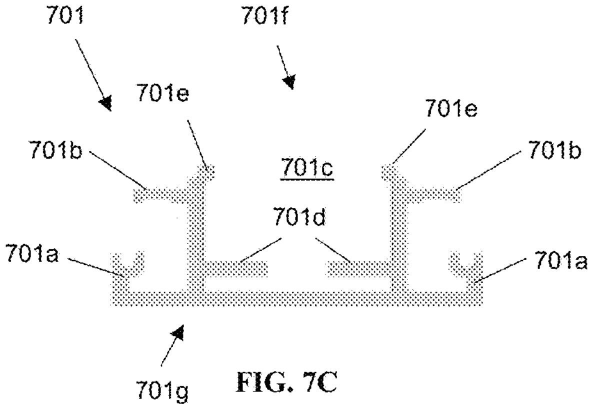
Figure 7D:
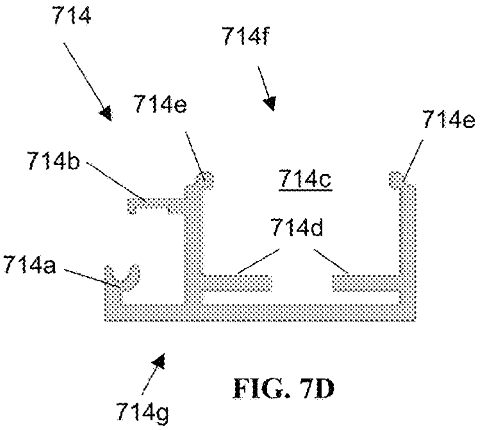

FIG. 7C illustrates the cross sectional view of a support mullion 701 for use within non-ballistic applications. FIG. 7D illustrates the cross sectional view of a starter mullion 714 for use within non-ballistic applications. The medium duty starter mullion 714 of FIG. 7D and medium duty support mullion 701 of FIG. 7C may be structurally similar to their aforementioned heavy duty equivalents, with the exception being their corresponding mounting slots; mounting slot 714*a* and mounting slot 701*a*, respectively, which are simply configured to engage with the mounting leg 706*b* of the medium duty base profile 706. When compared to their heavy duty equivalents, mounting slot 714*a* of starter mullion 714 and mounting slot 701*a* of support mullion 701 are both disposed closer to the interior facing surface 701*f* of their respective mullion, in order to accommodate the above described positioning of the medium duty mounting leg 706*b*. The other functional elements of the medium duty starter mullion 714 and the medium duty support mullion 701, including the support legs (701*b*, 714*b*), mullion cavities (701*c*, 714*c*), sheer block retainer legs (701*d*, 714*d*), and snap cover securing ridges (701*e*, 714*e*) may be functionally and structurally equivalent to those of the heavy duty support mullion 601 and the heavy duty starter mullion 614, respectively, as described hereinabove.

Figure 7E:
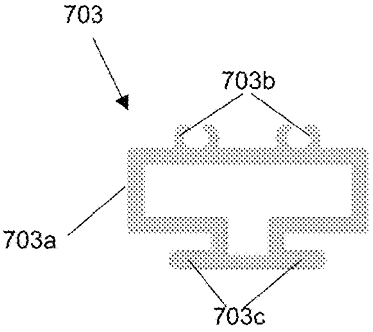
Figure 7F:
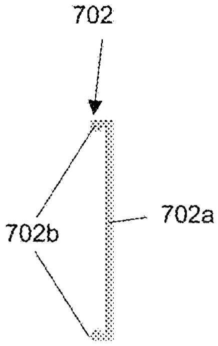
Figure 7G:
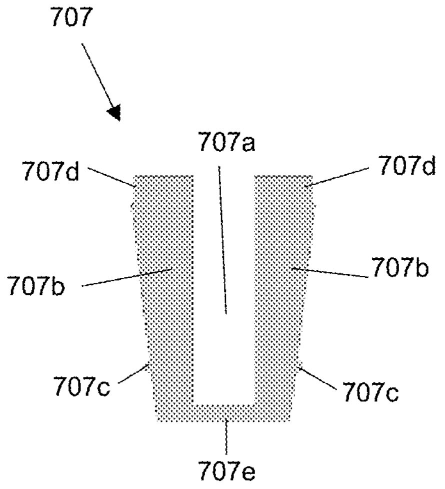
Figure 7H:
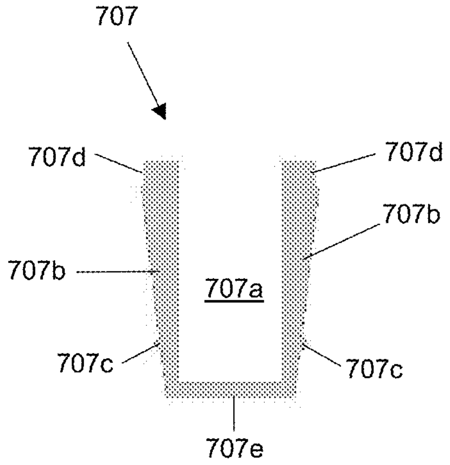
Figure 7I:
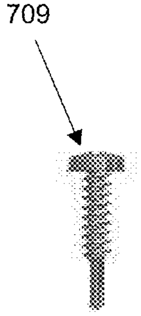
Figure 7J:
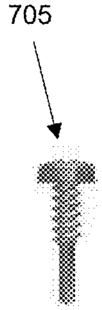

Certain components of the medium duty AP system may be the same as those used in the heavy duty. FIG. 7E illustrates the cross sectional view of a sheer block 703 for use within non-ballistic applications. FIG. 7F illustrates the cross sectional view of a snap cover 702 for use within non-ballistic applications. FIGS. 7G & 7H illustrate the cross sectional views of shock gaskets for use within non-ballistic applications. The sheer block 703 of FIG. 7E may be comprised of a sheer block body 703*a*, two sheer block ports 703*b* disposed on one end of the sheer block body 703*a* and two sheer block engaging legs 703*c* disposed on the same set of opposite end of the sheer block body 703*a*, and be identical to sheer block 603 used in the heavy duty AP system. The snap cover 702 of FIG. 7F may also be the same as those used in a heavy duty system, said snap cover 702 being comprised of a snap cover body 702*a*, and two snap cover edges 702*b*, each edge disposed on an opposite end of the snap cover body 702*a*. The AP25 gasket 707 of FIG. 7G and the AP375 gasket 707 of FIG. 7H may also be the same as the AP25 gasket 607 of FIG. 6H and the AP375 gasket 607 of FIG. 6I, respectively, both of which have a suitably sized panel slot 707*a* to accommodate a corresponding panel. As described previously, the shock gaskets 707 may be comprised of a panel slot 707*a* disposed between the shock gasket legs 707*b*. The 25AP, AP375 and AP50 shock gasket configured to fit within the medium duty base profile 706 may also have friction bumps 707*c* and angle breaks 707*d* disposed on their shock gasket legs 707*b* in order to help further secure the shock gasket 707 within the gasket slot 706*a* of the base profile 706.

The screws used in the medium duty AP system may be mostly the same as those used in the aforementioned heavy duty AP system. Base screw 709 of FIG. 7I used for medium duty AP systems may be the same type of base screw as base screw 609 of FIG. 6N used for heavy duty AP assemblies, and sheer block screw 704 of FIG. 7K may be the same type of screw as sheer block screw 604 of FIG. 6P. The medium duty mounting screw 705 of FIG. 7J, however, may be different than the heavy duty mounting screw 605 of FIG. 6O, the former have a shorter length. Obvious variations of these screws, such screws having different lengths or thread sizes may be implemented as needed based on the application.

Figure 8A:
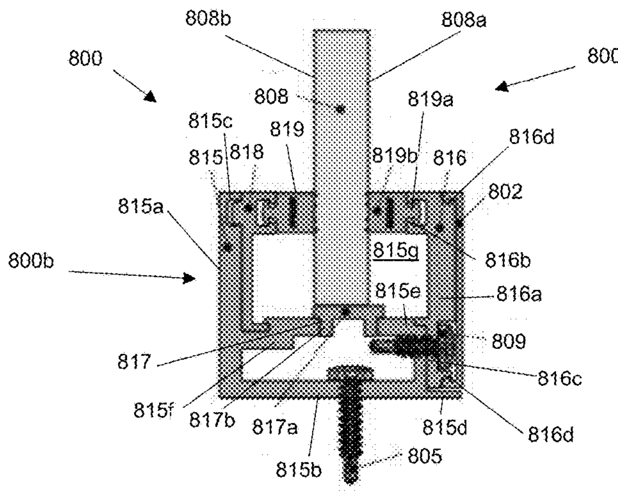
FIG. 8A-8E illustrate the cross-sectional views of an alternative design for an ArmorPlast system designed for a heavy duty conversion system.

FIG. 8A-8E illustrate the cross-sectional views of an alternative design for an ArmorPlast system designed for a heavy-duty system conversion system. The ArmorPlast conversion systems 800 depicted in FIG. 8A-8E utilize differently shaped components compared to the previously described ArmorPlast conversion systems described hereinabove. The alternatively designed ArmorPlast system comprised of differently shaped components may be preferred over the previously described ArmorPlast systems, as a result of the ease with which the former may be installed, and its reduced material usage, which will be described in greater detail hereinbelow. This alternative variation of the heavy-duty conversion ArmorPlast system may be comprised of a base mount 815, a pressure plate 816, a universal bottom gasket 817, a reducer bracket 818, two narrow gaskets 819, one contacting the external facing surface of the panel 808*b*, and one contacting the internal facing surface of the panel 808*a*. The base mount 815 may be comprised of a mount exterior wall 815*a*, a base mount floor 815*b* disposed below the mount exterior wall 815*a*, a bracket support leg 815*f* disposed on the mount exterior wall 815*a*, a securing pocket 815*c* disposed on the mount exterior wall 815*a* and above the bracket support leg 815*f*, a cover leg 815*d* extending from the base mount floor 815*b* and an interior side gasket support 815*e* disposed above the base mount floor 815*b*. The bracket support leg 815*f* may be classified as an exterior side gasket support, which will be discussed in greater detail hereinbelow. The cover leg 815*d* and interior side gasket support 815*e* may be arranged such that the cover leg 815*d* runs parallel with the base mount floor 815*b* and the interior side gasket support 815*e* is orthogonally disposed above the base mount floor 815*b*, while the base mount floor 815*b* may be orthogonally disposed below the mount exterior wall 815*a*. The securing pocket 815*c* is configured to secure a reducer bracket 818 or a narrow gasket 819 to the base mount 815, depending on the thickness of the panel 808 to be secured. A mounting screw 809 may be drilled through the base mount floor 815*b*, in order to secure this alternative AP system to a mounting surface (not shown). The bracket support leg 815*f* may support one side of the universal bottom gasket 817, acting as an exterior side gasket support to accompany the interior side gasket support 815*e*, which itself is securing the opposite side of said universal bottom gasket 817, as seen in FIG. 8A. In each of the hereinbelow disclosed embodiments of the alternative AP system, the securing pocket 815*c* may be disposed above said exterior side gasket support, which as mentioned, is a bracket support leg 815*f* in the current embodiment.

The pressure plate 816 may be comprised of a pressure plate body 816*a*, a gasket securing pocket 816*b* disposed on pressure plate 816, a junction leg 816*c* disposed on the pressure plate 816 below the pressure plate body 816*a*, and two snap cover securing ridges 816*d*, one disposed on the top end of the pressure plate body 816*a*, the other disposed on the bottom end of the junction leg 816*c*. The gasket securing pocket 816*b* may be disposed above the junction leg, such that the gasket securing pocket 816*b* may be disposed at a top end of the pressure plate body 816*a* and the junction leg 816*c* may be disposed at a bottom end of the pressure plate body 816*a*. A base screw 809 may be driven through the junction leg 816*c* of the pressure plate 816 and the interior side gasket support 815*e* of the base mount 815 in order to secure these two components together to secure a held panel 808 between them. The described snap cover ridges 819*d* may function comparably to those described hereinabove; being properly shaped and distanced from each other to secure a snap cover 802 to the pressure plate 816, such that the internally disposed base screw 809 is covered. The combination of the base mount 815 with the pressure plate 816 may create a structure similar to the combination of base profile 206 to conversion mounting bar 211 from FIG. 2A, creating a structural foundation called a base fixture in which gaskets may be nested or secured in order to support a held panel.

A universal bottom gasket 817 may be disposed within this AP system such that it provides support to perimeter faces of the held panel 808 (e.g., not the internal facing surface 808*a* or the external facing surface 808*b* of the panel 808). The universal bottom gasket 817 may be nested between the interior side gasket support 815*e* and the bracket support leg 815*f*, wherein the bracket support leg 815*f* functions as an exterior side gasket support. The universal bottom gasket 817 may be comprised of panel plate 817*a* disposed on top of two identical base blocks 817*b*, wherein the panel plate 817*a* is configured to contact and support the panel 808 and the base blocks 817*b* are configured nest between the bracket support leg 815*f* and the interior side gasket support 815*e* of the base mount 815 to secure the universal bottom gasket 817 to the base mount 815. This universal bottom gasket 817 may be made of rubber, as with all gaskets described within this application. This universal bottom gasket 817 may be used with all panels 808 for these alternative AP systems depicted in FIG. 8A and beyond.

Figure 8B:
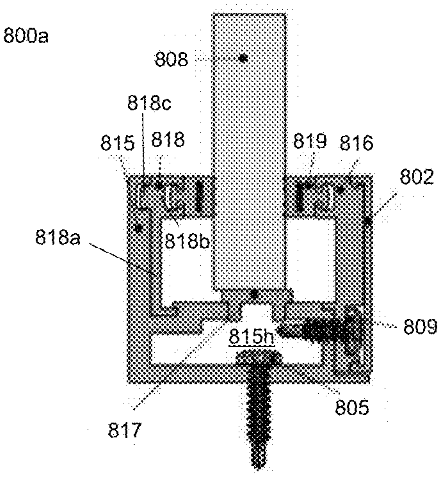
Figure 8C:
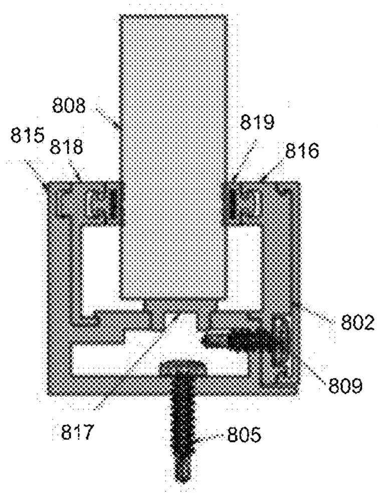
Figure 8D:
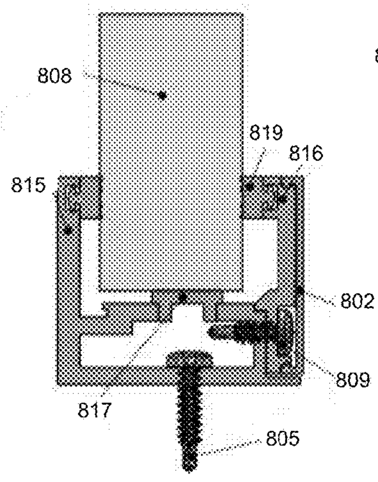
Figure 8E:
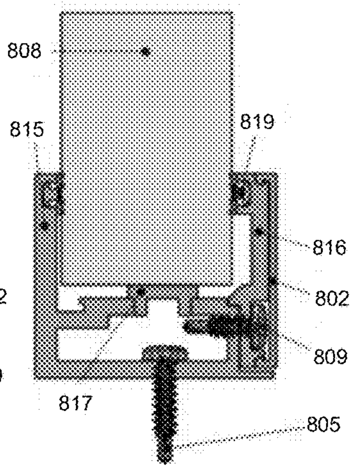
Figure 9A:
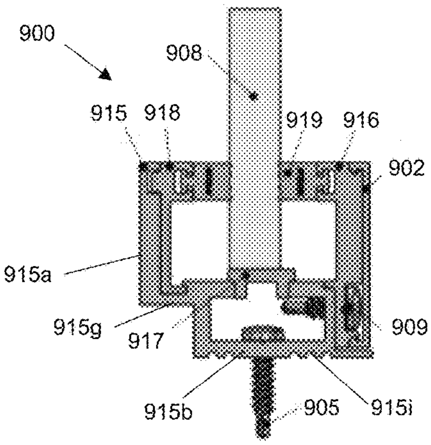
FIG. 9A-9E illustrate the cross-sectional views of an alternative design for an ArmorPlast system designed for a heavy duty storefront security system.
Figure 9B:
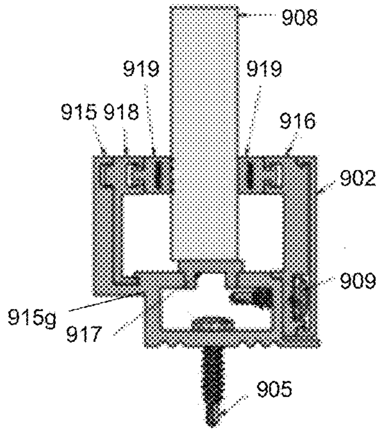
Figure 9C:
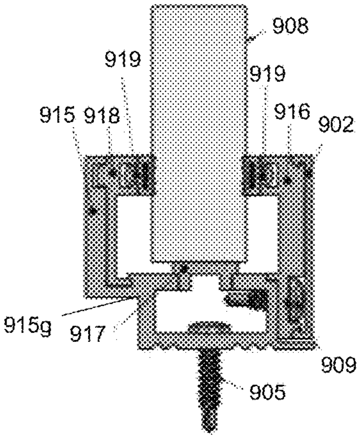
Figure 9D:
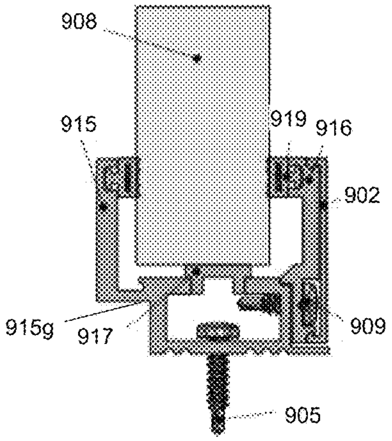
Figure 9E:
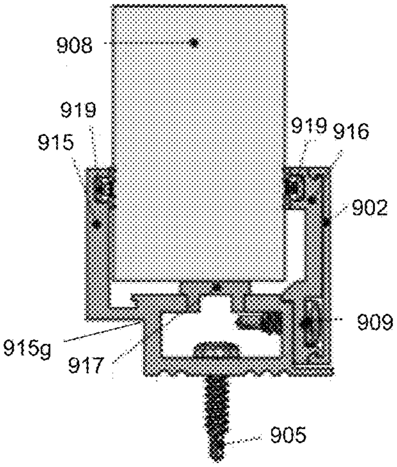

A reducer bracket 818 may only be provided in some of the disclosed alternative AP systems, as it may be used to provide support for thinner panels 808. As seen in FIG. 8A-8C, a reducer bracket 818 may be provided within an AP system in order to facilitate the holding of AP375 panels as seen in FIG. 8A, AP50 panels as seen in FIG. 8B, and AP75 panels, as seen in FIG. 8C. The reducer bracket 818 may also be used with AP25 panels, if the proper narrow gaskets 819 are available. The reducer bracket 818 may be comprised of a base mount securing leg 818*a* configured to engage with the bracket support leg 815*f* of the base mount 815 to secure the reducer bracket 818 to said base mount 815, a gasket securing pocket 818*b* disposed above the base mount securing leg 818*a* configured to secure a narrow gasket 819, and a reducer ridge 818*c* disposed above the base mount securing leg 818*a* and adjacent to the gasket securing pocket 818*b*, wherein said reducer ridge 808*c* is configured to be secured within the securing pocket 815*c* of the base mount 815, to further secure the reducer bracket 818 to the base mount 815. The reducer bracket 818 may not be required in the securing of thicker panels, such as AP100 or AP125 panels, such as in FIG. 8D or 8E, respectively, or thicker AP panels, wherein the narrow gasket 819 that contacts the external surface 808*b* of the panel may instead be secured in the securing pocket 815*c* of the base mount 815. When installed within an AP system, the reducer bracket 818 is configured to be disposed between the base mount 815 and the corresponding narrow gasket 819, such that said narrow gasket 819 is configured to be secured within the gasket securing pocket 818*b* of the reducer bracket 818 and the reducer ridge 818*c* is configured to be secured within the securing pocket 815*c* of the base mount 815.

One of the narrow gaskets 819 utilized in these alternative AP systems is configured to be secured by the gasket securing pocket 816*b* of the pressure plate 816, while the other narrow gasket 819 is configured to be secured by either the securing pocket 815*c* of the base mount 815, when using panels 808 that are 1 inch thick or thicker, such as AP100 or AP125 panels, or the gasket securing pocket 818*b* on the reducer bracket 818, when using panels 808 that are thinner than 1 inch, such as AP25, AP375, AP50 or AP75 panels. These narrow gaskets 819 when used in conjunction with the universal bottom gasket 817 provide sufficient support to a held security panel to prevent its dislodging when impacted, while still allowing for the natural expansion and contraction of the panel 808 from environmental effects, such as heating from direct sunlight. The narrow gaskets 819 may be comprised of narrow gasket handle 819*a* configured to secure the gasket 819 to another structure, such as the base mount 805, reducer bracket 818 or the pressure plate 816, accordingly, attached to a narrow gasket body 819*b*, wherein the narrow gasket body 819*b* is configured to directly contact the internal facing surface 808*a* or the external facing surface 808*b* of the panel 808. The narrow gaskets handle 819*a* is configured to be secured within gasket securing pocket 816*b* on a pressure plate 816, a securing pocket 815*c* on a base mount 815 or a gasket securing pocket 818*b* on a reducer bracket 818, as applicable. As can be seen from FIG. 8A-8E, the thickness of the narrow gasket bodies 819*b* may be varied in order facilitate the securing of a specific thickness of panel 808. The described arrangement of narrow gaskets 819 allows the herein disclosed alternative AP system to sufficiently support the installed panel 808, while significantly reducing the amount of gasket material used, thus reducing the total gasket cost. The narrow gaskets 819 and the universal bottom gasket 817 are configured to support a security panel held within the base fixture while allowing for the natural expansion and contraction of the panel as a result of the ambient conditions.

This alternative variation of ArmorPlast system may utilize at least one base screw 809 to secure to the base mount 815 to the pressure plate 816, and at least one mounting screw 805 to secure the base mount 815 to a mounting surface. As described previously, a plurality of these base screws 809 and a plurality mounting screws 805 may be distributed along the length of their corresponding components in order to ensure a secure attachment of each connected component as described herein. All screws used may be the same as those described previously for their equivalent functions or altered based upon the needs of the application.

This alternate design of AP system described in FIG. 8A-14 may utilize slot pockets 815*g*, much like the previously described AP systems. One slot pocket 815*g* may be disposed between the pressure plate 816 and the held panel 808, while another slot pocket 815*g* may be disposed between the reducer bracket 818, or a corresponding portion of the mount exterior wall 815*a*, and the held panel 808. These slot pockets 815*g* may function similarly to other hollows and pockets described in previous embodiments by reducing material usage, increasing flexibility and providing space for the panel 808 to expand into if needed. A base pocket 815*h* may also be disposed above the base mount floor 815*b* and below the exterior side gasket support and the interior side gasket support 815*e*, wherein said base pocket 815*h* may provide additional structural flexibility to allow for the expansion of the panel 808 as needed, while allowing for less material to be used and easier access to the base screw 805 during installation. The shapes of the slot pockets 815*g* and the base pocket 815*h* may simply be a function of the surrounding element structures of the AP system. The flexibility of the alternative design of the AP system 800 may be particularly useful when utilizing thinner panels, such as AP25 or AP375 panels, wherein said panels may bend more from an impact, and thus require a more flexible AP system structure to flex with them to prevent their damage or destruction.

As with the previously described AP systems prior to FIG. 8A the snap cover 802 may be disposed on the interior facing side 800*a* of the AP system, and attached to snap cover securing ridges disposed 816*d* disposed on the corresponding interior facing side of the formed base fixture. The cover leg 815*d* may also be disposed on the interior facing side of the formed base fixture, such that it may satisfy its function of bordering the installed snap cover, as with previous embodiments of the AP system described hereinabove.

Figure 7K:
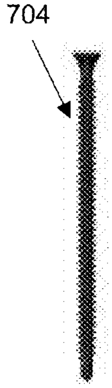

Much like the previous embodiments of the AP system, the alternative AP systems disclosed in FIG. 3B and after FIG. 7K may provide an exterior facing surface 800*b* on said system that may not be easily manipulated by a party having access to said exterior facing surface 800*b*. The base mount 815 is formed as a singular, monolithic component, leaving no visible vulnerability points throughout its span. The secured narrow gasket 819, as well as the reducer bracket 818, as applicable, may both be firmly secured between exterior surface 808*b* of the panel 808 and the base mount 815, also providing surfaces with no visible vulnerabilities. This impregnable exterior facing surface 800*b* of the alternative AP system will help to both dissuade and prevent break in attempts as a result of its unified visual structure and inherent structural integrity.

FIG. 9A-9E illustrate the cross-sectional views of an alternative design for an ArmorPlast system designed for a heavy duty storefront security system. As can be seen from FIG. 9A-9E, the alternative ArmorPlast system 900 designed for a heavy duty storefront based security system is largely comparable to the ArmorPlast system 800 designed for heavy duty conversion in FIG. 8A-8E. Most of the components, including the pressure plate 916, the universal bottom gasket 917, the reducer bracket 918, and the two narrow gaskets 919 may be the same as their equivalents described in FIG. 8A-8E, down to their physical structure, characteristics, placements and interactions with other each. The one component that may be different for the disclosed alternative AP system for heavy duty storefronts is the utilized base mount 915.

The base mount 915 of FIG. 9A-9E differs from the base mount 815 of FIG. 8A-8E as a result of the inclusion of a desiccant slot 915*g* disposed between the mount exterior wall 915*a* and the base mount floor 915*b*. This desiccant slot 915*g* may behave similarly to desiccant slot 612*e* of mounting bar 612 of FIG. 6C and be provide at a position in which the desiccant slot 915*e* is disposed within the gap formed between the security panel mounting system and the preexisting glazing. This gap 915*g* may also be relevant when installing within a window or door frame in which the thickness of the mounting surface is lesser than that of the base mount, resulting in the base mount overhanging the edge of the mounting surface at the interface between the two. This uneven connection may result in an undesirable aesthetic in which the AP system does not appear to be part of the window or door. Therefore, by providing base mount with a thinner (less wide) base mount floor 915*b*, the interface between the AP system and the mounting surface may allow for planar alignment of corresponding AP system and mounting structure surfaces, creating a clean, factory-installed look, despite not being part of the original assembly. Additionally, base grooves 915*i* may be disposed within the base mount floor 915*b* of the base mount 915 in order to reduce material usage, while increasing engagement between the base mount 915 and the mounting surface, particularly when using a sealant between base mount 915 and the mounting surface. Said base grooves 915*i* also help house the residual sealant upon installation, to prevent its extrusions between the two surfaces upon their engagement.

All of the other listed elements of the base mount 915 may be the same as in base mount 815, including the mount exterior wall, the base mount floor, the securing pocket, the cover leg, the interior side gasket support and the bracket support leg. Aside from the difference discussed herein, the heavy duty AP system for storefront security of duty AP system 900 of FIG. 9A-9E may be the same as the heavy duty conversion AP system 800 of FIG. 8A-8E, having the same components with the same interactions. Each AP system assembly may be configured to hold a desired AP panel as described previously with an AP 375 panel held in FIG. 9A, an AP50 panel held in FIG. 9B, an AP75 panel held in FIG. 9C, an AP100 panel held in FIG. 9D and an AP125 panel held in FIG. 9E. As described previously, the reducer bracket 918 may not be needed to support AP100 or AP125 panels.

Figure 10A:
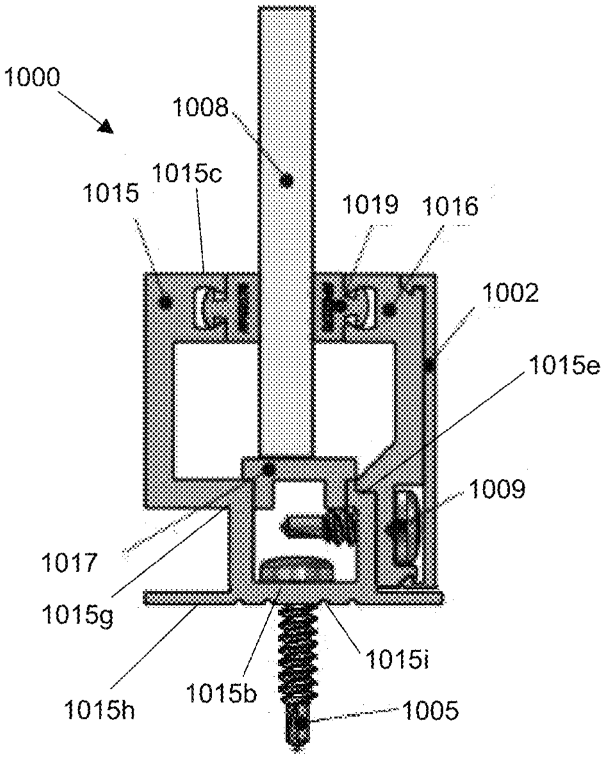
FIG. 10A and FIG. 10B illustrate the cross-sectional views of an alternative design for an ArmorPlast system designed for a medium duty storefront security system, according to an aspect
Figure 10B:
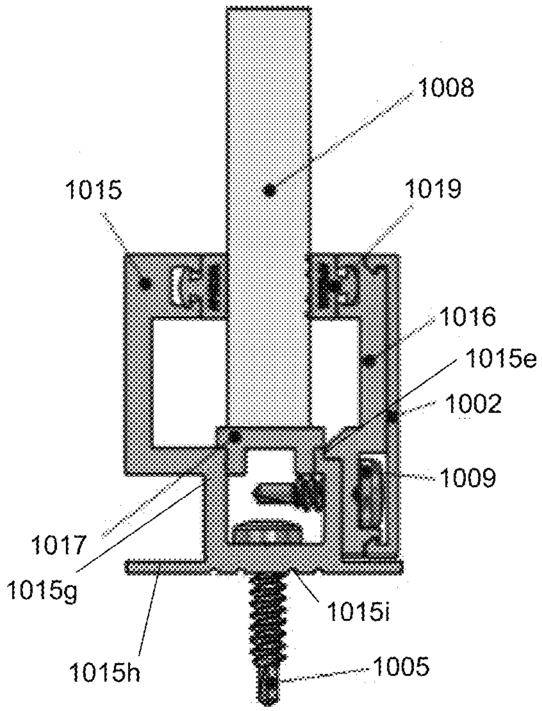

FIG. 10A and FIG. 10B illustrate the cross-sectional views of an alternative design for an ArmorPlast system 1000 designed for a medium duty storefront security system, according to an aspect. The medium duty AP systems 1000 illustrated in FIG. 10A and FIG. 10B may be very similar to the heavy duty AP equivalents seen in FIG. 9A-9E, with several minor exceptions. Much like AP system 900, the medium duty storefront AP system 1000 may utilize base ridges 1015*i* disposed on the base mount for the same reasons described hereinabove. This medium duty AP system may only be configured to accept thinner panels 1008, such as AP25 and AP375 panels 1008, as seen in FIG. 10A and FIG. 10B, respectively. As a result of this, the securing pocket 1015*c* may extend inward to be disposed closer to the panel 1008, such that the securing pocket 1015*c* is disposed in a similar location to the gasket securing pocket 818*b* of reducer bracket 818 of FIG. 8A. This positioning will allow for the securing of a narrow gasket 1019 in a suitable location to support the narrower panels 1008, such as AP25 and AP375 panels 1008, without a utilizing reducer bracket. Much like AP system 900, the alternative design for medium duty storefront AP system 1000 may utilize base grooves 1015*i* to help increase engagement between the base mount 1015 and the mounting surface when using a silicone sealant between the two.

Another difference arises from how the universal bottom gasket 1017 is supported. In FIG. 9A-9E, as well as FIG. 8A-8E, the universal bottom gasket is configured to nest between the bracket support leg 815*f*, acting as the exterior side gasket support and the interior side gasket support 815*e* of the base mount 815. In contrast, the universal bottom gasket 1017 of FIG. 10A and FIG. 10B is configured to nest between part of the desiccant slot 1015*g* and the interior side gasket support 1015*e*. In these embodiments, the exterior side gasket support is part of the desiccant slot 1015*g*. As a result of the medium duty AP systems shown in FIG. 10A and FIG. 10B not utilizing a support bracket, the typically accompanying bracket support leg 815*f* provided on previous base mounts in FIG. 8A-8E and FIG. 9A-9E is omitted in these currently discussed embodiments. The pressure plate 1016 of the alternative design medium duty storefront AP system 1000 may be slightly different from pressure plate 916 and pressure 816 of FIG. 9A and FIG. 8A-8E, respectively, as a result of the differences between their corresponding structures, as described herein. The variant of pressure plate 1016 of FIG. 10 may be described as a narrow pressure plate 1016, though it may also be classified as a type of pressure plate for simplicity.

One further difference between the medium duty AP system provided in FIG. 10A and FIG. 10B and the heavy duty AP system provided in FIG. 9A-9E is that that base mount 1015 may have a base extension 1015*h* disposed on the base mount floor 1015*b* and below the desiccant slot 1015*g*, such that a held desiccant may be encased by the desiccant slot 1015*g* and the base extension 1015*h* by three out of the four total sides. Such a base extension 1015*h* may be useful in increasing the engagement area between the base mount 1015 and the mounting surface, which may be helpful given the lesser thickness of base mount floor 1015*b* when compared to base mount floor 915*b* of the heavy duty AP system variant. If the desiccant is configured to fit securely between the base extension 1015*h* and the desiccant slot 1015*g*, it may also prevent the held desiccant from being dislodged from its position in the event of an impact to the panel 1008 or AP system 1000. Aside from the difference discussed herein, the medium duty AP system of FIG. 10A and FIG. 10B may be the same as the heavy duty AP system of FIG. 9A-9E, having the same components with the same positions and interactions.

Figure 11A:
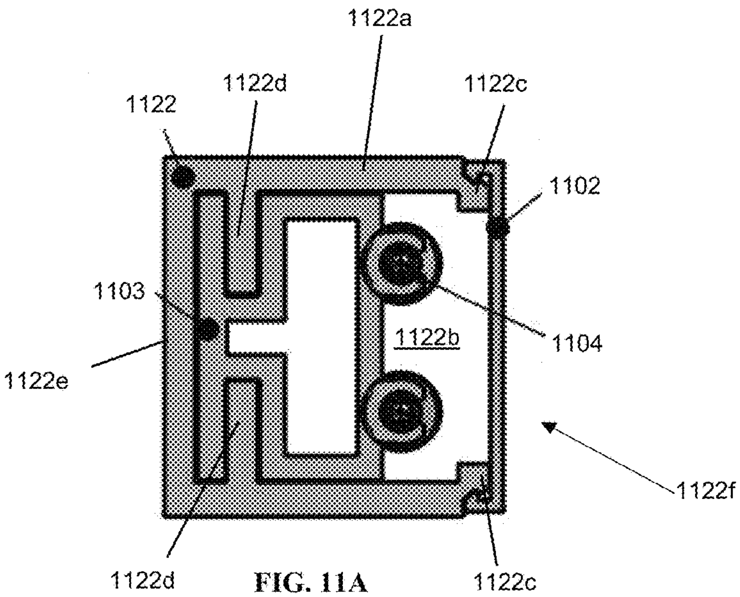
FIG. 11A and FIG. 11B illustrate the cross sectional and side perspective views of a splicer mullion, respectively, according to an aspect.
Figure 11B:
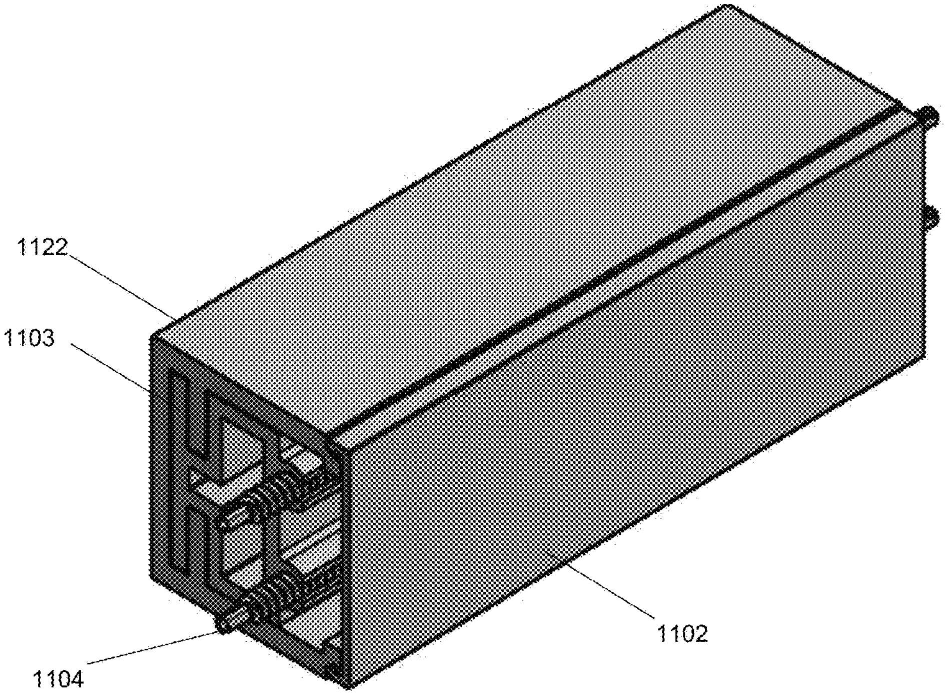

FIG. 11A and FIG. 11B illustrate the cross sectional and side perspective views of a splicer mullion 1122, respectively, according to an aspect. Much like the support mullions described previously, the splicer mullion 1122 may function as center mullion, an intermediary between the multiple panels secured within an AP system. The splicer mullion 1122, unlike the previously described center mullion, is configured to be compatible with the alternative design of AP system described in FIG. 8A and beyond. The splicer mullion 1122 may perform a function comparable to support mullion 601 of FIG. 6D but may lack both mounting slots 601*a* and the support legs 601*b* found on support mullion 601, as these elements are not utilized in the alternative AP system design. Said splicer mullion 1122 may still interact with an internally disposed mullion sheer block 1103 and the base screws in the same way as the described support mullion 601 of FIG. 6D, as the splicer mullion 1122 and the support mullion may be identical, aside from the differences described above. The splicer mullion 1122 may be used to attach one base mount to another from a location within the mounting structure that is not directly mounted to the original mounting surface, for use within a multiple panel AP system.

Both the splicer mullion 1122 and the support mullions may be described as center mullions and are configured to support multiple panels within an AP system. The splicer mullion 1122 may be comprised of a mullion base 1122*e* disposed between two mullion walls 1122*a*, a mullion cavity 1122*b* disposed between the two mullion walls 1122*a* and above the mullion base 1122*e*, a sheer block retainer leg 1122*d* disposed on each mullion wall 1122*a* within the mullion cavity 1122*b* and two snap cover ridges 614*e* disposed on the interior facing surface 1122*f* of the each mullion wall 1122*a*. As described above, the splicer mullion may have these above mentioned elements arranged in the same manner as a starter mullion 614 from FIG. 6E or support mullion 601 from FIG. 6D, such that the splicer mullion is compatible with a mullion sheer block 1103 and snap cover 1102 described previously.

As mentioned hereinabove, the utilization of center mullions, such as splicer mullions 1122, may allow for the utilization of multiple panels within a singular frame by supporting each panel from their centrally disposed portions, wherein these centrally disposed portions of said panels are not directly supported by the base fixture that is mounted directly to the mounting surface. The splicer mullion 1122 may differ somewhat from the support mullion 601, as the splicer mullion only provides an additional mounting surface disposed within the original, surrounding mounting surface to which a base mount may be attached, whereas the support mullion 601 provides both a mounting surface and a mounting unit to which a base profile may attach. Despite this difference, both types of center mullions may allow for the supporting of multiple panels within their respective designs of AP system.

Figure 12A:
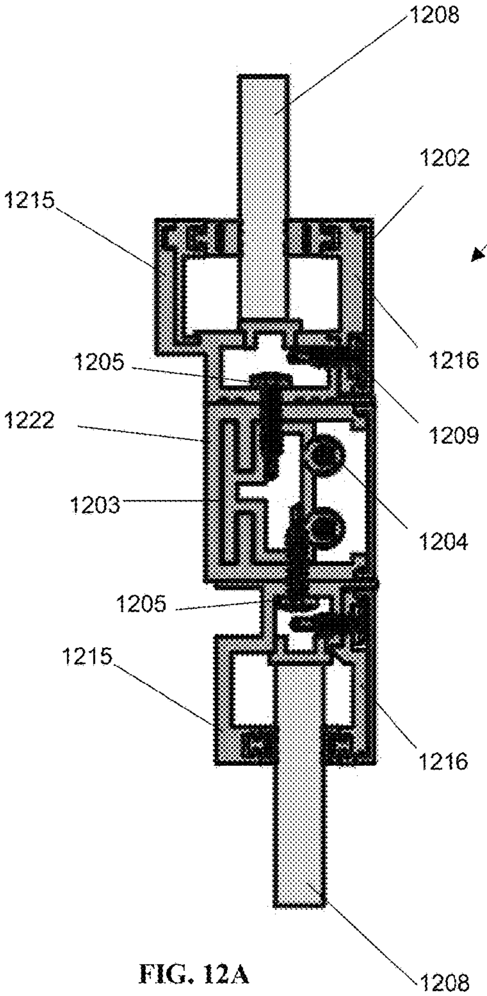
FIG. 12A and FIG. 12B illustrate a cross sectional and a side perspective views a splicer mullion disposed between two different base mounts, respectively, according to and aspect.
Figure 12B:
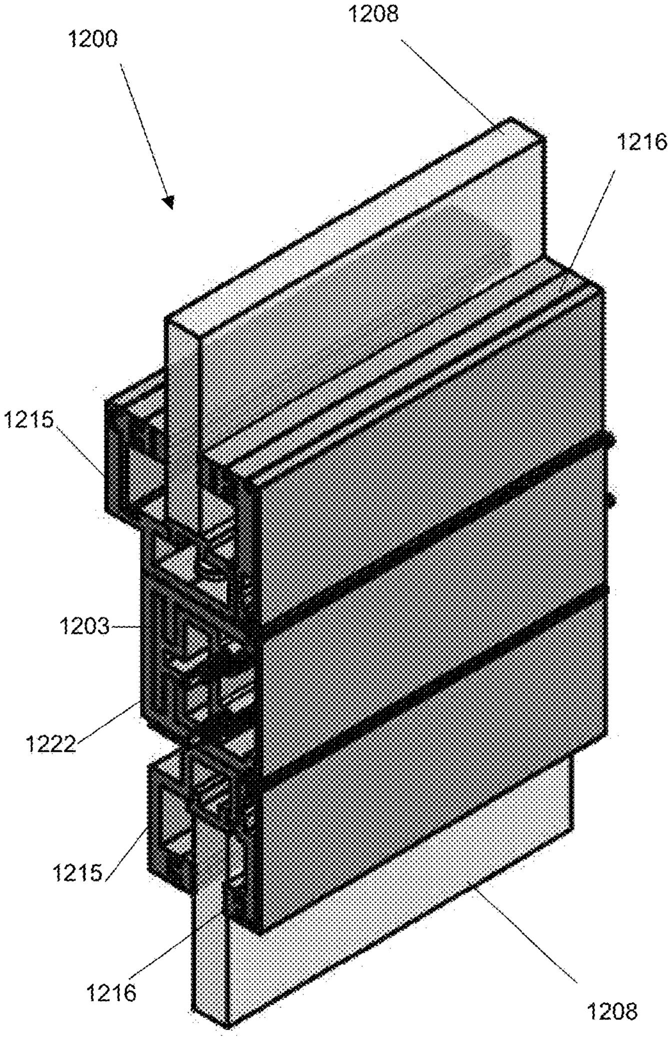

FIG. 12A and FIG. 12B illustrate a cross section and a side perspective view a splicer mullion 1222 disposed between two different base mounts 1215, respectively, according to an aspect. It is not necessary to utilize two identical base mounts when implementing multiple panels 1208 with an AP system, as can be seen by the two different base mounts 1215 utilized in the AP system 1200 of FIGS. 12A and 12B. The usage of different types of base mounts 1215 within a window may be useful in achieving a certain protection profile and/or appearance, particularly on windows and door frames that may not interface with the surrounding environment in the same way on each side of the AP system. Mounting screws 1205 may be used to secure each base mount 1215 to the splicer mullion, to allow for the utilization of multiple panels 1208 within a singular window or door frame. The inclusion of a mullion sheer block 1203 within the splicer mullion may help provide structural support and an anchoring point to said mullion, as it does for other mullions it is installed within. Utilization of different types of base mounts 1215 within the same AP system 1200 may be desirable or necessitated by the application when installing said AP system 1200 in non-standard frames. Also, the utilization of different types of base mounts 1205 within the same AP system 1200 may allow for the usage of two or more different panel thicknesses at different portions of the frame, such as using a thinner panel in a medium duty AP system 1000 from FIG. 10A with a thicker panel in heavy duty AP system 900 from FIG. 9A, in the same AP system. This may allow thicker panels 1208 and heavy duty AP system components to be installed on portions of the AP system that would be expected to experience more trauma from a break in attempt (e.g., a portion of the AP system that is easier to reach) and/or direct ballistic impact. By only providing thicker panels and heavy-duty AP system components at heights at which ballistic trajectories may intercept an individual inside the building, optimal safety conditions within said building may be established while minimizing cost.

The alternative design of the AP system displayed in FIG. 8A and beyond may be the preferred embodiment. The design of these alternative AP systems may allow for an easier installation of a panel when compared to the AP systems depicted prior to FIG. 8A. For the alternative AP system design, as seen in FIG. 8A and beyond, the panel 808 may be installed or removed simply through removal of the pressure plate 816. This process used to install the panel, while convenient, does not compromise the security of the alternatively designed AP system, as the base screws 809 securing the pressure plate 816 to the base mount 815 may be provided on the interior side of the window/door that is being protected, and thus only be accessible on the inside of a corresponding building/structure. If the base screw is on the outside/unsafe side of the window/door, tamper resistant screws may be used for base screws 809, to prevent unwanted manipulation of said screws.

Additionally, the alternative design of the AP system may utilize less material for gaskets, thus reducing the gasket cost. For the purposes of classification, base mounts 1215 may be defined as a type of mounting unit, as it is the portion of the alternative AP system that contacts the mounting surface or a splicer mullion. The pressure plate 1216 may be defined as a type of securing unit, given its interaction with the base mount 1215 to secure a panel 1208 within an AP system. Upon attachment of the pressure plate 1216 to the base mount 1215 as seen in FIG. 12A, a structure similar to the combination of a base profile with a mounting unit is created, both versions having a surface that interfaces with the mounting surface and a structure configured to support the panel. The fixture formed from the attachment of a pressure plate 1216 to a base mount 1215 or the attachment of a base profile to a mounting unit may be defined as a base fixture.

Figure 13:
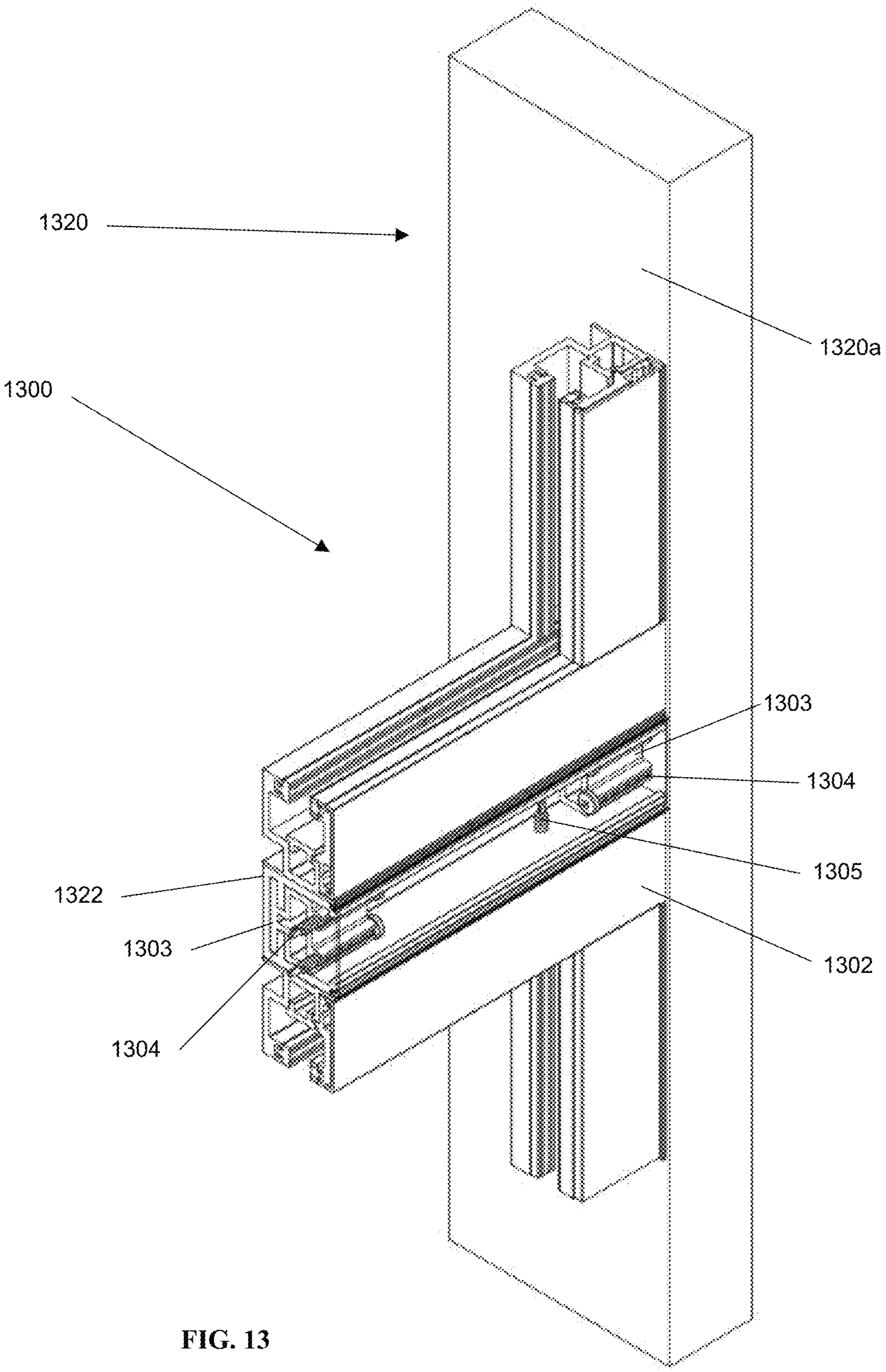
FIG. 13 illustrates the perspective view of an alternative design for a medium duty storefront AP system utilizing a splicer mullion, according to an aspect.

FIG. 13 illustrates the perspective view of an alternative design for a medium duty storefront AP system 1300 utilizing a splicer mullion 1322, according to an aspect. As can be seen in FIG. 13, the snap cover 1302 secured to the splicer mullion 1322 is shown as transparent, in order to better display the connection of the internally disposed sheer block 1303 to the mounting surface 1320*a*. As described previously, the sheer block 1303 disposed within a center mullion may utilize sheer block screws 1304 to mount it directly to a mounting surface, such as mounting surface 1320*a* of a storefront 1320. Once mounted, the sheer block may act as an anchoring point for securing a corresponding center mullion, such as splicer mullion 1322, directly to the mounting surface 1320*a* of a storefront 1320. The splicer mullion 1322 may be secured to the sheer block 1303 through the utilization of mounting screws 1305 engaged with both the splicer mullion 1322 and the sheer block 1303, as depicted in FIG. 13. The sheer block 1303 used for each herein described AP system may be universal, such that same design of sheer block 1303 is used for all of the designs of AP system. As mentioned previously, this is also the same for the snap cover 1302 which also may be universally compatible with the various different designs of AP system.

Figure 14:
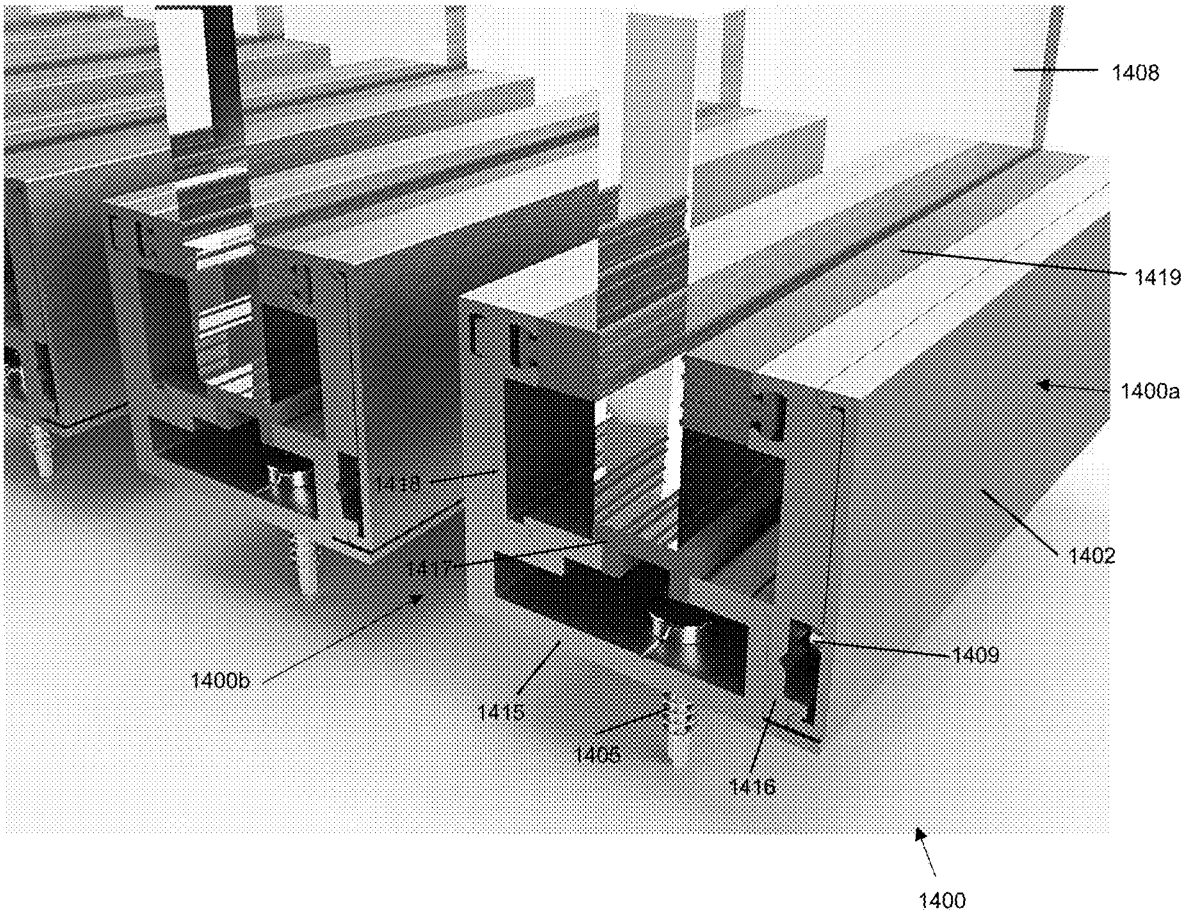
FIG. 14 illustrates the perspective view of a plurality of alternative conversion AP systems, according to an aspect.

FIG. 14 illustrates the perspective view of a plurality of alternative conversion AP systems 1400, according to an aspect. This alternative design of the heavy-duty conversion AP system 1400 may be considered to be comparable in application to the heavy duty conversion AP system 300 described in FIG. 3A, however there may be several benefits to utilizing the alternative design of FIG. 14. The design of this alternative AP conversion system 1400 may allow for easier installation when compared to the comparable conversion AP system 300 described in FIG. 3A, as a result of the pressure plate 1416 facilitating easier insertion of the held panels into the AP system 1400. The multiple components, or extrusions, of the alternative AP system 1400 may utilize less material, thus costing less to produce. Additionally, the narrow gaskets 1419 of the alternative AP system 1400 may also utilize less material than gasket 307 of the corresponding AP system 300 of FIG. 3A, also reducing production costs. The alternative design of AP system 1400, as described in FIG. 8A-8E, may be comprised of a base mount 1415, a pressure plate 1416, a universal bottom gasket 1417, a reducer bracket 1418, two narrow gaskets 1419, each being structured and arranged as described hereinabove.

The installation of this alternative design of AP system 1400 may include three main steps. First, the base mount 1415, center mullions and any other necessary supporting structure may be installed within the structure frame, along with the narrow gasket and base gasket secured to the base mount 1415. Next the panel(s) may be inserted into the base mount 1415, supported by a corresponding universal base gasket 1417 and a narrow gasket 1419 within said base mount 1415. Finally, the pressure plate 1416 with its attached corresponding narrow gasket 1419 may be installed by screwing a base screw 1409 through both the pressure plate 1416 and the base mount 1415. This installation process for the alternative design of AP system is simpler and easier than that of the previously disclosed AP system, the latter requiring the base profile to be build around the panel prior to installation within a structure.

Both designs of AP system afford numerous benefits in the protection of a window, door or other structure from unwanted access. By providing an exterior facing surface 1400*b* with no visible vulnerability or access points, the AP systems 1400 may dissuade and resist potential break-in attempts as a result of its visible physical structure. By providing an interior facing surface 1400*a* of the AP systems 1400 within which a base screw 1409 is installed, installation of the AP system may be made simple when said interior facing surface is disposed on the protected side of the window/door. Alternatively, tamper proof screws may be utilized to prevent system disassembly if the base screw 1409 is disposed on the unprotected side of the window/door, as necessitated by the application. In certain embodiments in which the interior facing surface of AP system 1400 is facing the exterior of the attached structure (the unsafe side), such as when the AP system 1400 is installed between an existing glazing and the building exterior, the snap cover 1402 may also provide a means of hiding and securing the base screw, thus covering what may be seen as a potential vulnerability.

The ability of the AP system 1400 to allow for the installation of a security panel of a desired thickness, despite said panel's inability to fit within a preexisting glazing pocket disposed within a structure, allows a user to significantly enhance the protection afforded by said structure. In addition to allowing for the securing of any suitable security panel, the appearance of the AP system 1400 is configured to look sturdy, professional and factory installed, despite the fact it may be retrofitted into a preexisting structure. Certain variations of the disclosed AP system may also be designed to vent or breathe naturally, without the usage of a visible venting mechanism, as will be discussed in greater detail hereinbelow. This may allow the pressure, temperature, and humidity conditions between the security panel supported in the system and a preexisting glass glazing to remain consistent with the outside atmospheric conditions when used in a storefront AP system, reducing or eliminating condensation between the preexisting glass and the security panel. The arrangement of the various components of the AP system 1400 as described hereinabove to create an security panel mounting system that is structurally rigid and damage resistant, appears impregnable and appealing from both the interior and exterior facing sides, allows for expansion and contraction of held security panels of various thicknesses, and allows for the usage of multiple security panels within a singular mounting surface provides an all-encompassing glazing solution that may be used in any application, regardless of the window, door or other structure, or the presence of a preexisting glazing.

Figure 15:
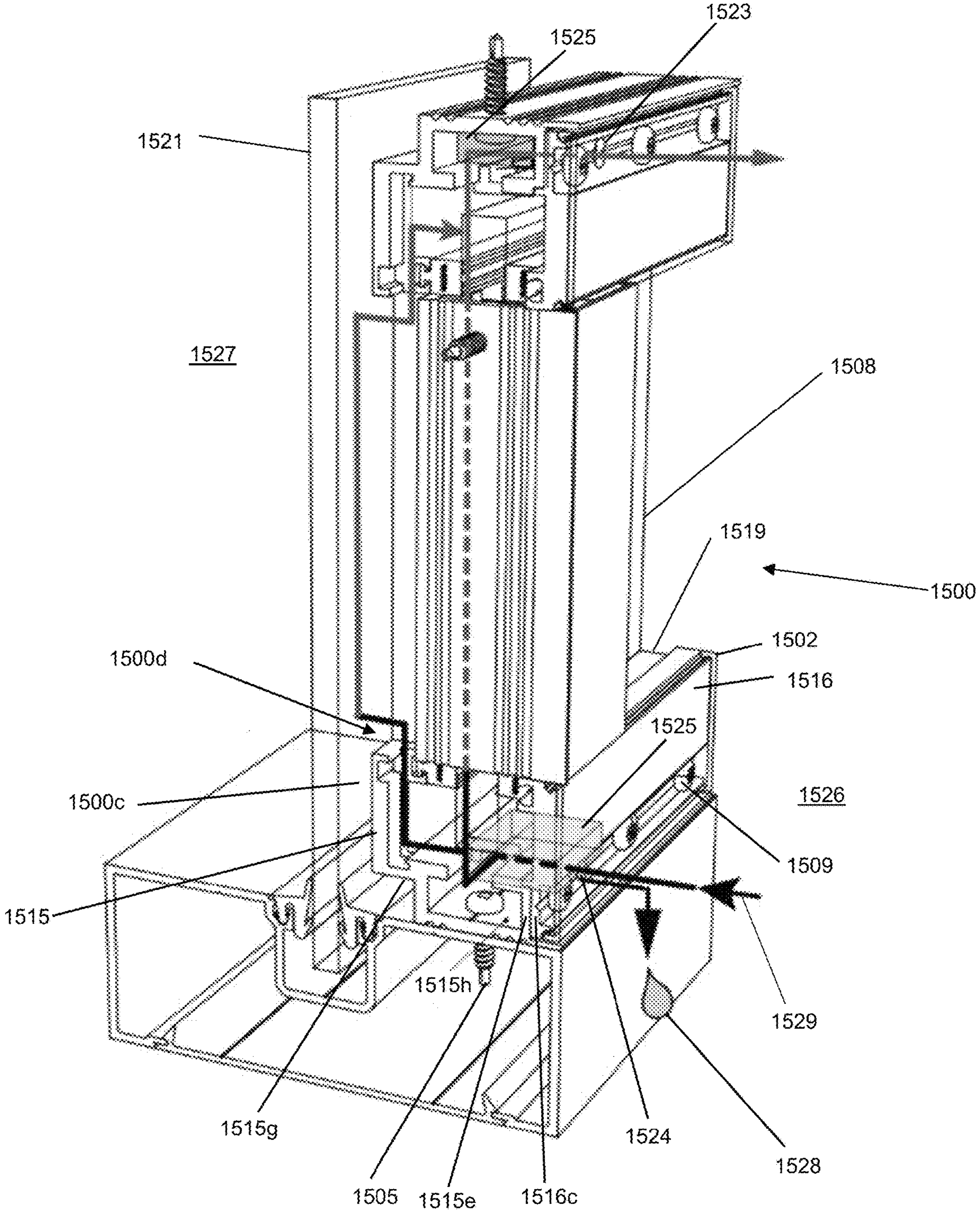
FIG. 15 illustrates the cross-sectional view of a ventilation system within an alternatively designed storefront AP system, according to an aspect.

FIG. 15 illustrates the cross-sectional view of a ventilation system within an alternatively designed storefront AP system 1500, according to an aspect. While only visible in the current embodiment, each storefront variation of the AP system 1500 may utilize the herein disclosed passive ventilation system in order to maintain suitable conditions between the panel 1508 of the AP system 1500 and a preexisting glazing 1521. Said space between the panel 1508 and the preexisting glazing 1521 in a storefront AP system 1500 may be called an expansion chamber 1500*c*. This passive ventilation system may be comprised of at least one top hole 1523, at least one weep hole 1524 and at least one debris filter 1525. In order to better illustrate said elements, the snap covers 1502 and a portion of the pressure plate 1516 has been rendered transparently in FIG. 15.

The disclosed passive ventilation system has been designed to vent or breathe naturally without an obtrusive visible venting mechanism. This allows the pressure, temperature, and humidity conditions between a security panel 1508 secured within the system 1500 and a preexisting glass glazing 1521 to remain consistent with the external atmospheric conditions via equilibration, reducing or eliminating condensation between the preexisting glass glazing 1521 and the security panel 1508. In a preferred embodiment of the disclosed passive ventilation AP system 1500, the debris filter 1525 may be enclosed within a base pocket 1515*h* of the base fixture, pressure fitted into place and specifically fashioned to allow air passage through the AP system 1500. In this way, the mounting of the debris filter 1525 is not restrictive to air flow and, by holding the filter 1525 within the base fixture between through hole(s) to the external environment and the expansion chamber, allows the communication of said expansion chamber 1550*c* with the external environment 1526, while preventing infiltration of insects, dust or other airborne debris into the expansion chamber 1500*c*. The various elements of the ventilation system may be hidden from view using the cover 1502 to conceal their existence and preserve the modern and sleek look of the extrusions.

As a result of the positioning of the desiccant slot 1515*g* on the base mount 1515, there may exist a ventilation gap 1500*d* between adjacent base mount sections 1515 at the corners of an AP system 1500, as seen in FIG. 15. Said ventilation gaps 1500*d* may allow air to travel between the base pocket 1515*h* of each section of base mount 1515 and the expansion chamber 1500*c*. The presence of said ventilation gaps 1500*d*, the top holes 1523 and the weep holes 1524 may allow the expansion chamber 1500*c* to intake air from the external environment 1526 through the weep holes 1524, heat said air as a result of the air's contact with a warmer preexisting glass glazing and output the now heated air out of the top holes 1523, thus creating a natural ventilation system that further prevents humidity from accumulating within said expansion chamber 1500*c*. The preexisting glazing 1521 may be closer in temperature to the internal environment 1527 than the external environment 1526 due to its closer proximity and direct communication with the internal environment 1527. The heated air may rise naturally, facilitating passive air circulation. Air flow arrow 1529 shows the intake of colder air through the weep hole 1524 and output of warmer air out of the top hole 1523 under conditions in which the external environment 1526 is colder than the internal environment 1527. The air flow between the external environment 1526 and the expansion chamber 1500*c* may be balanced (e.g., air is expelled from the expansion chamber 1500*c* as quickly as is taken in) as a result of the passive ventilation system, resulting in pressure balanced air flow into and out of the AP system 1500. As a result of the pressure balanced airflow, the AP system 1500 may provide the desired security benefits without trapping accumulated moisture ("accumulated condensation" "moisture") 1528 or other materials within the expansion chamber 1500*c*. Having a consistent airflow through the AP system 1500 may help reduce the likelihood of condensation forming on the surfaces within the expansion chamber 1500*c*.

Both the top hole(s) 1523 and the weep hole(s) 1524 may have the same dimensions and each may be comprised of a circular through hole between the base pocket of the base mount 1515 and the external environment 1526. Each circular through hole may travel through part of the base fixture, such as adjacent portions of the junction leg 1516*c* of the pressure plate 1516 and the interior side gasket support 1515*e* of the base mount 1515, such that the expansion chamber 1500*c* is exposed to the external environment 1525 and air may travel between the expansion chamber 1500*c* and the external environment 1526. Each top hole 1523 and weep hole 1524 may only be disposed on the external surface of the base fixture, as the flow of air between the inside of the base fixture and the expansion chamber may already be allowed by the construction AP system, as seen by the ventilation gaps 1500*d* of FIG. 15. The weep holes 1524 may allow for the expulsion of moisture 1528 trapped within the base pocket to prevent liquid accumulation within the AP system 1500. The weep holes 1524 and top holes 1523 may be implemented during installation using a drill or other suitable tool. Alternatively said holes may be installed during manufacturing to reduce installation complexity, as needed. Each top hole 1523 may be disposed on a top portion of the AP system 1500, such as a section of the base fixture mounted to the top part of a window frame, to facilitate the expulsion of warmer air into the external environment 1526, whereas each weep hole 1524 may be disposed on a bottom portion of the AP system 1500, such as a section of the base fixture mounted to the bottom part of a window frame, to facilitate the intake of colder air from the external environment 1526 and the drainage of any accumulated moisture 1528 from the base fixture.

The debris filter 1525 may be made of an open cell foam material. This filter 1525 may be disposed within the base pocket 1515*h* between each weep hole 1524 and the expansion chamber 1500*c*, such that the proliferation of airborne dirt, insects or other unwanted solid debris materials into the expansion chamber 1500*c* may be prevented. Though this debris filter 1525 may not allow for the proliferation of unwanted airborne materials into the expansion chamber 1500*c*, it may still allow air and moisture 1528 to travel through it to help maintain balance expansion chamber 1500*c* conditions to prevent fogging. The output of accumulated condensation from each weep hole 1524 is not significantly impacted by the presence of the debris filter 1525 between the base pocket 1515*h* and the external environment 1526. A debris filter 1525 may also be disposed between each top hole 1523 and the expansion chamber 1500*c* in order to further prevent infiltration of unwanted materials into said expansion chamber 1500*c*. The debris filter 1525 may be provided in several sections, each of which has a suitable length to cover each weep hole 1524 and/or top hole 1523 in the corresponding length of the base fixture that it is enclosed within. Each section of debris filter 1525 enclosed within the AP system 1500 may be positioned within its corresponding length of base fixture such that it completely covers all corresponding weep holes 1524 or top holes 1523 from within the base pocket 1515*h*, such that debris may not enter the AP system 1500 through any of the present weep holes 1524 or top holes 1523. The pressure fitting of the debris filter may entail enclosing a filter 1525 that is somewhat wider than the base pocket 1515*h* or other corresponding surrounding structure it is enclosed within, such that it may be compressed into place during installation and remain in place during use. A section of debris filter 1525 disposed between each weep hole 1524 and the expansion chamber 1500*c* may be referred to as a first section of debris filter, whereas a section of debris filter disposed between each top hole 1523 and the expansion chamber 1500*c* may be referred to as a second section of debris filter.

While only shown present on the alternative design of the AP system, the disclosed passive ventilation system may be implemented on other designs of the storefront based AP system, or other AP systems that may be installed alongside a preexisting glazing. The top hole(s) 1523, weep hole(s) 1524 and debris filter 1525 may be implemented within any base fixture having the suitable structure to accommodate them such that air may travel through each top hole 1523 and weep hole 1524, while the debris filter 1525 prevents debris from entering the expansion chamber 1500*c*. For example, a passive ventilation system may be implemented on the storefront AP system base fixture shown in FIG. 4B, wherein each top hole 1523 and weep hole 1524 would travel through corresponding portions of the support leg of the heavy duty mounting bar 412 and the junction leg of the base profile 406. The debris filter may be disposed within the hollow formed between the base profile 406 and the mounting bar 412 in order to prevent external debris from entering its corresponding expansion chamber. As a result of the humidity of the expansion chamber being controlled passively through the usage the disclosed ventilation system, such an AP system using said ventilation system may not need to utilize a desiccant. Alternatively, an AP system having the disclosed ventilation system may still utilize a desiccant in order to further moderate the humidity conditions within the expansion chamber 1500*c*. The disclosed ventilation system may not be utilized on conversion-based AP systems, due to the lack of an expansion chamber 1500*c* needing humidity moderation in the corresponding formed structure.

Figure 16:
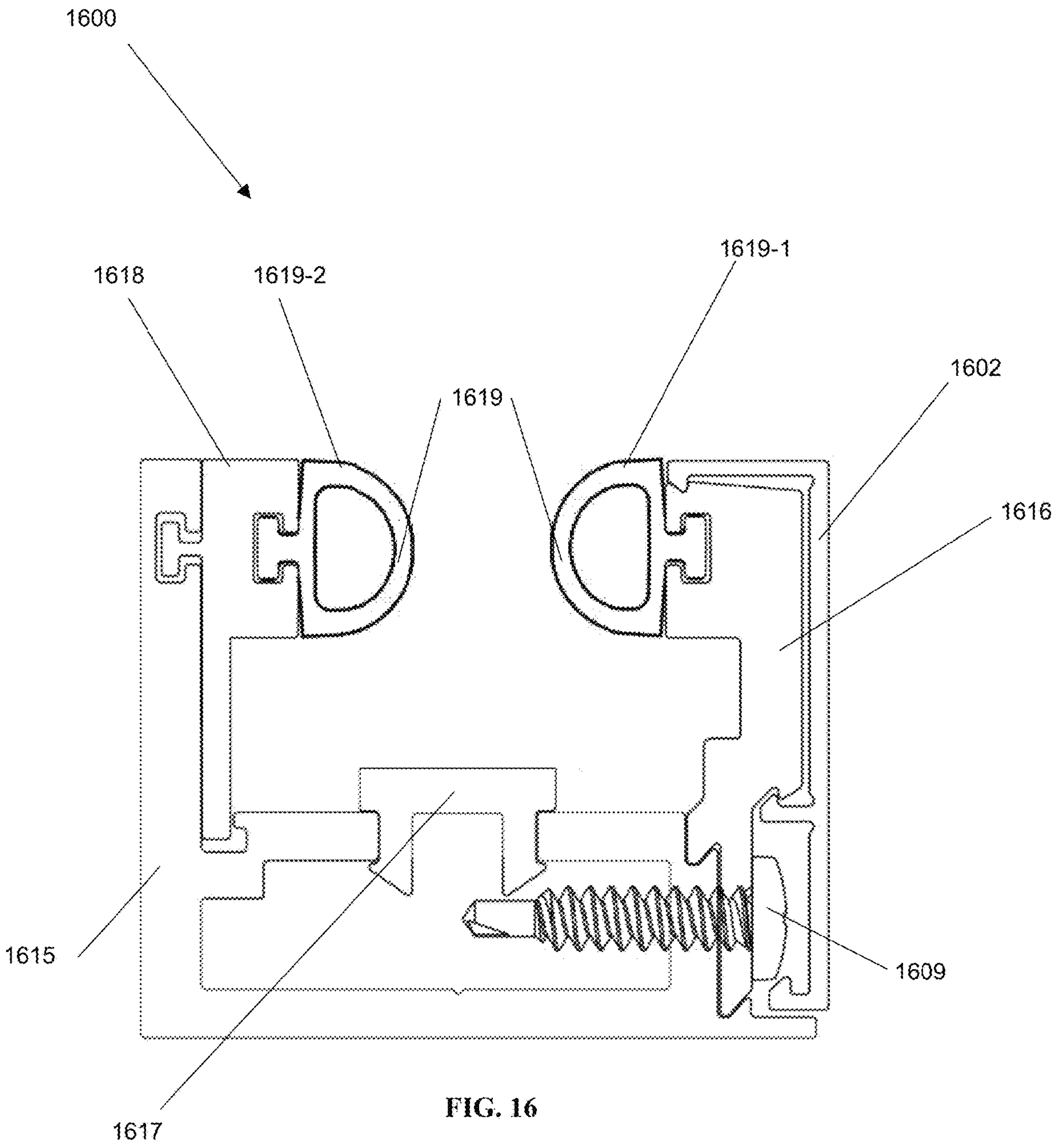
FIG. 16 illustrates an improved embodiment of the disclosed ArmorPlast System, according to an aspect.

FIG. 16 illustrates an improved embodiment of the disclosed ArmorPlast System 1600, according to an aspect. The improved embodiment of the disclosed AP System 1600 may have the same quantity and similar types of components as the prior disclosed AP system embodiment 800 of FIG. 8A. However, each component of the improved AP system 1600 of FIG. 16 may have several differences when compared to those of the AP system embodiments that were described hereinabove. The improved AP system 1600 may be comprised of an improved base mount 1615, an improved pressure plate 1616, improved narrow gaskets 1619, an improved reducer bracket 1618 and an improved snap cover 1602. Each of these elements may engage with each other in a similar way to the previously disclosed AP system embodiments, but may facilitate a plurality of functional improvements, as will be discussed in greater detail hereinbelow.

The interconnections between each of the components of the improved AP system 1600 of FIG. 16 may be largely the same as those seen in AP system 800 of FIG. 8A. The improved base mount 1615 may provide a surface to engage with a widow, frame or other suitable mounting surface, wherein said base mount 1615 is configured to engage directly with the universal bottom gasket 1617, the reducer bracket 1618 (if present) and the pressure plate 1616. As with the hereinabove disclosed AP system embodiments, the universal bottom gasket 1617 may provide a suitable seating surface for the security panel, such as security panel 2308 of FIG. 23B, nested within the improved AP system 1600. The reducer bracket 1618 is configured to allow narrower security panels to be securely nested within the base mount 1615, wherein said reducer bracket is further configured to engage with a corresponding narrow gasket 1619.

The pressure plate 1616 is configured to engage with the base mount 1615 through the utilization of a base screw 1609 engaged with both the base mount 1615 and the pressure plate 1616. The pressure plate 1616 is configured to engage with another narrow gasket 1619, such that upon engagement of the pressure plate 1616 with the base mount 1615, a nested security panel is supported between the two narrow brackets 1619 and a universal bottom bracket 1617 within each section of the AP system 1600. Finally, a snap cover 1602 is configured to engage with the pressure plate 1616 to cover the base screw 1609 and outer surface of the pressure plate 1616. For clarity, it should be understood that a first narrow gasket 1619-1 may be configured to engage with the pressure plate 1616 while a second narrow gasket 1619-2 may be configured to engage with the base mount 1615, or the reducer bracket 1618, if present. While the disclosed engagements within the improved AP system 1600 may appear to be the same as those of the prior disclosed AP system 800 of FIG. 8A, the herein disclosed improved AP system 1600 components may provide a variety of advantages, which will be discussed in detail hereinbelow.

Figure 17:
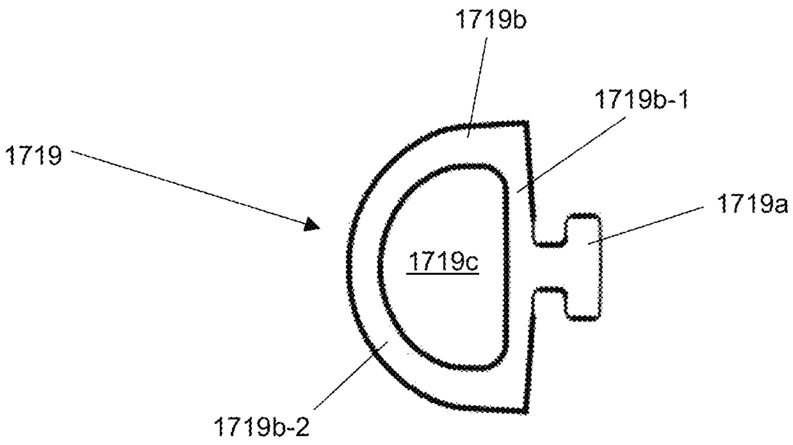
FIG. 17 illustrates an improved embodiment of the narrow gasket, according to an aspect.

FIG. 17 illustrates an improved embodiment of the narrow gasket 1719, according to an aspect. In order to provide improved shock absorption capabilities and improved engagement between each narrow gasket 1719 and the pressure plate, reducer bracket or base mount, several structural changes have been made to the previously disclosed narrow gasket embodiments. Each improved narrow gasket 1719 may have a gasket hollow 1719*c* nested or otherwise disposed within the narrow gasket body 1719*b*. In a preferred embodiment, the gasket hollow 1719*c* may be present throughout the entire length of the gasket body, such that the gasket hollow 1719*c* is a singular, continuous hole, as seen in FIG. 17. As such, the gasket hollow 1719*c* may travel through the length of the narrow gasket 1719 without interruptions. This gasket hollow 1719*c* may allow the narrow gasket 1719 to be more compressible, allowing the held security panel to move more from an attack, thus reducing the impact energy imparted upon the framing system, particularly the base mount/base fixture, from a direct impact to the held security panel. This in turn allows the AP system to withstand heavier impacts to the panel without damaging the base fixture. The gasket hollow 1719*c* may be centrally nested within the gasket body 1719*b* such that the gasket hollow is only exposed at the terminal ends of the narrow gasket 1719 (e.g., the portions of the narrow gasket 1719 traveling into and out of the page).

The improved narrow gaskets 1719 may also have a narrow gasket handle 1719*a* attached to the improved narrow gasket body 1719*b*. This narrow gasket handle 1719*a* may be "T-Shaped" as seen in FIG. 17, wherein the T-Shaped narrow gasket handle is configured to engage with a corresponding engaging structure, such as pressure plate 1816 of FIG. 18, reducer bracket 1918 of FIG. 19 or base mount 2115 of FIG. 21, by being nested within a complementary T-shaped pocket, such as gasket securing pocket 1816*b* of FIG. 18, gasket securing pocket 1918*b* of FIG. 19 or securing pocket 2115*c* of FIG. 21, respectively. For simplicity, each gasket securing pocket 1816*b*, 1918*b* may also be referred to simply as a securing pocket. This engagement of a narrow gasket handle 1719*a* with a complementary shaped securing pocket improves the engagement between the improved narrow gasket 1719 and the corresponding structure, reducing the likelihood of the narrow gaskets 1719 being dislodged during a forced entry attempt. As with previously disclosed narrow gasket embodiments, the size of the narrow gasket body may be modified to accommodate different thicknesses of security panel. It should be understood that the complementary T-shaped pocket on the corresponding structure is suitably sized, such that the narrow gasket handle 1719*a* may be snuggly nested within the corresponding securing pocket/gasket securing pocket, while still allowing for easy installation of the narrow gasket 1719 within said corresponding structure.

As with the previously disclosed narrow gaskets, the improved narrow gaskets 1719 may be made of a suitably strong, but flexible material, such as rubber. In an embodiment, a rubber, such as Santoprene rubber, a mixture of neoprene and silicone, may be utilized for the narrow gaskets 1719 and universal bottom gasket. The material used for the narrow gasket 1719 must be sufficiently strong to prevent itself from being damaged from direct or indirect attack from an assailant, but still sufficiently flexible to allow the panel to move to limit the shock exerted on the AP system upon impact to the held security panel. These competing interests of rigidity/strength and flexibility may be optimized by utilizing a high strength rubber material for the narrow gasket 1719, but also implementing the herein disclosed gasket hollow 1719*c* nested within the narrow gasket 1719 to increase flexibility. The utilization of such a gasket hollow 1719*c* feature may allow for the ideal balance of these competing interests of strength/rigidity and flexibility to be attained. The bulbous shape of the narrow gasket 1719 allows a variety of security panel thicknesses to be held within the AP system via compression, as disclosed herein.

In addition to increasing the flexibility of the improved narrow gasket 1719, the nested gasket hollow 1719*c* may also reduce the conduction of shock energy between base fixture/AP system and the held security panel. As a result of the of gasket hollow 1719*c* within the gasket body 1719*b*, impacts to the held security panel may be responded to more flexibly and the resultant vibrations may be conducted or transferred between the security panel and AP system less efficiently, reducing the vibrations experienced by the AP system/base fixture, thus reducing the likelihood that said base fixture will be damaged or disconnected from the mounting surface. This may result in the security panel vibrating within the base fixture after an impact, without notably transferring said vibration to the base fixture. The universal base gasket, such as improved universal base gasket 2017 of FIG. 20, may also help deaden the vibration of an impact by also being made of a suitable rubber material having suitable shock absorbing properties. As such, the gasket hollow 1719*c* within the narrow gasket 1719 helps to minimize the transfer of vibrations between the security panel and the AP system by having a lesser contact area between the associated security panel and base fixture.

In a preferred embodiment, the narrow gasket body 1719*b* may be "D-Shaped", as seen in FIG. 17. This upper case-D shaped gasket body 1719*b* may form a complementary D-shaped gasket hollow 1719*c* within its center, the gasket hollow 1719*c* having a roughly semi-circular shape. As shown in FIGS. 16-17, this D-shaped narrow gasket body may have a flat surface 1719*b*-1 configured to engage with a corresponding surface of the base fixture, and a rounded surface 1719*b*-2 configured to engage with a held security panel. Having the flat surface 1719*b*-1 engage with the base fixture maximizes the engagement between the narrow gasket 1719 and the base fixture (e.g., the base mount 1615, reducer bracket 1618 or pressure plate 1616 of FIG. 16). Having the round surface 1719*b*-2 engage with the security panel ensures that the engagement between the narrow gasket 1719 and the security panel (e.g., security panel 2308 of FIG. 23B) remains flexible such that the system may respond flexibly to impact, rather than transferring the full shock imparted upon a held panel to the attached AP system.

Figure 18:
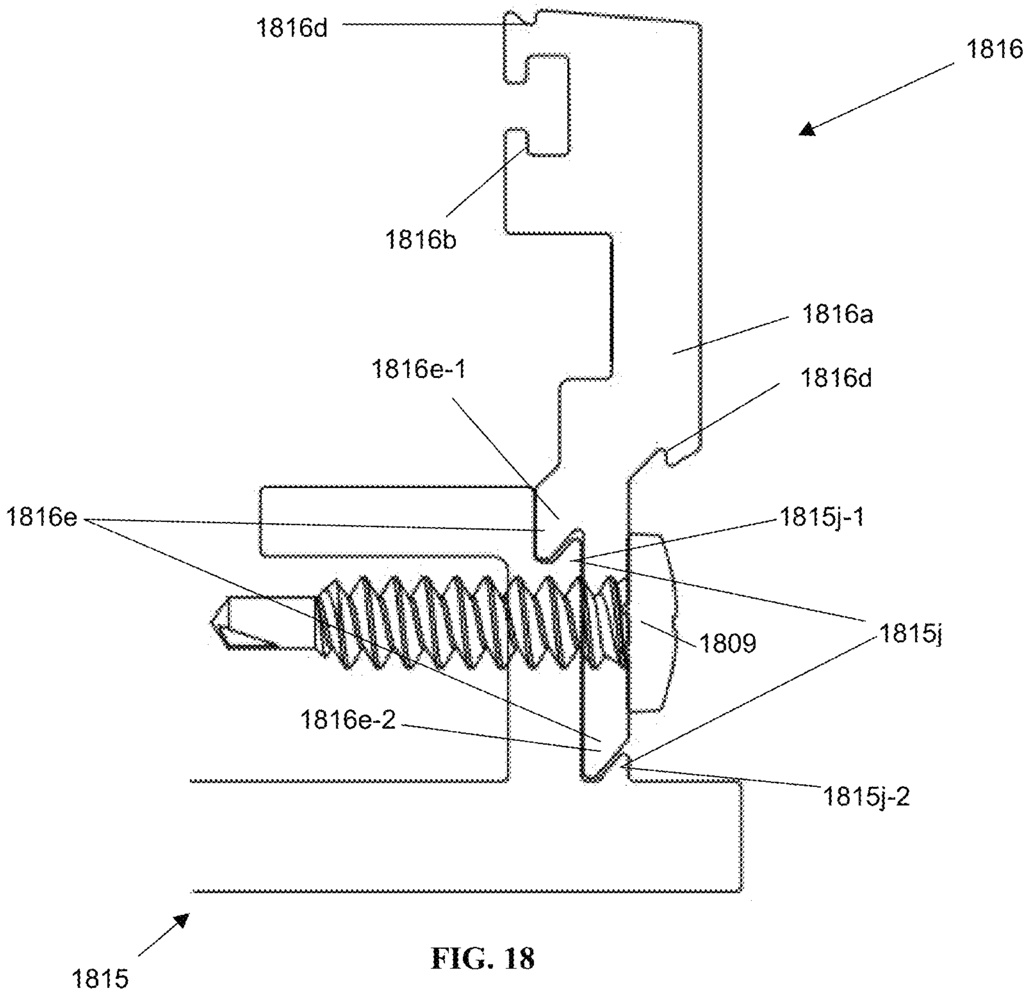
FIG. 18 illustrates an improved embodiment of the pressure plate engaged with an improved embodiment of the base mount, according to an aspect.

FIG. 18 illustrates an improved embodiment of the pressure plate 1816 engaged with an improved embodiment of the base mount 1815, according to an aspect. As with previous AP system embodiments, the pressure plate 1816 may be engaged with the base mount 1815 through the utilization of a base screw 1809. However, additional structures on both the pressure plate 1816 and base mount 1815 may be provided to facilitate a more secure and robust engagement between the two elements.

These additional structures may include a plurality of securing tabs 1816*e* attached to or otherwise associated with the pressure plate 1816, wherein each securing tab 1816*e* is configured to engage with a corresponding locking slot 1815*j* attached to or associated with the base mount 1815 to further secure the pressure plate 1816 to the base mount 1815. As can be seen in FIG. 18, a first securing tab 1816*e*-1 associated with the pressure plate body 1816*a* may be configured to engage with a first a first locking slot 1815*j*-1 that is associated with the base mount 1815, while a second securing tab 1816*e*-2 associated with the pressure plate body 1816*a* may be configured to engage with a second locking slot 1815*j*-2 that is also associated with the base mount 1815. It should be understood that greater or fewer securing tab 1816*e* and locking slot 1815*j* pairs may be provided between the base mount 1815 and pressure plate 1816 in order to provide a secure engagement between the two structures.

This additional engagement between the pressure plate 1816 and the base mount 1815, as a result of the interlocking between corresponding securing tab 1816*e*-locking slot 1815*j* pairs, reduces the chances of distortion and detachment of these components that may occur during forced entry attempts/impacts to the held security panel. Said engagement helps to further lock the position and orientation of the pressure plate 1816 after installation, further preventing lateral and rotational movement of the pressure plate 1816 in relation to the base mount 1815, thus preventing the base screw 1809 from being damaged or broken from a forced entry attempt.

As disclosed hereinabove, the pressure plate 1816 may have a T-shaped gasket securing pocket 1816*b* configured to provide an improved engagement between the improved narrow gasket, such as narrow gasket 1719 of FIG. 17, and the pressure plate 1816. One result of the improved design of the narrow gasket handle 1819*a* is that said gasket may need to be inserted through one of the ends of the corresponding engaging structure to facilitate nesting of the narrow gasket handle 1819*a* within said corresponding engaging structure. This stronger engagement between the narrow gasket and the corresponding engaging structure further reduces the chances of the AP system failing from an impact or forced entry attempt. The modified positioning of the disclosed snap cover securing ridges 1816*d* will be discussed in greater detail hereinbelow, wherein said positioning allows the snap cover to surround the pressure plate 1816. As disclosed hereinabove, the engagement of the pressure plate 1816 (a type of securing unit) with a base mount 1815 (a type of mounting unit) results in the formation of a base fixture.

Figure 19:
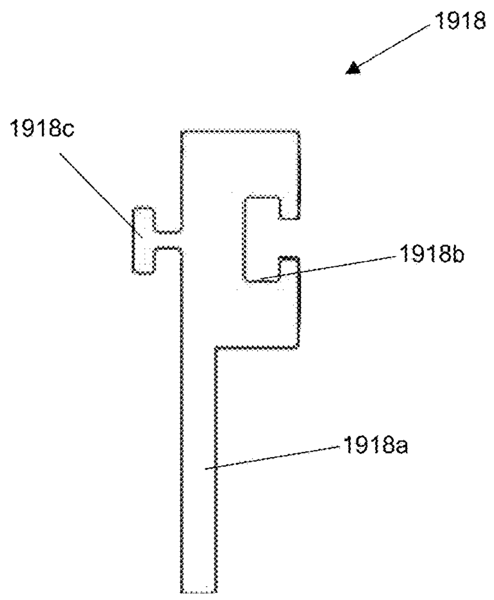
FIG. 19 illustrates an improved embodiment of the reducer bracket, according to an aspect.

FIG. 19 illustrates an improved embodiment of the reducer bracket 1918, according to an aspect. Similarly to the pressure plate 1816 disclosed hereinabove in FIG. 18, the improved reducer bracket 1918 may have a gasket securing pocket 1918*b* configured to engage with a complementary T-shaped narrow gasket handle. Again, this T-shaped handle/pocket engagement is configured to improve the attachment of the narrow gaskets to their corresponding engaging structure to prevent their potential dislodgement during a force entry attempt or impact. A comparable approach may be utilized to improve the engagement between the reducer bracket 1918 and the corresponding base mount, such as base mount 1615 of FIG. 16, wherein the reducer bracket 1918 may be comprised of a T-shaped reducer ridge 1918*c* configured to engage with a corresponding T-shaped securing pocket, such as T-shaped securing pocket 2115*c* of FIG. 21. The reducer bracket 1918 may also be comprised of a base mount securing leg 1918*a* configured to engage with a corresponding bracket support leg, such as bracket support leg 2115*f* of the base mount 2115 of FIG. 21, to further secure the reducer bracket 1918 to the base mount.

Figure 20:
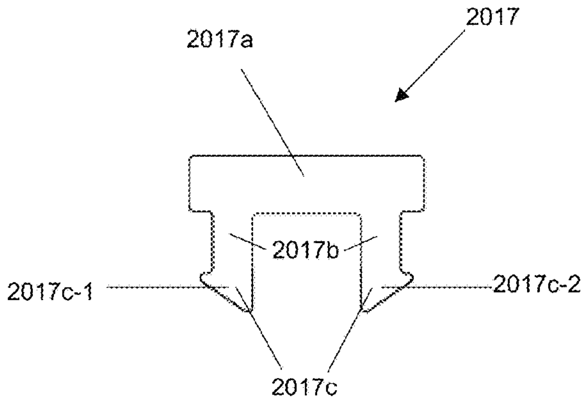
FIG. 20 illustrates an improved embodiment of universal bottom gasket, according to an aspect.

FIG. 20 illustrates an improved embodiment of universal bottom gasket 2017, according to an aspect. In order to facilitate a more secure engagement of the universal bottom gasket 2017 with the corresponding base mount, the improved bottom gasket 2017 may have barbed tips 2017*c* attached to or otherwise associated with the base blocks 2017*b* attached below the panel plate 2017*a*. Each barbed tip 2017 is configured to engage with either the bracket support leg or the interior side gasket support of the base mount, such as bracket support leg 2115*f* or interior side gasket support 2115*e* of FIG. 21, depending on how the universal bottom gasket 2017 is oriented. For example, a first barbed tip 2017*c*-1 may be configured to engage with the bracket support leg, while a second barbed tip 2017*c*-2 may be configured to engage with the interior side gasket support, thus providing a securing fitting of the universal bottom gasket to the corresponding base mount.

These barbed tips 2017*c* may work in conjunction with their corresponding base blocks 2017*b* and the panel plate 2017*a*, in order to wrap around the corresponding interior side gasket support/bracket support leg to facilitate a more secure engagement of the universal bottom gasket 2017 to the base mount. This more secure engagement between the universal bottom gasket 2017 and the base mount prevents the universal bottom gasket from being forced into the base mount or falling out of the base mount, regardless of the orientation or positioning of the corresponding AP system section or the application of an external force/impact.

Figure 21:
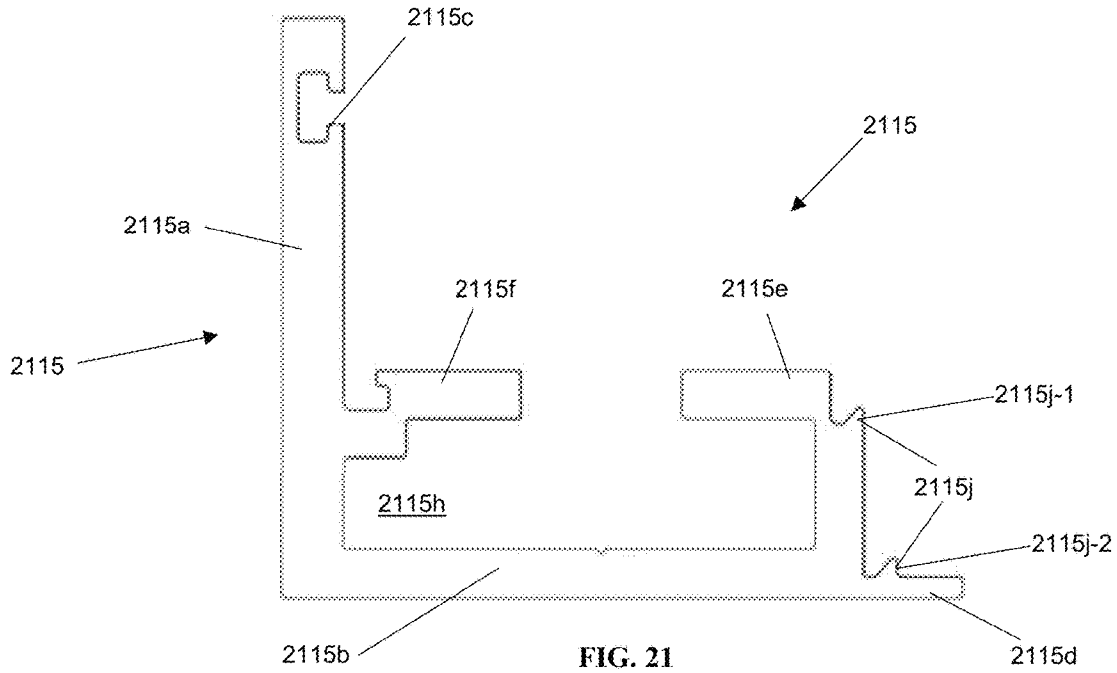
FIG. 21 illustrates an improved embodiment of the base mount, according to an aspect.

FIG. 21 illustrates an improved embodiment of the base mount 2115, according to an aspect. While certain aspects of the base mount have been modified to provide improved functionality and performance, certain aspects of the base mount 2115 have been maintained. Base grooves, such as base grooves 915*i* of FIG. 9A, have remained absent from both the prior disclosed base mount 815 of FIG. 815 and the improved base mount 2115 of FIG. 21, in order to maintain a better fitting of the improved base mount 2115 to irregular door/window mounting surfaces. As such, the base mount floor 2115*b* of the base mount 2115 may be flat and smooth, as seen in FIG. 21, to maximize the potential engagement area between the AP system and the mounting surface. The cover leg 2115*d* of the prior disclosed base mount embodiments may also be retained and may provide the same functionality. Unless otherwise noted, it should be assumed that unmentioned structures of the improved base mount 2115 are largely the same as those of the prior disclosed base mount 815 of FIG. 8A. Various aspects of the prior disclosed base mount 815 of FIG. 8A that have been modified in order to facilitate and/or accommodate the various other improvements of the improved AP system 1600 of FIG. 16, are described hereinbelow.

In order to ensure a more secure fitting of the pressure plate to the base mount 2115, the base mount 2115 may be fitted with a plurality of locking slots 2115*j* attached to, nested within or otherwise associated with the base mount 2115, wherein each locking slot 2115*j* is configured to engage with a corresponding securing tab to supplement the engagement provided by the prior disclosed base screw, such as base screw 1809 of FIG. 18. The securing tab-locking slot engagements are configured to further prevent the rotation, displacement or deformation of the pressure plate or base mount 2115, as such actions may lead to the failure of the AP system. The plurality of locking slots may be comprised of a first locking slot 2115*j*-1 associated with the interior side gasket support 2115*e* and a second locking slot 2115*j*-2 associated with the cover leg 2115*d*.

In order to complement the T-shaped reducer ridge 1918*c* of the reducer bracket 1918 of FIG. 19, the securing pocket 2115*c* disposed on the mount exterior wall 2115*a* of the base mount 2115 may also be T-shaped, as disclosed hereinabove. In order to further secure the reducer bracket to the base mount 2115, the bracket support leg 2115*f* of the base mount 2115 may be configured to engage with the base mount securing leg of the reducer bracket. As with the previous embodiments of the AP system, the improved base mount 2115 may utilize its bracket support leg 2115*f* and interior side gasket support 2115*e* to provide a suitable engagement position for the universal bottom gasket. These structures also result in the formation of the base pocket 2115*h*, as disclosed in previous AP system embodiments, such as AP system 800 of FIG. 8A. It should be understood that the aforementioned second narrow gasket, such as narrow gasket 1619-2 of FIG. 16, may be associated with the base mount 2115, either through being directly nested within the securing pocket 2115*c* or being nested within the gasket securing pocket of the reducer bracket, which may itself be engaged with the securing pocket 2115*c*.

Figure 22A:
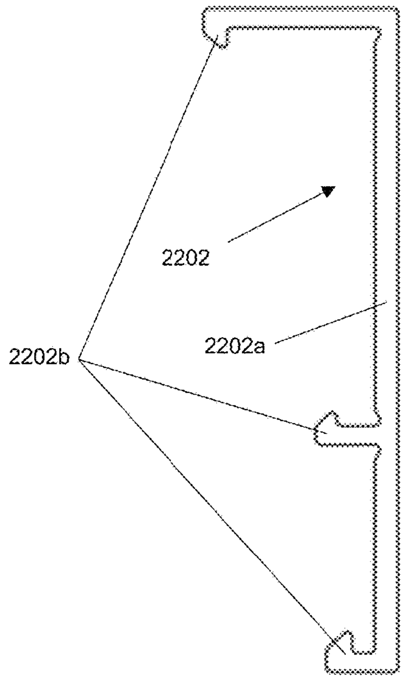
FIG. 22A illustrates an improved embodiment of the snap cover, according to an aspect.
Figure 22B:
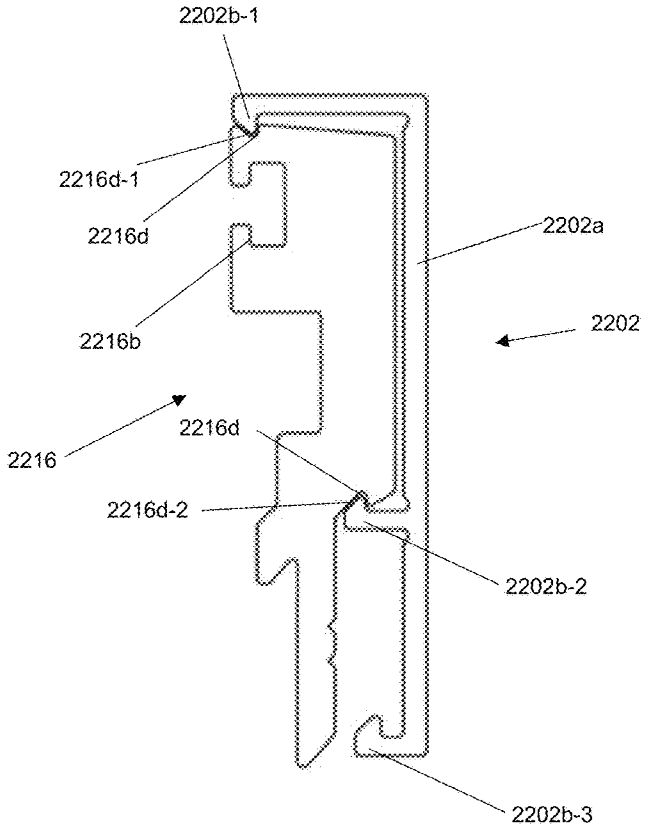
FIG. 22B illustrates an improved embodiment of the snap cover engaging with an improved embodiment of the pressure plate, according to an aspect.

FIG. 22A illustrates an improved embodiment of the snap cover 2202, according to an aspect. FIG. 22B illustrates an improved embodiment of the snap cover 2202 engaging with an improved embodiment of the pressure plate 2216, according to an aspect. As with previous disclosed snap covers, the improved snap cover 2202 may be comprised of a snap cover body 2202*a* associated with a plurality of snap cover edges 2202*b*. In order to provide an improved embodiment of the snap cover 2202, the structure of said snap cover 2202 may be modified to cover the outer surface of the pressure plate that it engages with. By positioning a snap cover securing ridge 2216*d* above the top of the gasket securing pocket 2216*b* of the pressure plate 2216, as seen in FIG. 22B, the snap cover 2202 may cover the pressure plate 2216, as can be seen in FIG. 16. By covering the pressure plate 2216 using the corresponding narrow gasket and snap cover 2202, seams which act as potential access point for a force entry attempt may be covered, providing a structure with fewer potential vulnerabilities. Additionally, covering the pressure plate provides a cleaner, more uniform design aesthetic which is likely desirable for many applications.

As a result of the hereinabove described structural differences, the improved snap cover 2202 may be easier to install and harder to remove, making it ideal for providing a suitably robust structure that can be assembled rapidly. Additionally, as mentioned hereinabove, the snap cover 2202 may cover the outer surface of the pressure plate 2216, thus covering the previously visible seams between the pressure plate 2216 and its adjoined element and the base screw, such as base screw 1609 of FIG. 6. By covering up any easily accessible seams, the base fixture formed from the improved pressure plate 2216 and the improved base mount may exhibit a unified visual appearance upon engaging with the improved snap cover 2202, and thus break-in attempts may be preemptively discouraged, based purely on how the AP system looks. The snap cover being more difficult to remove will also help dissuade or stop tampering attempts. Overall, the improved snap cover 2202 of FIG. 22A-22B covers the pressure plate 2216 in a way that makes the AP system harder to tamper with while also conveying the same visually.

As can be seen in FIG. 22B, a first snap cover securing ridge 2216*d*-1 above the gasket securing pocket 2216*b* may be configured to engage with a first snap cover edge 2202*b*-1, while a second snap cover securing ridge 2216*d*-2, may be configured to engage with a second snap cover edge 2202*b*-2, such that the snap cover 2202 may be securely attached to the pressure plate 2216, and thus the base fixture. The third snap cover edge 2202*b*-3 of this embodiment may not engage directly with a snap cover ridge but may act as a brace to prevent the lower portion of the pressure plate from being bent toward the base mount upon installation, thus providing a stronger, more secure engagement between the snap cover and the pressure panel.

Figure 23A:
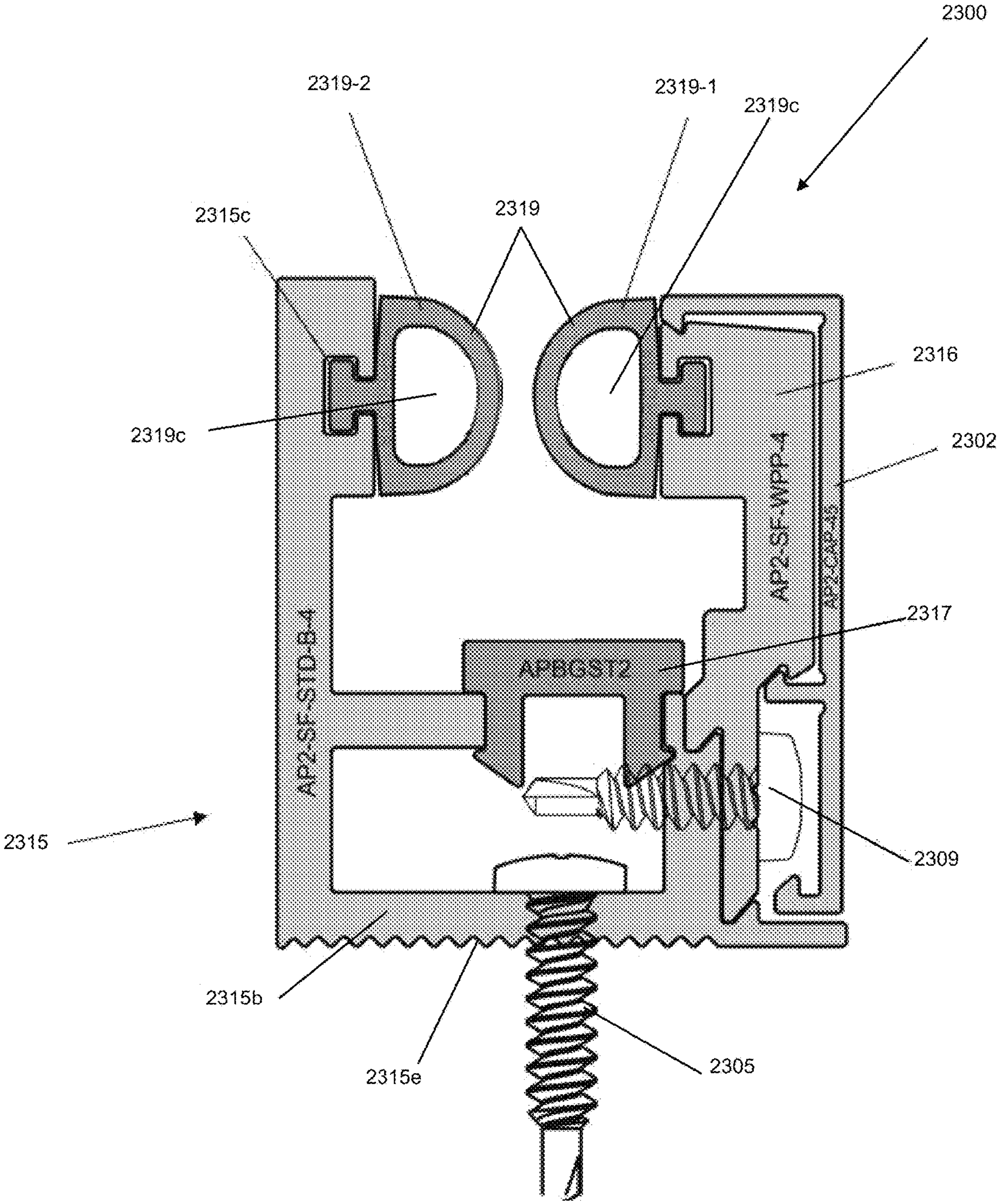
FIG. 23A illustrates an alternative, improved embodiment of the disclosed ArmorPlast System, according to an aspect.
Figure 23B:
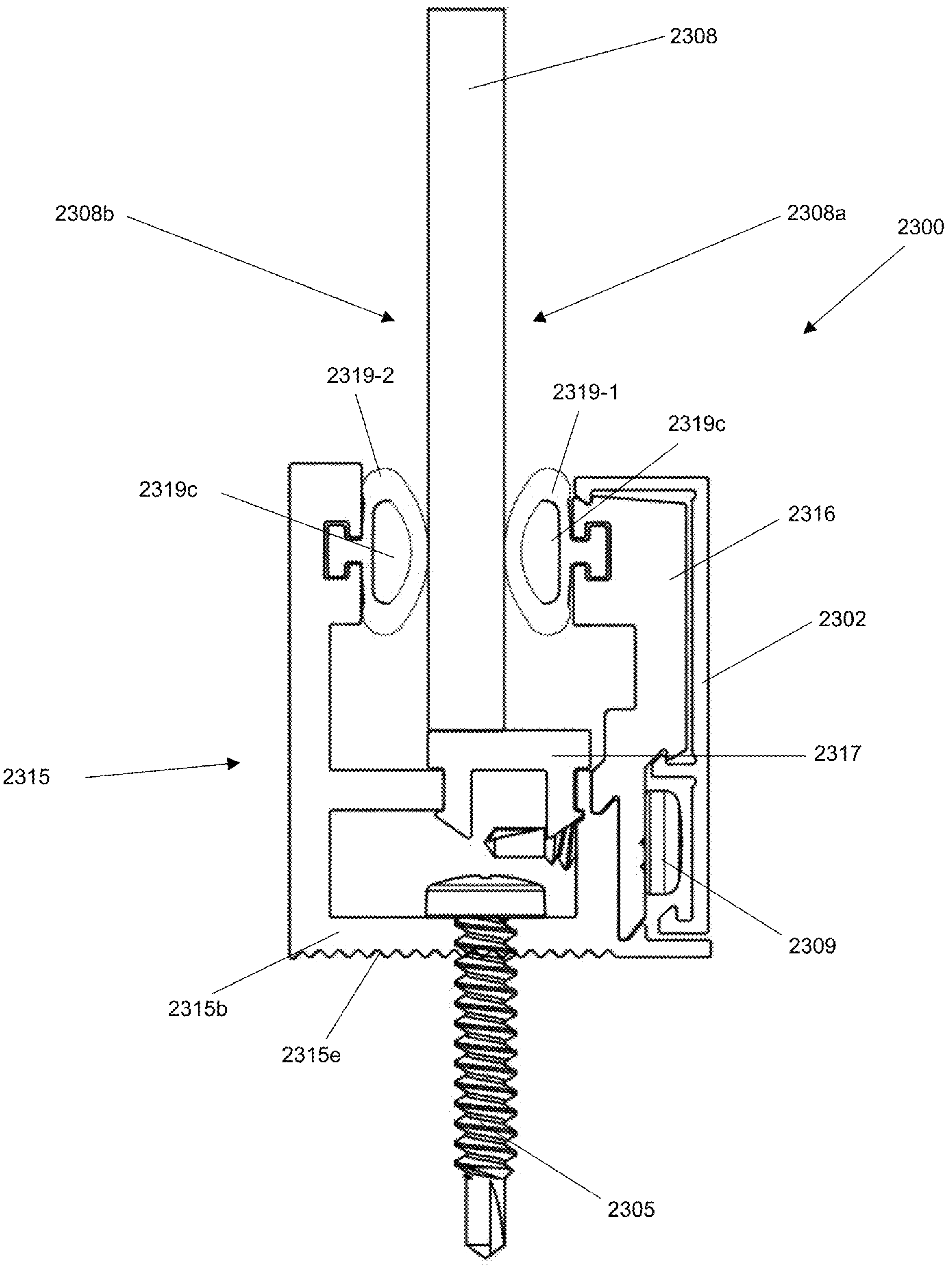
FIG. 23B illustrates an alternative, improved embodiment of the disclosed ArmorPlast System holding a security panel, according to an aspect.

FIG. 23A illustrates an alternative, improved embodiment of the disclosed ArmorPlast System 2300, according to an aspect. FIG. 23B illustrates an alternative, improved embodiment of the disclosed ArmorPlast System holding a security panel 2308, according to an aspect. Several aspects of the disclosed alternative improved embodiment of the AP system 2300 of FIG. 23 may differ from those of the improved AP system 1600 of FIG. 16. The prior disclosed reducer bracket 1618 of AP system 1600 of FIG. 16 is not present in the AP system 2300 of FIG. 23. Due to the absence of a reducer bracket in the disclosed embodiment of FIG. 23, the bracket support leg 2315*f* may not be configured to engage with a reducer bracket and may act solely as an exterior side gasket support in said embodiment. The absence of the reducer bracket results in one of the two narrow gaskets 2319, specifically the second narrow gasket 2319-2, being engaged directly with the securing pocket 2315*c* of the base mount 2315.

Another aspect that may differ between the improved embodiment of the AP system 1600 from FIG. 16 and the alternative, improved embodiment of the AP system 2300 from FIG. 23 is that the alternative improved embodiment of the AP system 2300 of FIG. 23 may utilize base grooves 2312*e* nested within the base mount floor 2315*b*. As disclosed hereinabove, the base grooves 2312*e* may be configured to reduce the amount of material used for the base mount floor 2315*b*, while simultaneously improving the ability of the base mount 2315 to engage with a corresponding mounting surface by increasing the potential engagement area between the base mount floor 2315*b* and the mounting surface. As discussed previously, whether or not a base mount 2315 should utilize base groves 2312*e* is dependent on a variety of factors including the characteristics of the mounting surface, method of attaching the base mount to the mounting surface, etc. Furthermore, it should be understood that more or fewer base grooves 2312*e* may be utilized on a base mount 2315 depending on the needs of the application. As shown in previous embodiments, a mounting screw 2305 may be utilized to secure the base mount 2315 to a mounting surface.

Aside from the differences described hereinabove, the improved embodiment of the AP system 1600 from FIG. 16 and the alternative, improved embodiment of the AP system 2300 from FIG. 23 may be largely the same. For example, both AP systems 1600, 2300 may utilize a snap cover 1602, 2302 configured to engage with the pressure plate 1616, 2316 and cover the base screw 1609, 2309. Each element other than the reducer bracket may be present in the alternative, improved AP system 2300, wherein each element may maintain its known engagements and connections as disclosed hereinabove.

It should be understood that the disclosed alternative, improved embodiment of the AP system 2300, as well as all previous embodiment of the AP system, may be suitably configured to secure a security panel(s) of a desired thickness within a corresponding mounting surface. In an embodiment, the AP system 2300 may be configured to secure an AP25 security panel having an approximate thickness of 0.236 inches. In order to hold thicker (or thinner) security panels, the sizes of the corresponding narrow gaskets 2319 may be modified accordingly. The general size of the AP system (more specifically, its depth) may also be modified if engagement of desired AP system 2300 with the desired thickness of security panel 2308 is not possible purely through modification of the narrow gaskets 2319.

As can be seen in FIG. 23B, the first narrow gasket 2319-1 may be configured to engage with the internal facing surface 2308*a* of the security panel 2308, whereas the second narrow gasket 2319-2 may be configured to engage with the external facing surface 2308*b* of the security panel 2308. This engagement, wherein the first 2319-1 and second 2319-2 narrow gaskets are configured for disposal on opposing sides 2308*a*, 2308*b* of a security panel, ensures that the gasket is properly supported within the AP system 2300.

The narrow gaskets 2319 may assume a relaxed position in the absence of an inserted security panel, as can be seen in FIG. 23A. In contrast, as can be seen from FIG. 23B, the insertion of a security panel 2308 within the disclosed alternative improved embodiment of the AP system 2300 may result in the compression of the narrow gaskets 2319. This compression of the narrow gaskets 2319 is configured to allow for a secure fitting of the security panel 2308 within the AP system 2300, by providing a snug fitting of the security panel 2308 within the AP system 2300, while still allowing the AP system to respond flexibly to an impact to the security panel 2308. It should be understood that the shape of the narrow gaskets 2319 may change in accordance with how large the inserted security panel is, wherein thicker panels may result in greater compression of the narrow gasket 2319 and is corresponding gasket hollow 2319*c*. Upon compression, the gasket hollows 2319*c* may be compressed depth-wise and expanded height-wise.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A security panel mounting system comprising:
a base mount configured to attach to a mounting surface, the base mount having a plurality of locking slots;
a pressure plate having a plurality of securing tabs, the pressure plate being configured to engage with the base mount through the engagement of each securing tab with a corresponding locking slot and a threading of at least one base screw through the pressure plate and the base mount to form a base fixture;
a first narrow gasket and a second narrow gasket, each narrow gasket having:
a narrow gasket body;
a narrow gasket handle attached to the narrow gasket body; and
a gasket hollow nested within the narrow gasket body, the first narrow gasket being configured to engage with the pressure plate, and the second narrow gasket being configured to associate with the base mount;
a universal bottom gasket having:
a panel plate;
two base blocks attached to the panel plate; and
a barbed tip associated with each base block;
wherein each barbed tip is configured to engage with the base fixture to secure the universal bottom gasket within the base fixture; and
a snap cover configured to engage with snap cover securing ridges disposed on the pressure plate to cover the pressure plate and each base screw, wherein the first narrow gasket, the second narrow gasket and the universal bottom gasket are configured to secure a security panel within the base fixture.

2. The security panel mounting system of claim 1, further comprising a reducer bracket, the reducer bracket having: a base mount securing leg configured to engage with the base mount; a gasket securing pocket disposed above the base mount securing leg; and a reducer ridge disposed above the base mount securing leg and adjacent to the gasket securing pocket, wherein the reducer bracket is configured to be disposed between the base mount and the second narrow gasket, such that the second narrow gasket is engaged with the gasket securing pocket of the reducer bracket and the reducer ridge is nested within a securing pocket nested within the base mount.

3. The security panel mounting system of claim 2, wherein the reducer bracket is configured to allow for the utilization of AP25, AP375, AP50 or AP75 security panels within the security panel mounting system.

4. The base mount of claim 1, further comprising: a mount exterior wall; a base mount floor disposed below the mount exterior wall; an exterior side gasket support disposed on the mount exterior wall; a securing pocket disposed on the mount exterior wall and above the exterior side gasket support; an interior side gasket support disposed above the base mount floor; and a cover leg extending from the base mount floor, wherein the base mount floor is flat and smooth.

5. The security panel mounting system of claim 4, further comprising a desiccant slot disposed between the mount exterior wall and the base mount floor.

6. The security panel mounting system of claim 5, wherein the security panel mounting system is configured to be installed within a frame alongside a preexisting glazing, such that the desiccant slot is disposed within a gap formed between the security panel mounting system and the preexisting glazing, such that a desiccant disposed within the desiccant slot may be disposed between the preexisting glazing and the security panel.

7. The security panel mounting system of claim 4, wherein a first barbed tip is configured to engage with the bracket support leg and a second barbed tip is configured to engage with the interior side gasket support to secure the universal bottom gasket to the base fixture.

8. The security panel mounting system of claim 4, wherein the plurality of locking slots is comprised of a first locking slot associated with the interior side gasket support and a second locking slot associated with the cover leg and the plurality of securing tabs is comprised of a first securing tab and a second securing tab, wherein the first securing tab is configured to engage with the first locking slot and the second securing tab is configured to engage with the second locking slot.

* * * * *